United States Patent
Saleh et al.

(10) Patent No.: US 7,293,090 B1
(45) Date of Patent: Nov. 6, 2007

(54) RESOURCE MANAGEMENT PROTOCOL FOR A CONFIGURABLE NETWORK ROUTER

(75) Inventors: Ali Najib Saleh, Ft. Lauderdale, FL (US); H. Michael Zadikian, McKinney, TX (US); John C. Adler, Plano, TX (US); Zareh Baghdasarian, La Canada, CA (US); Vahid Parsi, Sherman Oaks, CA (US)

(73) Assignee: Cisco Technology, Inc., San Jose, CA (US)

( * ) Notice: Subject to any disclaimer, the term of this patent is extended or adjusted under 35 U.S.C. 154(b) by 975 days.

(21) Appl. No.: 09/714,784

(22) Filed: Nov. 15, 2000
(Under 37 CFR 1.47)

Related U.S. Application Data

(63) Continuation-in-part of application No. 09/232,395, filed on Jan. 15, 1999, now Pat. No. 6,724,757.

(60) Provisional application No. 60/174,323, filed on Jan. 4, 2000.

(51) Int. Cl.
*H04J 3/16* (2006.01)
*G06F 11/00* (2006.01)
*G06F 15/173* (2006.01)

(52) U.S. Cl. .......................... 709/226; 714/10; 714/12; 370/468; 370/412; 709/223

(58) Field of Classification Search ............... 370/400, 370/395.21, 468, 412, 419, 396, 395.41, 370/408, 465, 450; 709/229, 226, 224, 223, 709/227, 230, 232, 233, 225; 714/30, 12, 714/9, 10; 701/23, 24, 50
See application file for complete search history.

(56) References Cited

U.S. PATENT DOCUMENTS 4,074,072 A 2/1978 Christensen et al. .......... 179/15

(Continued)

FOREIGN PATENT DOCUMENTS

EP 0 752 795 A2 1/1997

(Continued)

OTHER PUBLICATIONS

Ali Saleh; H. Michael Zadikian; Zareh Baghdasarian, Vahid Parsi, "A Method For Routing Information Over A Network", Jan. 15, 1999; U.S. Appl. No. 09/232,397.

(Continued)

*Primary Examiner*—Hanh Nguyen
(74) *Attorney, Agent, or Firm*—Campbell Stephenson LLP

(57) ABSTRACT

A method of managing a communications system is disclosed. The method begins with the creation of a resource control block corresponding to a resource of the communications system. The communications system includes, for example, a processor and a resource coupled to the processor. The resource control block maintains information regarding the resource. The method also provides for the maintenance of the resource control block. The processor is configured to maintain the resource control block, and the resource control block is maintained by the processor in response to communications (e.g., a keep-alive message) between the processor and the resource. This embodiment can also include the creation of a processor resource control block corresponding to the processor that is created by the controller in response to a power-up message from the resource. The resource can be, for example, a hardware component of the communications system.

53 Claims, 23 Drawing Sheets

U.S. PATENT DOCUMENTS

| | | | | |
|---|---|---|---|---|
| 4,470,139 | A | | 9/1984 | Munter .......................... 370/66 |
| 4,683,564 | A | | 7/1987 | Young et al. ................... 370/63 |
| 4,914,571 | A | * | 4/1990 | Baratz et al. .................. 707/10 |
| 4,939,721 | A | | 7/1990 | De Bosio ...................... 370/60 |
| 5,023,864 | A | | 6/1991 | Cloonan et al. ................ 370/1 |
| 5,084,891 | A | | 1/1992 | Ariyavisitakul et al. ....... 371/42 |
| 5,168,492 | A | | 12/1992 | Beshai et al. ............... 370/60.1 |
| 5,200,746 | A | | 4/1993 | Yoshifuji .................. 340/825.8 |
| 5,307,342 | A | | 4/1994 | Georigiou et al. .......... 370/58.1 |
| 5,357,249 | A | | 10/1994 | Azaren et al. ............... 341/100 |
| 5,361,347 | A | * | 11/1994 | Glider et al. .................. 714/44 |
| 5,410,600 | A | | 4/1995 | Toy ................................ 380/9 |
| 5,524,154 | A | | 6/1996 | Bergland et al. .............. 385/17 |
| 5,570,370 | A | | 10/1996 | Lin ........................... 370/95.3 |
| 5,657,449 | A | | 8/1997 | Osaki .......................... 370/357 |
| 5,666,218 | A | | 9/1997 | Hill ............................ 359/139 |
| 5,754,320 | A | | 5/1998 | Watanabe et al. ........... 359/117 |
| 5,771,320 | A | | 6/1998 | Stone ........................... 385/16 |
| 5,777,761 | A | | 7/1998 | Fee ............................ 359/110 |
| 5,781,615 | A | * | 7/1998 | Bales et al. .............. 379/88.18 |
| 5,784,505 | A | | 7/1998 | Schunk ......................... 385/17 |
| 5,835,517 | A | | 11/1998 | Jayaraman et al. ........... 372/50 |
| 5,884,017 | A | | 3/1999 | Fee ....................... 395/182.02 |
| 5,906,646 | A | * | 5/1999 | Kemner ........................ 701/23 |
| 5,961,560 | A | * | 10/1999 | Kemner ........................ 701/24 |
| 6,026,095 | A | | 2/2000 | Sherer et al. ................ 370/448 |
| 6,101,010 | A | | 8/2000 | Konishi ....................... 359/110 |
| 6,111,673 | A | | 8/2000 | Chang et al. ................ 359/123 |
| 6,151,304 | A | | 11/2000 | Doshi et al. ................. 370/238 |
| 6,160,813 | A | | 12/2000 | Banks et al. ................. 370/422 |
| 6,188,686 | B1 | | 2/2001 | Smith .......................... 370/388 |
| 6,262,820 | B1 | | 7/2001 | Al-Salameh ................ 359/119 |
| 6,266,333 | B1 | | 7/2001 | Kartalopoulos ............. 370/395 |
| 6,266,698 | B1 | * | 7/2001 | Klein et al. .................. 709/227 |
| 6,298,371 | B1 | * | 10/2001 | Ernst .......................... 718/104 |

FOREIGN PATENT DOCUMENTS

| | | |
|---|---|---|
| EP | 0 802 697 A2 | 10/1997 |
| WO | WO97/04397 | 2/1997 |
| WO | WO97/24901 | 7/1997 |
| WO | W/O 97/30529 | 8/1997 |

OTHER PUBLICATIONS

H. Michael Zadikian; Steven E. Plote, John C. Adler, David Parish Autry, Ali Saleh, "Method of Providing Network Services", Jan. 4, 2000; U.S. Appl. No. 09/477,498.

Ali Saleh, "A Method For Path Selection In A Network", Jan. 4, 2000; U.S. Appl. No. 09/478,235.

Ali N. Saleh and Stevan E. Plote, "A Network Addressing Scheme For Reducing Protocol Overhead In An Optical Network", Sep. 2, 1999; U.S. Appl. No. 09/389,302.

Ali N. Saleh, Douglas E. Duschatko, Lane Byron Quibodeaux, "Method And Apparatus For A Rearrangeably Non-Blocking Switching Matrix", Jan. 4, 2000; U.S. Appl. No. 09/477,166.

Michael H. Zadikian, Ali Saleh; John C. Adler, Zareh Baghdasarian, Vahid Parsi, "Configurable Network Router", Jan. 15, 1999; U.S. Appl. No. 09/232,396.

Ronald Alan Russell and Michael Kevin Anthony, "A Method And Apparatus For Isolating Faults In A Switching Matrix", Jan. 4, 2000; U.S. Appl. No. 09/477,217.

Komine, et al., "A Distributed Restoration Algorithm for Multiple-Link and Node Failures of Transport Networks," *IEEE, Globecom'90*, Apr. 1990.

Zhang, et al., "On Fundamental Issues in IP Over WDM Multicast," *IEEE, Computer Communications and Networks*, Sep. 1999.

* cited by examiner

RESOURCE MANAGEMENT PROTOCOL FOR A CONFIGURABLE NETWORK ROUTER

This application claims the benefit of U.S. Provisional Patent Application No. 60/174,323, filed Jan. 4, 2000 and entitled "RESOURCE MANAGEMENT PROTOCOL FOR A CONFIGURABLE NETWORK ROUTER," having Ali Najib Saleh, H. Michael Zadikian, John C. Adler, Zareh Baghdasarian and Vahid Parsi as inventors.

CROSS-REFERENCES TO RELATED APPLICATIONS

This application is a continuation-in-part of patent application Ser. No. 09/232,395, filed Jan. 15, 1999, now U.S. Pat. No. 6,724,757 and entitled "A CONFIGURABLE NETWORK ROUTER," having H. M. Zadikian, A. N. Saleh, J. C. Adler, Z. Baghdasarian, and V. Parsi inventors. This application is hereby incorporated by reference, in its entirety and for all purposes.

This application is related to patent application Ser. No. 09/232,397, filed Jan. 15, 1999, and entitled "A METHOD FOR ROUTING INFORMATION OVER A NETWORK," having A. N. Saleh, H. M. Zadikian, Z. Baghdasarian, and V. Parsi as inventors; and patent application Ser. No. 09/477,217, filed Jan. 4, 2000, and entitled "A METHOD AND APPARATUS FOR ISOLATING FAULTS IN A SWITCHING MATRIX," having R. A. Russell and M. K. Anthony as inventors. These relate applications are hereby incorporated by reference, in their entirety and for all purposes.

BACKGROUND OF THE INVENTION

1. Field of the Invention

This invention relates to the field of information networks, and more particularly relates to the management of resources in a router capable of routing information over a network.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, large communications systems have been built to provide the needed bandwidth. As a result, the equipment handling such traffic has become increasingly complex. Such systems commonly occupy multiple full-height telecommunications racks and contain a number of interdependent subsystems which must inter-operate seamlessly with one another. These systems may communicate with one another using one or more communications subsystems.

Moreover, the combination of voice and data communications has put new constraints on such systems. While both forms of service require maximum up-time, failures in the voice communications arena are particularly sensitive to failures that impact end users. In packet switched networks, failures are merely routed around and lost data resent. Unless the data is used in a time- or data-critical application (e.g., on-line banking, virtual private networks carrying digital video conferencing, or the like), this paradigm provides sufficient availability. However, certain applications (e.g., voice circuits used in telephony) are extremely sensitive to even relatively short breaks in service. This is due to the limits for acceptable downtimes mandated by certain of the applicable industry standards.

For example, the synchronous optical network (SONET) protocol is widely employed in voice and data communications networks. SONET is a physical transmission vehicle capable of transmission speeds in the multi-gigabit range. In the case of voice communications carried over a SONET network, the failure of a link or node can disrupt a large number of voice circuits. Moreover, for most telephony implementations, failures must be detected within about 10 ms and restoration must occur within about 50 ms (per Bellcore's recommendations in GR-253 (GR-253: *Synchronous Optical Network (SONET) Transport Systems*, Common Generic Criteria, Issue 2 [Bellcore, December 1995], included herein by reference, in its entirety and for all purposes)). The short restoration time is critical in supporting applications, such as current telephone networks, that are sensitive to quality of service (QoS) because such detection and restoration times prevent old digital terminals and switches from generating alarms (e.g., initiating Carrier Group Alarms (CGAs)). Such alarms are undesirable because they usually result in dropped calls, causing users down time and aggravation. Restoration times exceeding 10 seconds can lead to timeouts at higher protocol layers, while those that exceed 1 minute can lead to disastrous results for the entire network.

As can be seen, a network element in such environments must be able to quickly detect and address failures such as those discussed above. Systems capable of providing such functionality tend to be large and quite complex. Such systems typically contain a number of subsystems, both hardware and software. Such subsystems are tasked with providing a variety of functions in support of the communications system's administrative, communication and other features. Thus, the management of such communications systems, while obviously necessary, can prove challenging.

SUMMARY OF THE INVENTION

The present invention overcomes conventional limitations by including a resource management system in a network element that automates and simplifies the management of the numerous subsystems contained therein. Whether hardware or software, and irrespective of their functionality, such subsystems are referred to herein as resources. This aspect of the present invention employs a hierarchical management architecture that relies on data objects representing hardware (and, optionally, software) resources within the system.

According to one embodiment of the present invention, a method of managing a communications system is described. The method begins with the creation of a resource control block corresponding to a resource of the communications system. The communications system includes, for example, a processor and a resource coupled to the processor. The resource control block maintains information regarding the resource. The method also provides for the maintenance of the resource control block. The processor is configured to maintain the resource control block, and the resource control block is maintained by the processor in response to communications (e.g., a keep-alive message) between the processor and the resource. This embodiment can also include the creation of a processor resource control block corresponding to the processor that is created by the controller in response to a power-up message from the resource. The resource can be, for example, a hardware component of the communications system.

In one aspect of this embodiment, the resource control block is maintained by the controller in response to a reply from the resource generated in response to a protocol message sent by the controller. Further, the protocol employed in the communications with the resource may support, for example, protocol messages configured to cause one or more actions. The protocol can support interactions such as the initialization of the resource, causing the controller to download a command to the resource, causing the resource to execute the command, causing the resource to provide status information to the controller, and causing the resource to perform a self-test.

In another aspect of this embodiment, the resource is one of several resources, each of the resources being coupled to at least one other of the resources. In this aspect, the resources are arranged in a hierarchy having a number of levels. The given resource creates a resource control block for each one of the resources coupled thereto at a level below that of the given resource. Each of the resource control blocks can be maintained, for example, on a corresponding resource by a corresponding resource manager. In such an aspect, each resource manager can maintain a resource list. A resource list is a hierarchical list of resource control blocks that correspond to resources under the control of a resources corresponding to the resource manager.

According to another embodiment of the present invention, a resource management system for a communications system is described. Such a resource management system includes a system processor, a resource that is coupled to the system processor, a system resource manager and a resource control block. The system processor is configured to run the system resource manager, and the resource control block maintains information regarding the resource in the resource control block. The system processor is configured, for example, to maintain the resource control block in response to communications between the processor and the resource.

In one aspect of this embodiment, the resource is one of a first group of resources, where each one of the first group of resources is coupled to the system processor. In this aspect, the resource control block is one of a first group of resource control blocks, and each one of the first group of resource control blocks is stored on a corresponding one of the first group of resources.

In a further aspect of this embodiment, a second group of resources is defined. At least one of the second group of resources is coupled to the each one of the first group of resources, with each resource in the first group of resources including a resource processor. A group of resource managers can also be defined, with each resource processor of the first group of resources being configured to run a corresponding one of the first group of resource managers. Also included in this aspect is a second group of resource control blocks. Each one of the second group of resource control blocks maintains, for example, information regarding the status of one of the second group of resources. Each one of the first group of resources can be configured to maintain one of the second group of resource control blocks corresponding to a given one of the second group of resources.

According to yet another embodiment of the present invention, a resource management system is described. The resource management system provides for the management of a communications system, which may include a processor communicatively coupled to a resource that is to be managed, for example. The resource management system includes a resource manager. The system processor is configured to execute the resource manager and to create a resource control block. The resource control block is configured to store information regarding the resource. The resource manager is configured to maintain the resource control block.

In the case where the resource is of one resource type of a number of such resource types, a resource control block can include both generic and resource-specific sections. Such a generic section contains information applicable to a number of the resource types, while the resource-specific section contains information applicable to the one resource type. The resource being managed may be, for example, a hardware component or a software module of the communications system.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

In addition, the following detailed description has been divided into sections, subsections, and so on, in order to highlight the various subsystems of the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

Figure 1A:
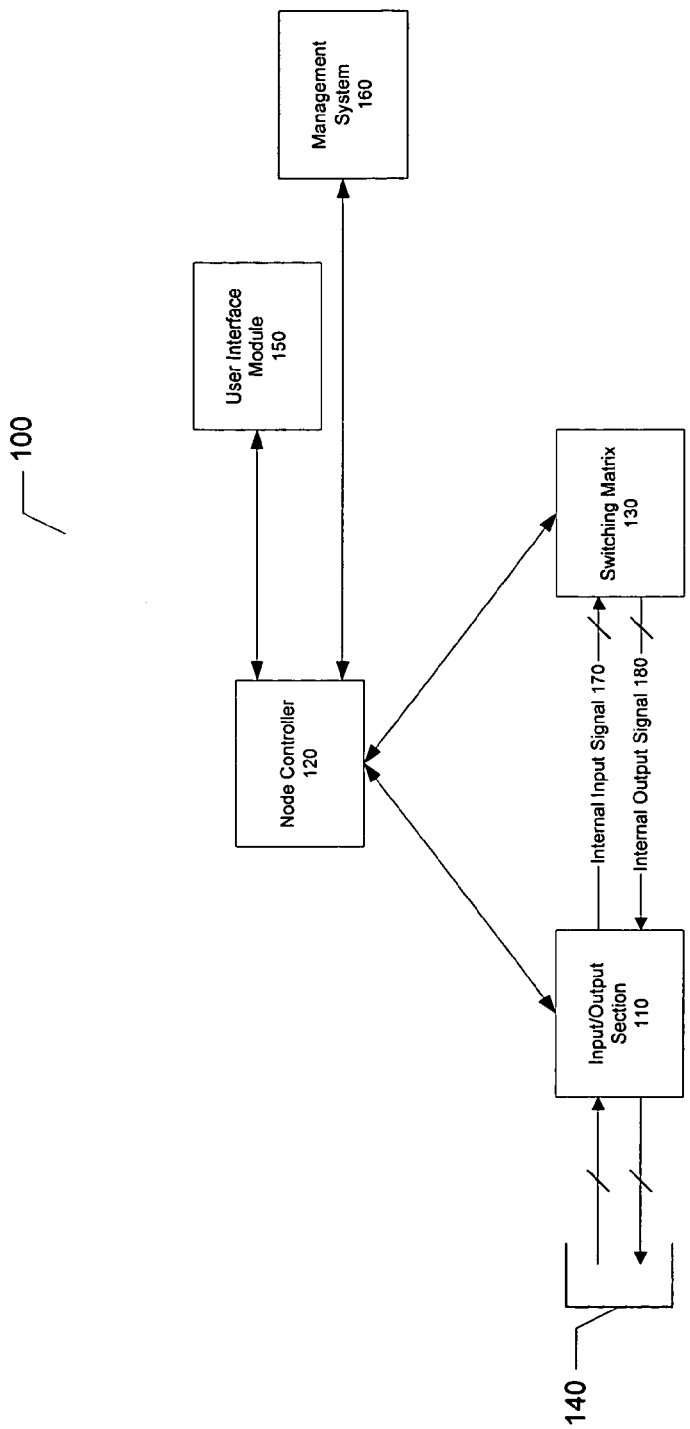
FIG. 1A is a block diagram of an exemplary router.
Figure 1B:
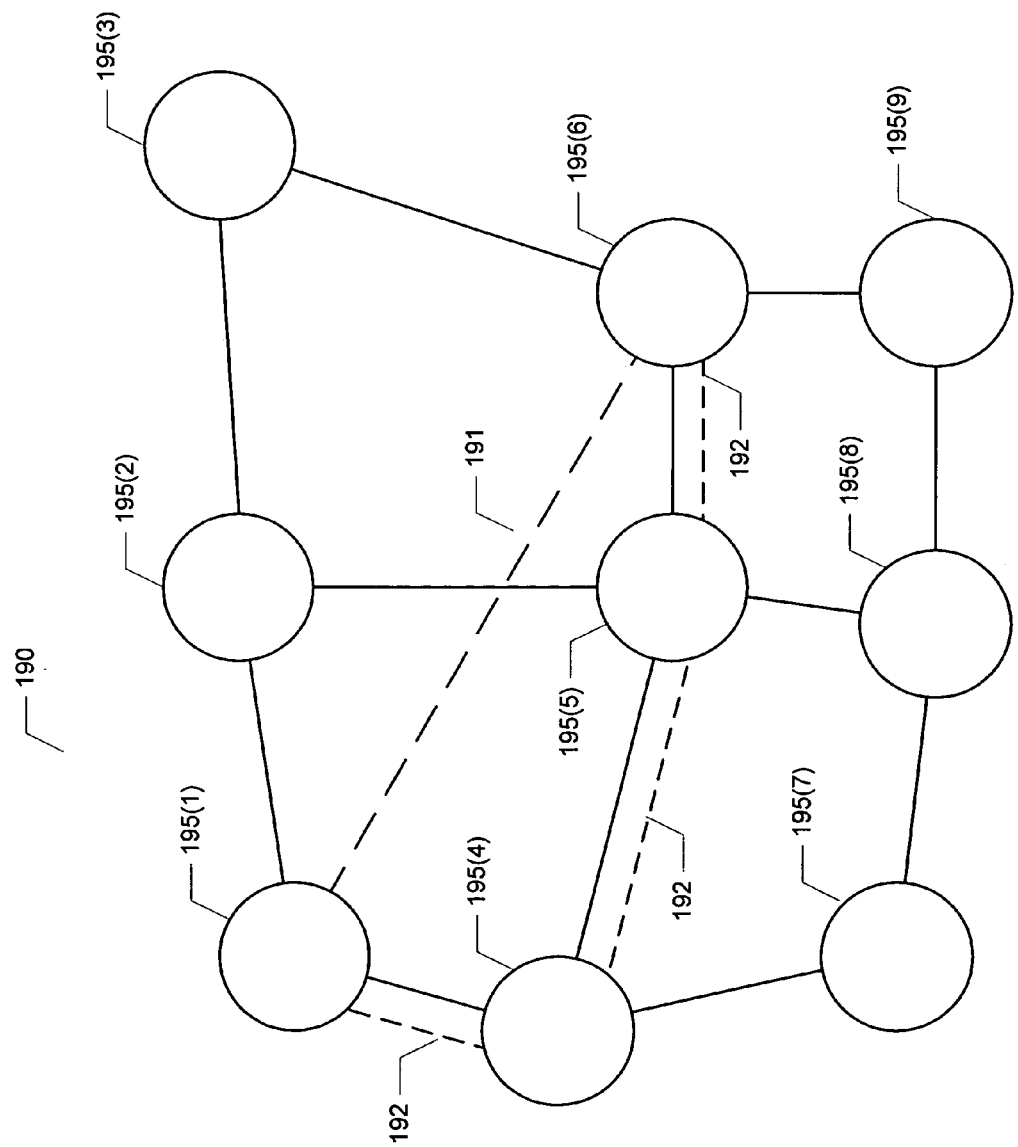
FIG. 1B is a block diagram of a network including a number of the routers of FIG. 1A.

FIG. 1A illustrates a router 100. Router 100 includes an input/output section 110, a node controller 120, and a switching matrix 130. Node controller 120 contains, for example, real time software and intelligent routing protocols (not shown). Router wavelength 100 supports interfaces including, but not limited to, optical signal interfaces (e.g., SONET), a user interface module 150, and a management system 160. Internal input signals 170 and internal output signals 180 may be electrical or optical in nature. FIG. 1B illustrates a network 190 that includes a number of nodes, network nodes 195(1)-(N). One or more of network nodes 195(1)-(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)-(N) to another of network nodes 195(1)-(N).

Among other benefits, router 100 solves three growth-related problems often encountered in today's information networks, and particularly in SONET networks:

1. Port Capacity growth: Router 100 includes, for example, a scaleable architecture which can provide a large number of ports at a relatively low cost and high density.
2. Bandwidth management: The distributed management architecture of one embodiment of exemplary router 100 allows some or all nodes in the network to be managed from a single workstation. Provisioning a new connection is easily accomplished by selecting the source and destination nodes and specifying the desired quality of service (QoS). Provisioning can take into consideration parameters such as existing trunk allocations, network status, the priority and desired quality of the new connection, and other such criteria.
3. Efficient and fast restoration: Exemplary network 190 preferably uses a mesh topology. Through the use of the routers 100, the network can be more efficient than existing ring topologies, especially when connections span multiple rings. This is possible because a single spare connection in a mesh network can provide protection for several different possible span cusps. In a ring-based network, however, spares can typically only protect against failures on their own ring. Furthermore, when connections span multiple rings, "dedicated" spare bandwidth must typically be allocated on every ring along the path. No other connections can share this spare bandwidth. One embodiment of router 100 supports the restoration of a majority of network failures within less than 50 ms, thus eliminating an advantage that rings generally have over mesh topologies: fast restoration time. A protocol, such as that according to the related patent application entitled "A METHOD FOR ROUTING INFORMATION OVER A NETWORK" (as previously referenced) can be run on such a router and encompasses all aspects of the restoration process: alarm gathering, path implementation (including alternate path discovery), and path assurance. In cases where there is insufficient bandwidth to satisfy all failed connections, the protocol, in one embodiment, uses a quality of service (QoS) metric to prioritize the restoration sequence. In such embodiment, connections with the highest QoS are restored first, followed, in a descending order, by those with a lower QoS, until either all connections have been restored or all available bandwidth has been used.

Router 100 is a multi-rack, fully redundant router that, in one embodiment, supports at least 256, 1+1 I/O ports, and provides 1-plus-1 protection by using multiple copies (e.g., two or more) of group and main matrices operating in 1+1 mode. Failures within one copy of a given matrix do not require a complete switchover to the backup copy. Only the affected paths through the matrix are switched to the backup copy. This greatly improves switching speed and minimizes the impact of such redundancy on other connections. Preferably, the group matrix is a 2:1 reduction stage that selects output signals from one of two line cards (also referred to herein as I/O modules, due to their functionality) and connects the selected output signals to the main matrix, thus preventing non-working antecedent from consuming any ports on the main matrix.

In one embodiment, there are at least three types of processors in a router 100. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 is a multi-rack communications system capable of terminating at least 8192 signals and cross-connecting at least 4096 OC-48 signals. Such a router can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N).

Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
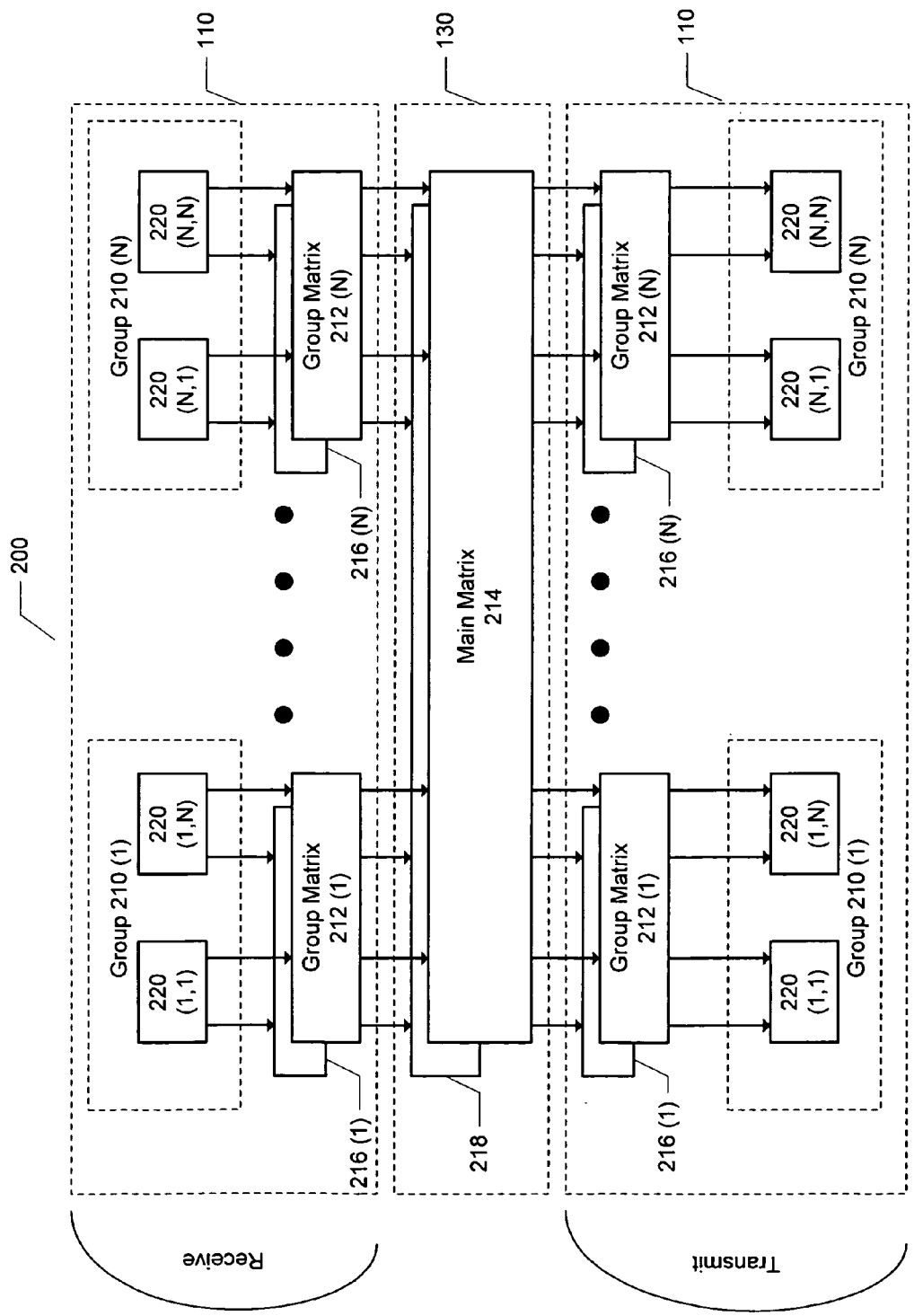
FIG. 2 is a block diagram of the signal paths and functional blocks of the router of FIG. 1A.

FIG. 2 is a block diagram of signal paths 200 within router 100. The primary signal paths in router 100 include one or more groups exemplified by groups 210(1)-(N), group matrices 212(1)-(N), and a main matrix 214. As depicted in FIG. 1A, groups 210(1)-(N), and group matrices 212(1)-(N) are shown as having receive and transmit sections. Groups 210(1)-(N) each include line cards 220(1,1)-(1,N), through line cards 220(N,1)-(N,N). Signals from line cards 220(1,1)-(N,N) are sent to the corresponding group matrix. In one embodiment, two sets of the group matrix cards, group matrices 212(1)-(N) and group matrices 216(1)-(N) are employed. Main matrix 214 is also mirrored in one embodiment by a redundant copy, a backup main matrix 218, which together form switching matrix 130. As shown in FIG. 2, the redundancy for group matrices 212(1)-(N) (i.e. group matrices 216(1)-(N)), is also provided on the transmit side.

NOTE: The variable identifier "N" is used in several instances in FIG. 2 (and subsequent use of other variables, such as "m," "x," "k," and others) to more simply designate the final element (e.g., group matrix 212(N), line card 220(N,N), and so on) of a series of related or similar elements (e.g., group matrices 212(1)-(N), line cards 220(1,1)-(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)-(N,N). It is at this point, in a SONET-based system, the Section and Line overheads are processed and stripped off by a protocol processor (not shown). The extracted SONET/SDH payload envelope is then synchronized with the system clock and sent to two different copies of a local matrix, depicted as group matrices 212(1)-(N) and 216(1)-(N) in FIG. 1A. In one embodiment, group matrices 212(1)-(N) and 216(1)-(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)-(N) and 216(1)-(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×16 switching elements that allow any of their inputs to be connected to any of their outputs. Also, preferably a single copy of the matrix is housed in a single rack that contains three shelves, one for each column (or stage) of the matrix. Each shelf contains cards housing the 16 switching elements in each stage. The switching element itself may include, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors using, for example, a redundant Ethernet connection.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits it into two signals. One of the signals is sent to an active line card, while the other, when available, is sent to a backup card.

Line cards 220(1,1)-(N,N) receive optical signals from group matrices 212(1)-(N) and 216 (1)-(N) which are in turn connected to two separate copies of the main matrix. Line cards 220(1,1)-(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)-(N,N) to select between the two copies of the group matrix without any level-1 or level-2 CPU intervention. This helps to ensure that such a switch can be made in 50 ms or less (per Bellcore's recommendations in GR-253 (GR-253: *Synchronous Optical Network (SONET) Transport Systems*, Common Generic Criteria, Issue 2 [Bellcore, December 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
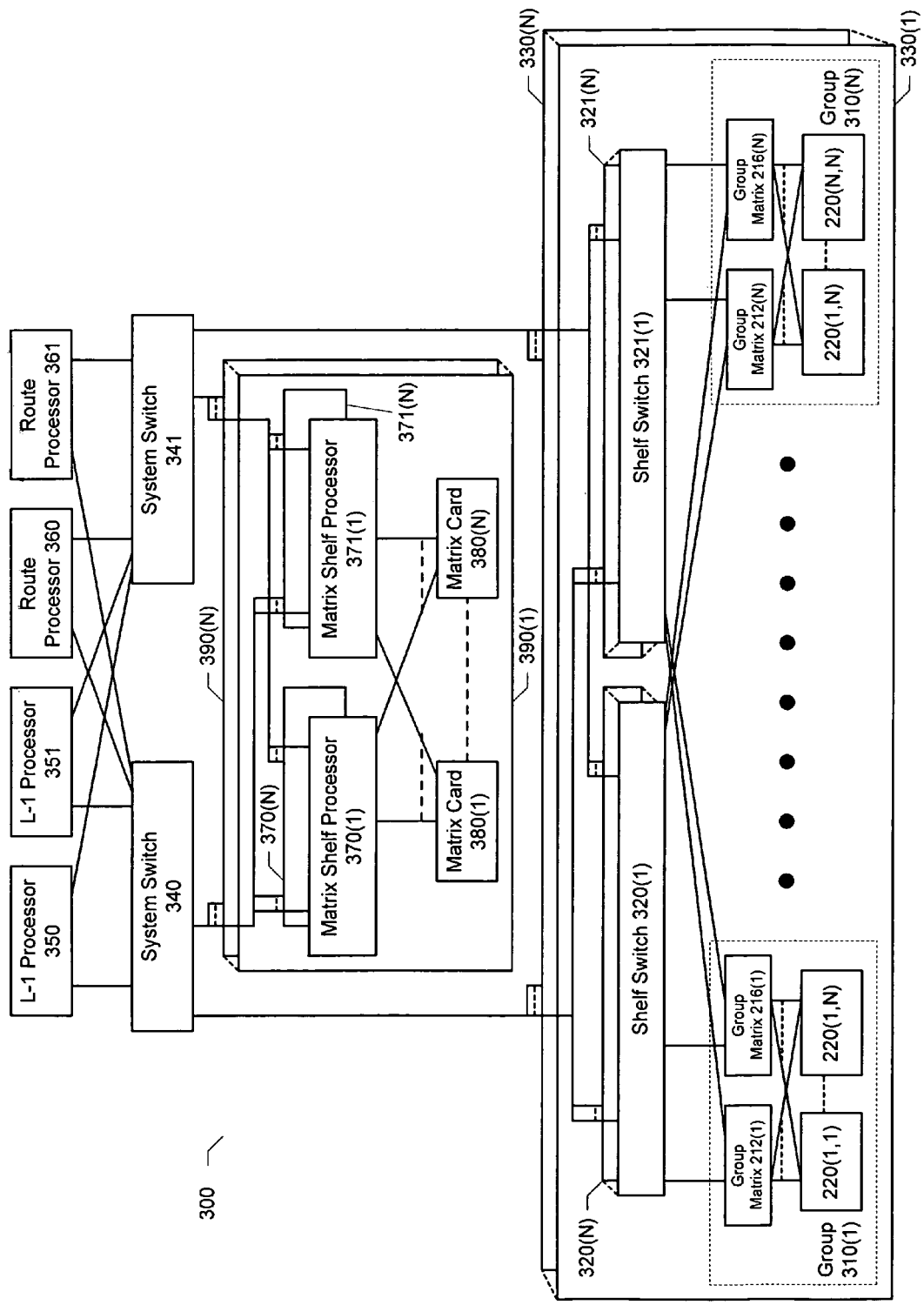
FIG. 3 is a block diagram of the control paths of the router of FIG. 1A.

FIG. 3 illustrates a control path 300 of a router, such as router 100. Control path 300 includes all non-payload-related flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)-(N) and 216(1)-(N). Each one of group matrices 212(1)-(N) and 216(1)-(N), also referred to herein as a hub, a repeater, or concentrator, is a physical layer device and preferably supports a star network topology, such as the IEEE 802.3 10BASE-T networking standard. The redundant connections from line cards 220(1,1)-(N,N) in each of groups 310(1)-(N) are connected to two repeaters that reside on two separate copies of the group matrix module. Preferably, each one of line cards 220(1,1)-(N,N) supports two network ports (e.g., 10BASE-T Ethernet ports). The two sets of four signals from each port pass through a relay that selects one of them for connection to the LAN for purposes of redundancy. Groups 310(1)-(N) represent the first layer of the control bus hierarchy. Group matrices 212(1)-(N) and 216(1)-(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1)-(N) and 321(1)-(N), and groups 310(1)-(N). Groups 310(1)-(N) are again shown, with regard to the control functions thereof. In this depiction of groups 310(1)-(N), line cards 220(1,1)-(N,N) are shown as being attached to networking devices, indicated here as group matrices. Group matrices 212(1)-(N) and 216(1)-(N) may be, for example, multi-port Ethernet hubs running at 10 Mbps. Each of line cards 220(1,1)-(N,N) feed signals into two of group matrices 212(1)-(N) and 216(1)-(N). For example, line card 220(1,1) feeds received information to group matrix 212(1) and group matrix 216(1). Group matrices 212(1)-(N) and 216(1)-(N) each feed a signal into shelf switches 320(1)-(N) and 321(1)-(N) of FIG. 2. Shelf switches 320(1)-(N) and 321(1)-(N) are each controlled by a shelf processor (not shown for the sake of clarity) and communicate with one of the system switches (not shown, for the sake of clarity).

Shelf switches 320(1)-(N) and 321(1)-(N) are the next higher level of the control hierarchy in router 100, and are located on the shelf processor module (exemplified by line racks (330(1)-(N)). Each copy of shelf switches 320(1)-(N) and 321(1)-(N) interconnects six connections from the three groups in each shelf, another connection from the shelf processor, and one connection from system switch 340 (and 341). Shelf switches 320(1)-(N) and 321(1)-(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1)-(N) and 321(1)-(N);
2. High-speed connection(s) to higher-level processors (e.g., redundant level-1 processors 350 and 351, and redundant route processors 360 and 361); and
3. High-speed connection(s) to matrix shelf processors 370(1)-(N) and 371(1)-(N) which, in turn, control matrix cards 380(1,1)-(1,N)), located in main matrix racks 390(1)-(N).

It will be noted that main matrix 214 includes matrix cards 380(1,1)-(1,N), and that, more generally, main matrices 214 and 218 are included matrix racks 390(1)-(N)

System switches 340 and 341 are located in a management bay. As noted, the fully redundant switches manage connections from various router elements, such as I/O and matrix bays, node controllers (i.e., level-1 processors 350 and 351), and route processors (i.e., route processors 360 and 361). Each of level-1 processors 350 and 351 and route processors 360 and 361 is preferably connected to system switches 340 and 341 using 100 Mbps Ethernet connections in a configuration that creates an expandable, efficient, and fully redundant control bus.

Physical Configurations and Modules

I/O Bay

An I/O bay can support, for example, a total of 16 slots. Slots may be logically divided into functional groups. In such an embodiment, four such functional groups are defined with three of the groups occupying five slots each. In that embodiment, the other group, which occupies a single slot can be configured to house the shelf processor. Thus, the I/O bay can contain line cards and group matrices which are controlled by shelf processors. These elements are exemplary of line cards 220 (1,1)-(N-N), group matrices 212 (1)-(N) and 216 (1)(N), shelf processors 320 (1)-(N) and 321(1)-(N), and shelf switches 440(1)-(N). It will be noted that the various line cards, group matrices, and shelf processors correspond to similar elements from previous figures.

Groups and Magazines

A group is made up of line cards occupying a number of slots on a shelf. A slot is also referred to herein as a magazine In one implementation, the group is 20 line cards that occupy five slots. Four of the slots hold, for example, 16 line cards at 4 per slot. The same slot can be used with a wide variety of line cards and in various configurations. This architecture provides flexibility to allow any combination of line cards to be installed in each slot.

The fifth slot in the aforementioned embodiment can be configured to accept line cards containing an optical switching matrix and a hub (e.g., an Ethernet hub). Preferably, two group matrix cards are employed, each containing a 2:1 optical reduction stage that "selects" working channels before the signals leave the shelf. In a 1+1 protection scheme, the two inputs to the line cards are classified as active and protect channels. The working channel is one of the active and protect channels that is selected based on bit error rate or other criteria, and so implements a redundancy scheme. This prevents the standby line cards from using any bandwidth on switching matrix 130.

Backplane

The following describes one embodiment of a backplane and some of the interface signals on that backplane. The backplane in the I/O bay shelf carries a variety of signals between line cards and other modules in the shelf. Each I/O shelf module is configured to allow an automatic, errorless switch from one power bus to the other.

Shelf processor module backplane signals include reset signals, clock signals, hardware detect signals (e.g., card detect, copy present, and the like), slot ID signals, and slot communication signals (both low and high speed). Line card backplane signals include reset signals, clock signals, communication signals, hardware detect signals, and slot ID signals. Group matrix module backplane signals include reset, clock signals, communication signals (both low and high speed), detection and hardware detect signals, and slot ID signals.

System Modules

Line Card

Figure 4:
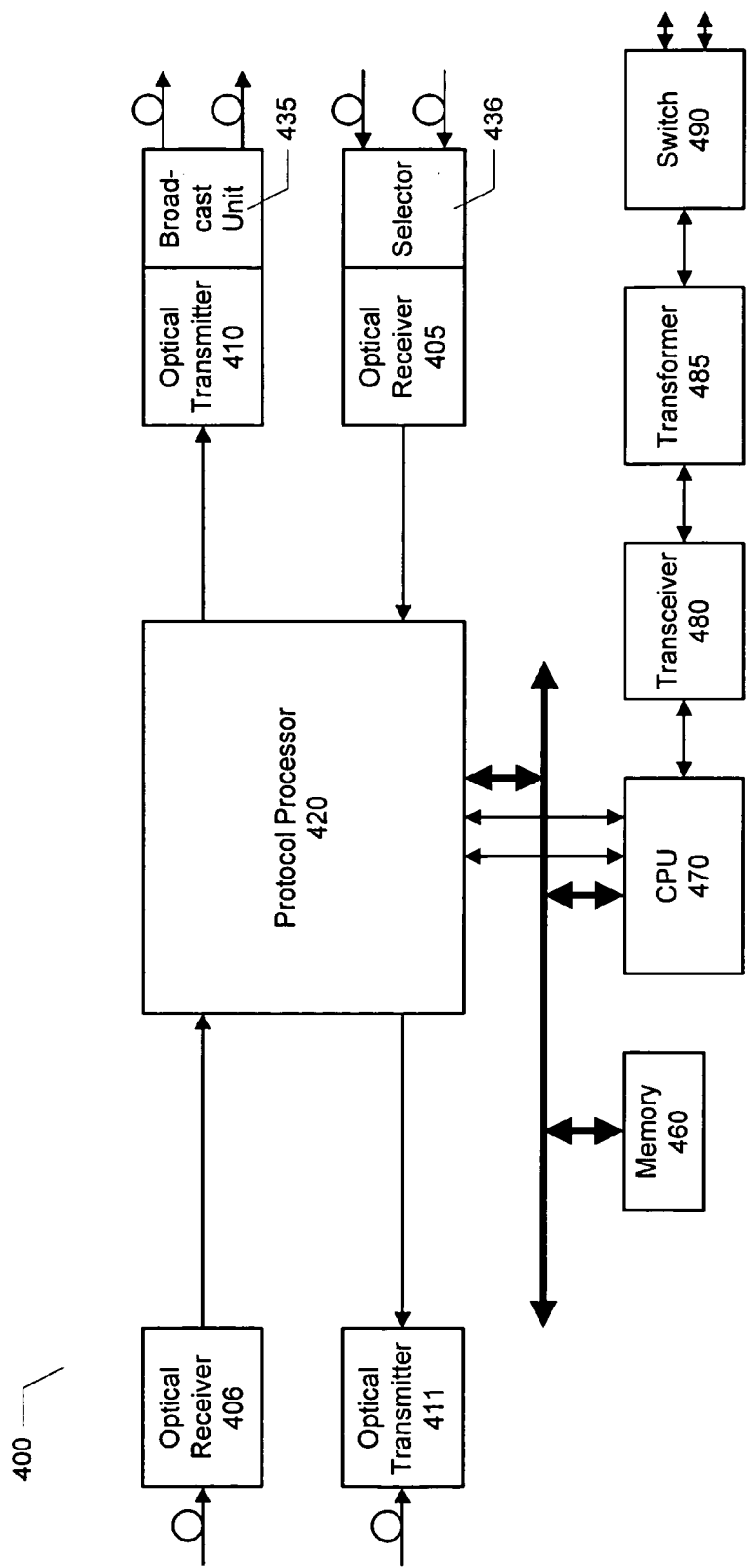
FIG. 4 illustrates the major components of one of the line cards.

FIG. 4 illustrates the major components of one of line cards 220(1,1)-(N,N), exemplified in FIG. 4 by a line card 400. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 405 is coupled to a protocol processor 420 which performs clock recovery multiplexing, demultiplexing, and SONET STE/LTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, line-side optical transmitter 410 is also coupled to a 1:2 broadcast unit 435. To receive such optical signals, optical receiver 406 is also coupled to a 2:1 selector 436 in order to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards. Also coupled to bus 445 are a memory 460 and a CPU 470. Memory 460 should be fast enough for efficient operation of CPU 470.

CPU 470 communicates with other of line cards 220(1,1)-(N,N) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when it detects failures on the active link.

Preferably, CPU 470 includes numerous integrated peripherals including embedded SCC channels (e.g. M-band communications) and an Ethernet controller (for example, to support communications with other system modules). In one embodiment, CPU 470 provides an onboard communications processor module (not shown) that handles time-critical aspects of the protocols supported.

Group Matrix Module

The group matrix module includes two independent blocks: a group matrix and a hub (also referred to herein as a repeater).

Group Matrix

Figure 5:
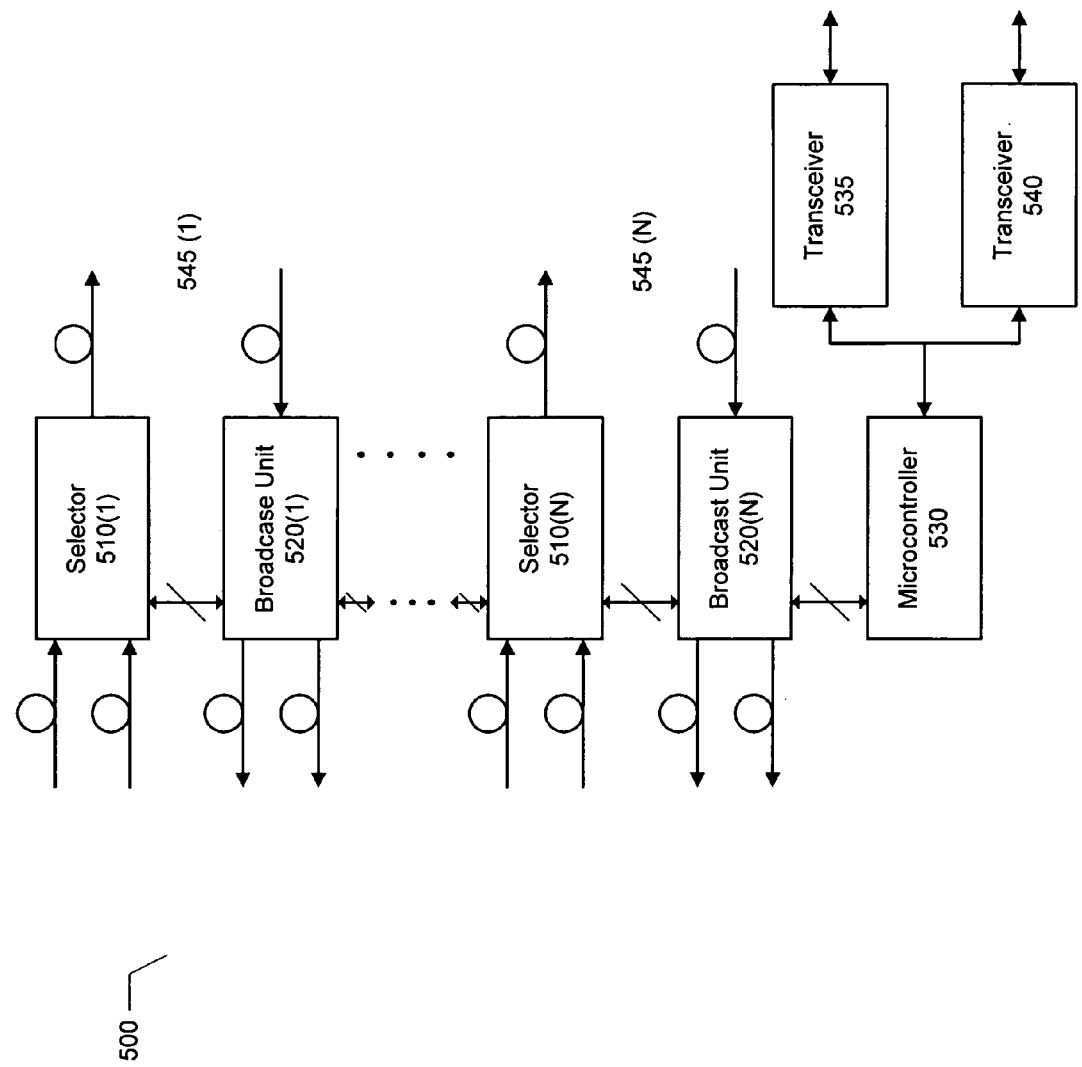
FIG. 5. illustrates an exemplary group matrix.

FIG. 5. illustrates an exemplary group matrix 500, which is exemplary of group matrices 212(1)-(N) and group matrices 216(1)-(N). In the embodiment shown in FIG. 5, group matrix 500 includes a series of 2:1 path selectors (exemplified by selectors 510(1)-(N)), broadcast units 520(1)-(N), and a microcontroller 530 controlling these. Selectors 510(1)-(N) select one of two full-duplex optical signals and couple the selected signal to switching matrix 130. Selectors 510(1)-(N) and broadcast units 520(1)-(N) are grouped into pairs to form I/O channels 545(1)-(N). Microcontroller 530 communicates with other elements of router 100 via redundant transceivers (exemplified by transceivers 535 and 540). For example, microcontroller 530 can control selectors 510(1)-(N) and broadcast units 520(1)-(N) through commands received from the group processor.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

The shelf processor module provides, among other elements, a shelf processor and switch that interconnect the LAN segments from the groups and the shelf processor to a port on the shelf switch (Ethernet switch 630).

Shelf Processor

Figure 6:
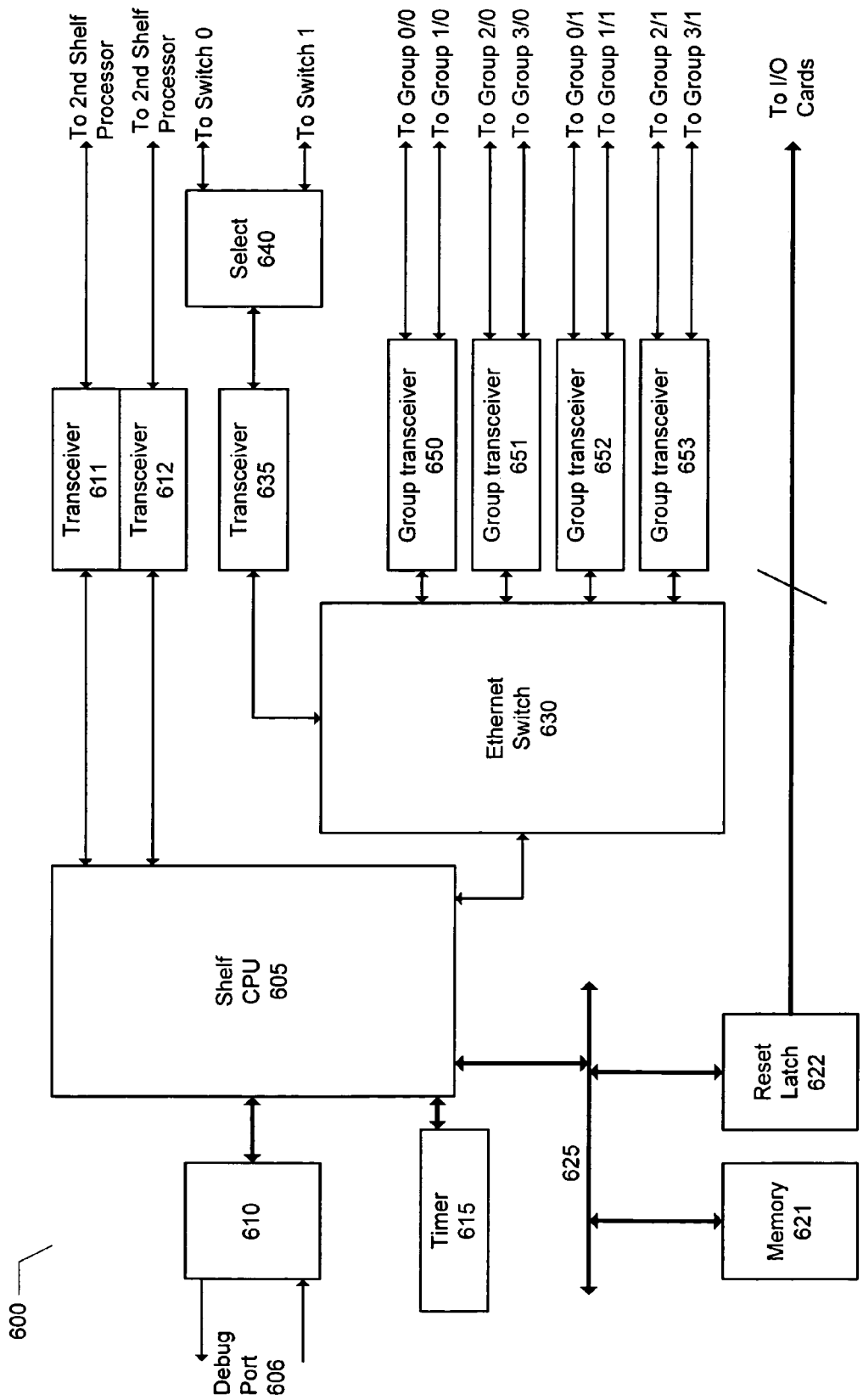
FIG. 6 illustrates a shelf processor which is responsible for the overall operation, management and control of a shelf.

FIG. 6 illustrates a shelf processor 600 which is responsible for the overall operation, management, and control of the shelf. A shelf CPU 605 controls the functions of shelf processor 600. Shelf CPU 605 is connected to a debug port 607 via a debug port transceiver 610. Debug port 607 may be a device capable of coupling shelf CPU 605 to a personal computer or dumb terminal. Debug port 607 allows a user to access shelf processor module 600 to determine the cause of any errors therein. Transceivers 611 and 612 each connect an SCC channel of shelf CPU 605 to the other shelf processor. The resulting link, which can use high-speed asynchronous framing, serves as an inter-processor communications interface.

Shelf CPU 605 is also connected to a timer 615, which preferably contains the following three functional blocks:

1. Power-fail-reset
2. External reset
3. Timer

Shelf CPU 605 also accesses a memory 621 and a reset latch 622 over a CPU bus 625. Reset latch 622 supports reset of one or more cards (not shown). Shelf CPU 605 is also coupled to an Ethernet switch 630. The network switch interconnects the lower speed inter-processor communication network segments in each shelf. In one embodiment, the network switch provides support for 10 Mbps and 100 Mbps segments. In one embodiment, an integrated bus master and slave interface allow multiple devices to be interconnected.

Ethernet switch 630 is coupled to a transceiver 635 which, via a select 640, allows Ethernet switch 630 to connect to two separate Ethernet segments. Select 640 implements a 1:1 protection scheme that allows shelf processor 600 to recover from failures on the active segment by simply switching to the other segment. Ethernet switch 630 is also coupled to one or more group transceivers (exemplified by group transceivers 650, 651, 652, and 653). Group transceivers 650, 651, 652, and 653 connect ports on Ethernet switch 630 to the groups.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Main Matrix Bay

A switching in router 100 is based on a rearrangeably non-blocking network. A switching matrix, as described herein consists of switch nodes arranged in a staged array. For a 256×256 switching matrix, for example, switching matrix 130 consists of 48 nodes arranged in an array of 16 rows by 3 columns, with each column containing one stage of the switch matrix. All 48 nodes in the switch matrix are substantially similar and consist of a 16×16 crossbar device that allows any of its 16 inputs to be connected to any of its 16 outputs, regardless of the current state of the crossbar.

Main Matrix

Figure 7:
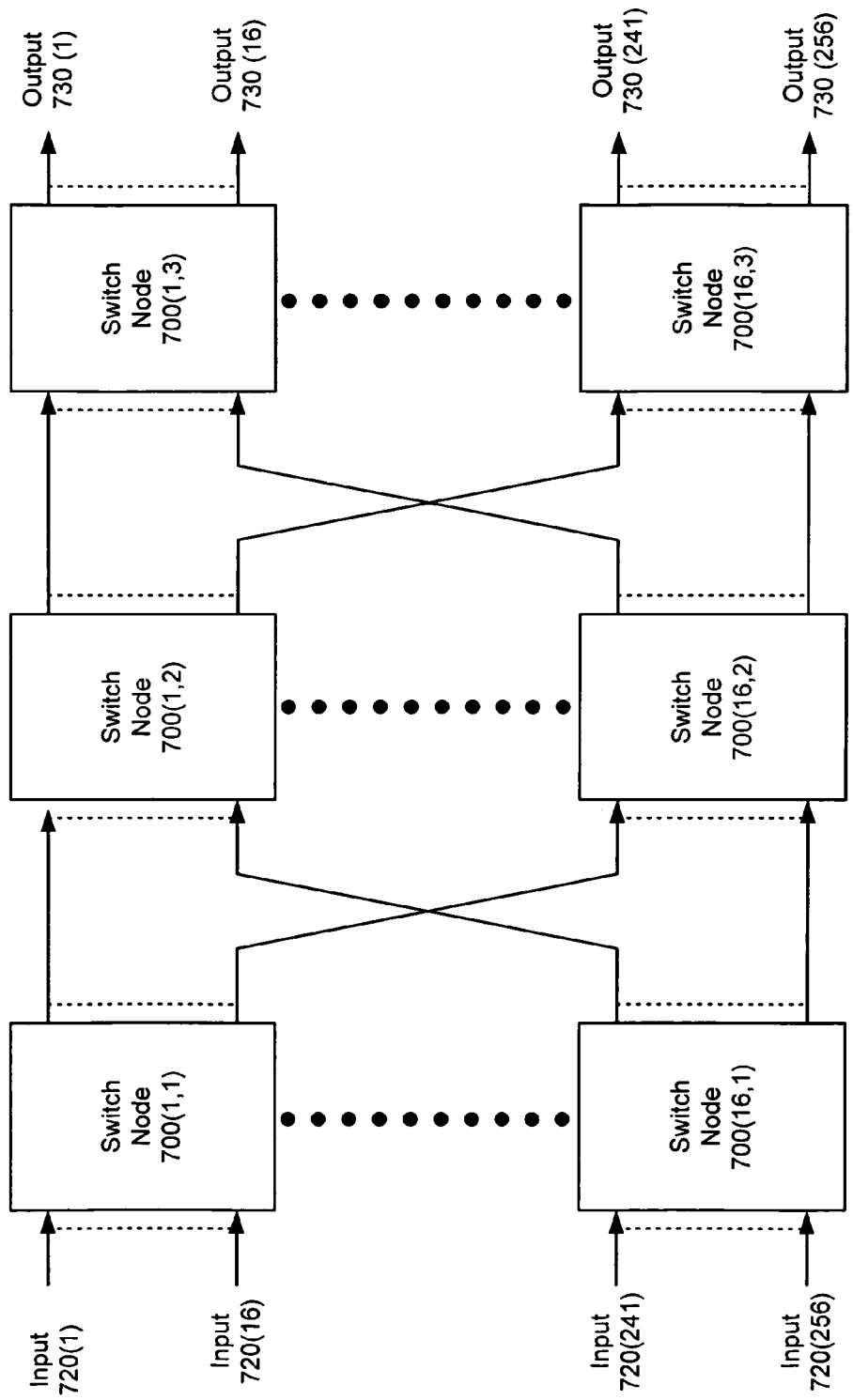
FIG. 7 illustrates the structure of a multistage matrix.

FIG. 7 illustrates switching matrix 130 configured in the manner of the switch matrix just described. In one embodiment, switching matrix 130 employs a 256×256 matrix, an array of switching nodes 700(1,1)-(16,3), each of which is a 16×16 crossbar switch that allows any of the 16 input signals to be connected to any of its 16 outputs, regardless of the current state of the crossbar. In one environment, each of the interconnections between switching nodes 700(1,1)-(16,3) represent dual gigabit interconnections. As noted, the embodiment illustrated in FIG. 8 supports the switching of up to 256 inputs, shown as inputs 720(1)-(256). Inputs 720(1)-(256) are switched to one of outputs 730(1)-(256). Physically, each of the 48 switching nodes of this embodiment occupies a single slot in the matrix rack. The rack itself is made up of three shelves (one per matrix column) that house the switch node cards (there are 16 such cards in every shelf) and six-shelf-processor cards (two per shelf).

Matrix Rack

A rack is used to hold one or more matrices, and is referred to herein as a matrix rack. In one embodiment, a matrix rack is configured to hold 48 switching nodes (e.g., switching nodes 700(1,1)-(16,3)) in a compact physical configuration. The matrix rack can support, for example, switching nodes 700(1,1)-(16,3), each of which provide 16 input signals and 16 output signals, and thus provides switching matrix 130 with 256 input signals and 256 output signals. Matrix shelf processors are configured in redundant pairs to provide fault-tolerant control of switch nodes a 700(1,1)-(16,3).

The cross-connect information, i.e. input-to-output mapping, is written into the crosspoint switch by a local microcontroller which receives it from the local shelf processor over a high-speed connection. The three shelf processors in each rack receive such information from the node controller, which resides in a different rack. This hierarchy can be extended indefinitely. The crosspoint switch receives a high speed serial data from the optical receivers that perform optical-to-electrical conversion on the received optical signals. Data from the crosspoint switch is re-timed to synchronize the data with the system clock of router 100, using a clock and data recovery (CDR) unit, before being converted back into an optical signal that connects to the next stage of the matrix over fiber-optic cables.

Switch Node Module

Figure 8:
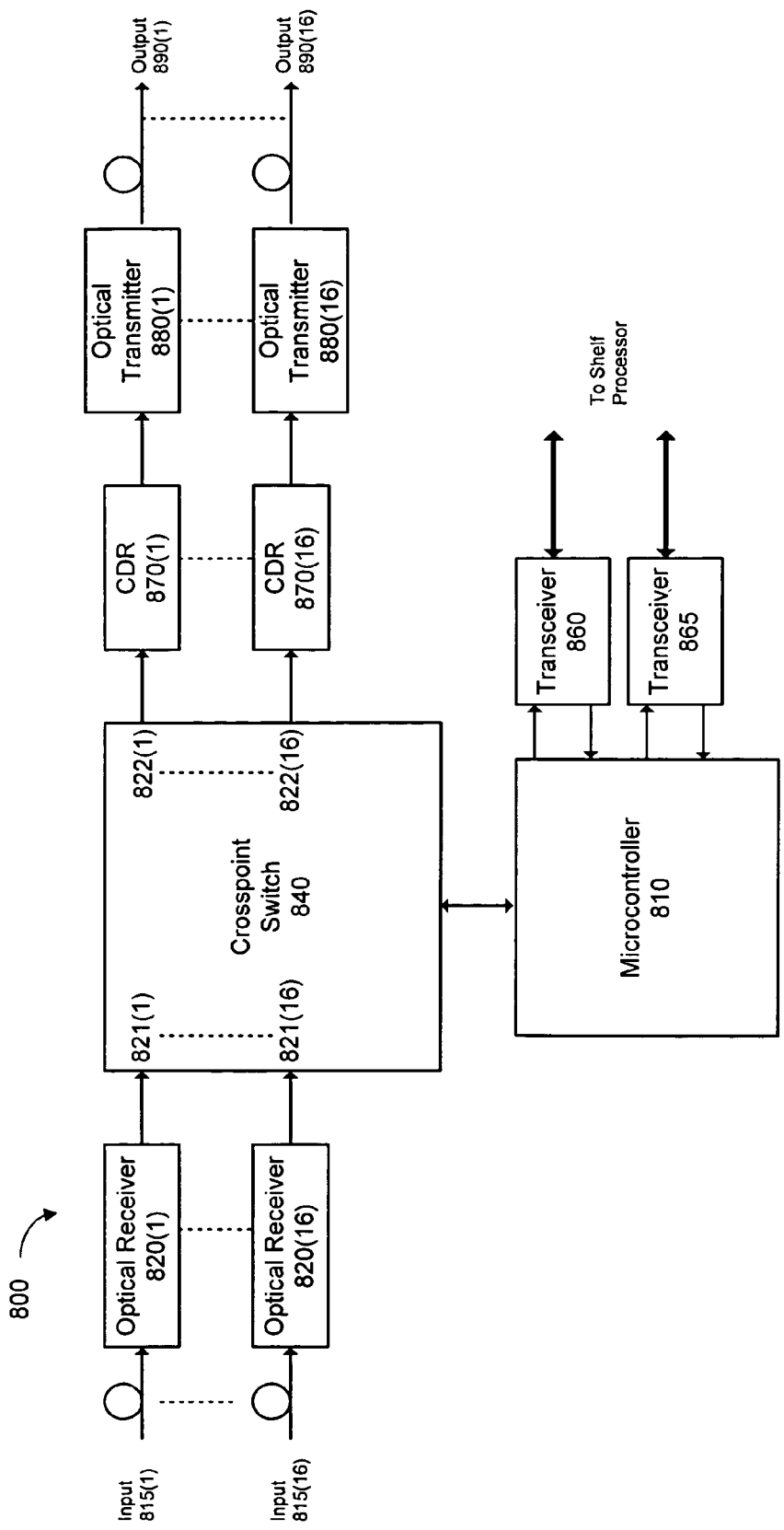
FIG. 8 illustrates one of the switching nodes.

FIG. 8 illustrates one of switching nodes 700(1,1)-(16,3) as a switching node 800. Switching node 800, in one embodiment, is a complete, strictly non-blocking, 16×16 OC-48 multi-stage crossbar matrix which allows any of its inputs to be connected to any of its outputs regardless of the current state of the matrix. A crosspoint switch 810 is controlled by a local microcontroller (a microcontroller 840) that also manages the optical transceivers, CDRs, and onboard SONET device. Configuration for switch node 800 is downloaded from microcontroller 840 over a low-speed bus.

The block diagram of switch node 800 in FIG. 8 illustrates the main elements of a switch node using a SONET-based implementation. The core of the switch node 800 is crosspoint switch 810, which is a 16×16 crossbar switch when implementing a 256×256 matrix. Crosspoint switch 810 is preferably a 2.5 Gbps 16×16 differential crosspoint switch with full broadcast capability. Any of its input signals can be connected to any, or all, of its output signals. The device is configured through a low-speed port that, through a two-step/two-stage process, allows changes to be made to switch configuration without disturbing its operation.

Assuming 16 input signals (indicated in FIG. 8 as inputs 815(1)-(16)), crosspoint switch 810 is configured to receive optical input signals from optical receivers 820(1)-(16) at switch input signals 821(1)-(16). Crosspoint switch 810 also provides switch outputs 822(1)-(16), which serve as the source of optical output signals for switch node 800. Microcontroller 840 is also responsible for detecting and reporting loss-of-signal (LOS) and out-of-lock (OOL) conditions from the optical receivers and CDRs, respectively. Microcontroller 840 communicates with the shelf processor via transceivers 860 and 865 over a bus that carries asynchronous data over a backplane (not shown).

Incoming signals are routed to one of switch outputs 822(1)-(16) by crosspoint switch 810 under the control of microcontroller 840. Switch outputs 822(1)-(16) are coupled to CDRs 870(1)-(16), which in turn drive optical transmitters 880(1)-(16). Output signals from optical transmitters 880(1)-(16) appear at outputs 890(1)-(16) as optical signals.

Matrix Shelf Processor Module

Matrix shelf processor 900 module provides local control and management for one of the main-matrix shelves. The matrix shelf processor 900 communicates with the level-1 and route processors over a low speed network connection and with the matrix node cards over a multi-drop, low-speed bus.

Figure 9:
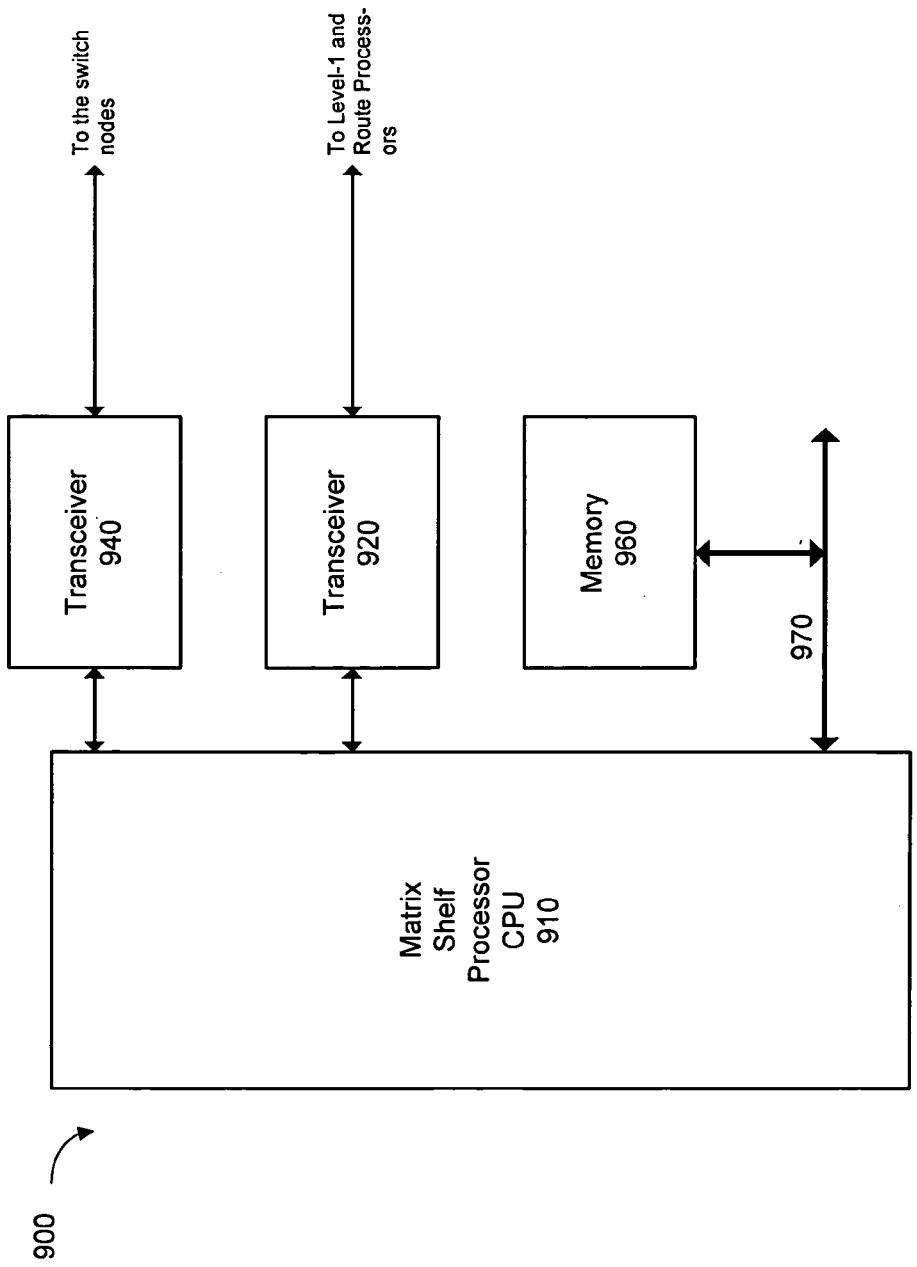
FIG. 9 illustrates a matrix shelf processor.

FIG. 9 illustrates a matrix shelf processor 900, which is illustrative of a matrix shelf processors and shelf processor 600 of FIG. 6. Matrix shelf processor 900 provides local control and management for one of the shelves of a main matrix such as switching matrix 130 (FIG. 1). The core of matrix shelf processor 900 is a matrix shelf processor CPU 910. Matrix shelf processor CPU 910 communicates with one or more level-1 processors (not shown) and route processors (not shown) via a transceiver 920 (preferably a 10BASE-T transceiver). Matrix shelf processor CPU 910 communicates with the system switches (i.e., system switches 340 and 341) via a transceiver 940. To support these functions, matrix shelf processor CPU 910 is coupled via a processor bus 970 to memory 960 which provides storage for various software modules run by matrix shelf processor CPU 910.

Management Bay

The management bay can house, for example, the following modules:

1. Level-1 processors, or system controllers, and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

Figure 10:
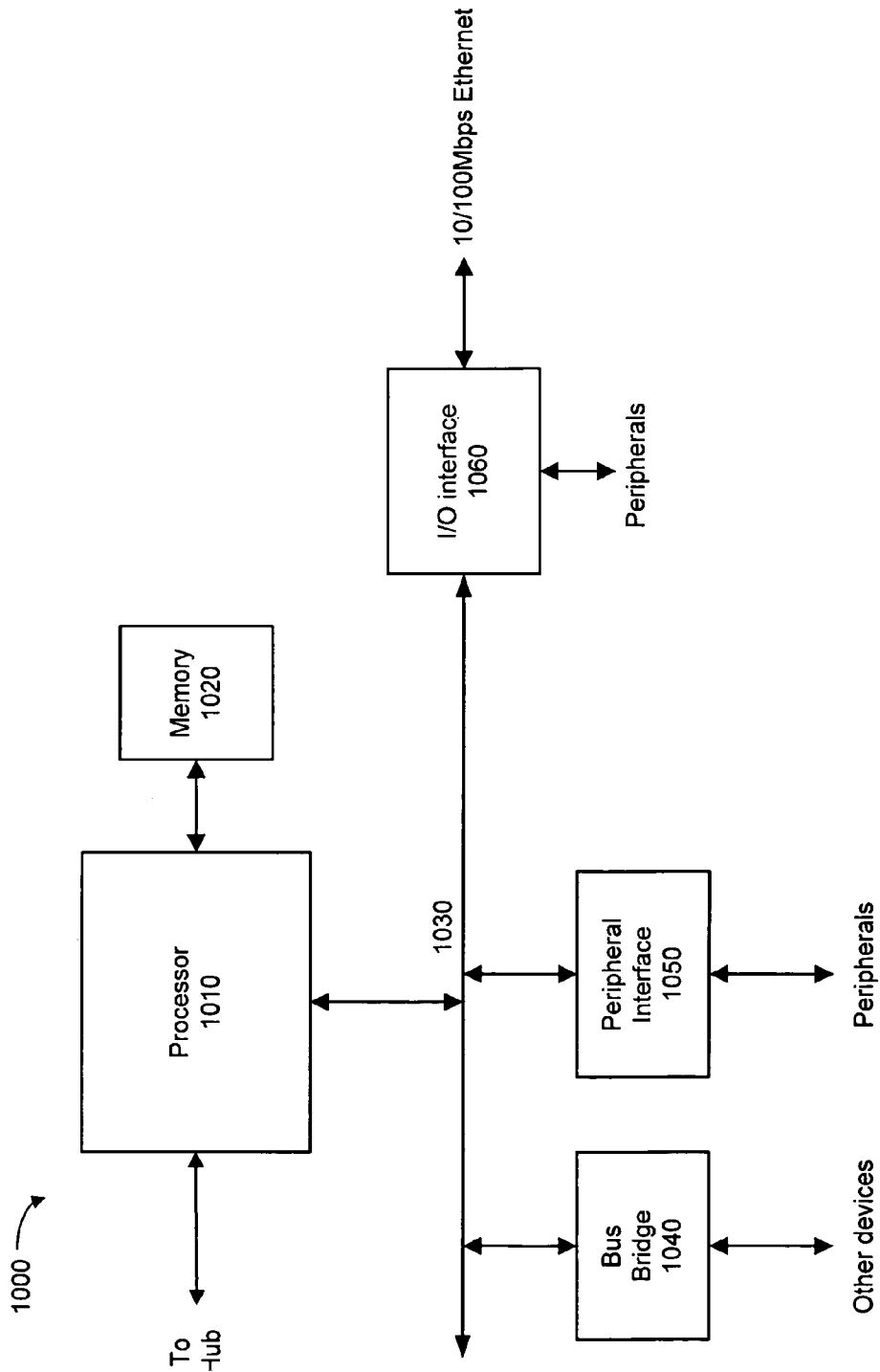
FIG. 10 illustrates a system controller.

FIG. 10 illustrates a system controller 1000 (also referred to herein as a level-1 processor). The core of the system controller 1000 is a processor 1010, which also communicates with the system switches (i.e. system switches 340 and 341). Programs run on processor 1010 are stored in memory 1020 coupled thereto. Processor 1010 is also coupled to an all-purpose bus (APB) 1030, which in turn drives several bus and communications controllers. Among the controllers interfaced to APB 1030 is a bus bridge 1040, a peripheral interface 1050, and an I/O interface 1060. I/O interface 1060 may provide functionality such as 10 Mbps/100 Mbps Ethernet communications. I/O interface 1060 also supports peripherals such as keyboards, mice, floppy drives, parallel ports, serial ports, and the like. Bus bridge 1040 allows communications between processor 1010 and other devices. Peripheral interface 1050 allows communications with peripherals such as hard disks. The level 1 processor performs various functions, such as communicating with the route processor(s) to determine how the matrix should be configured, managing the router's resources, and similar duties.

APB 1030 may also be connected to a dual-channel serial communication controller (SCC), which is used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the level-1 processor.

Route Processor Module

Figure 11:
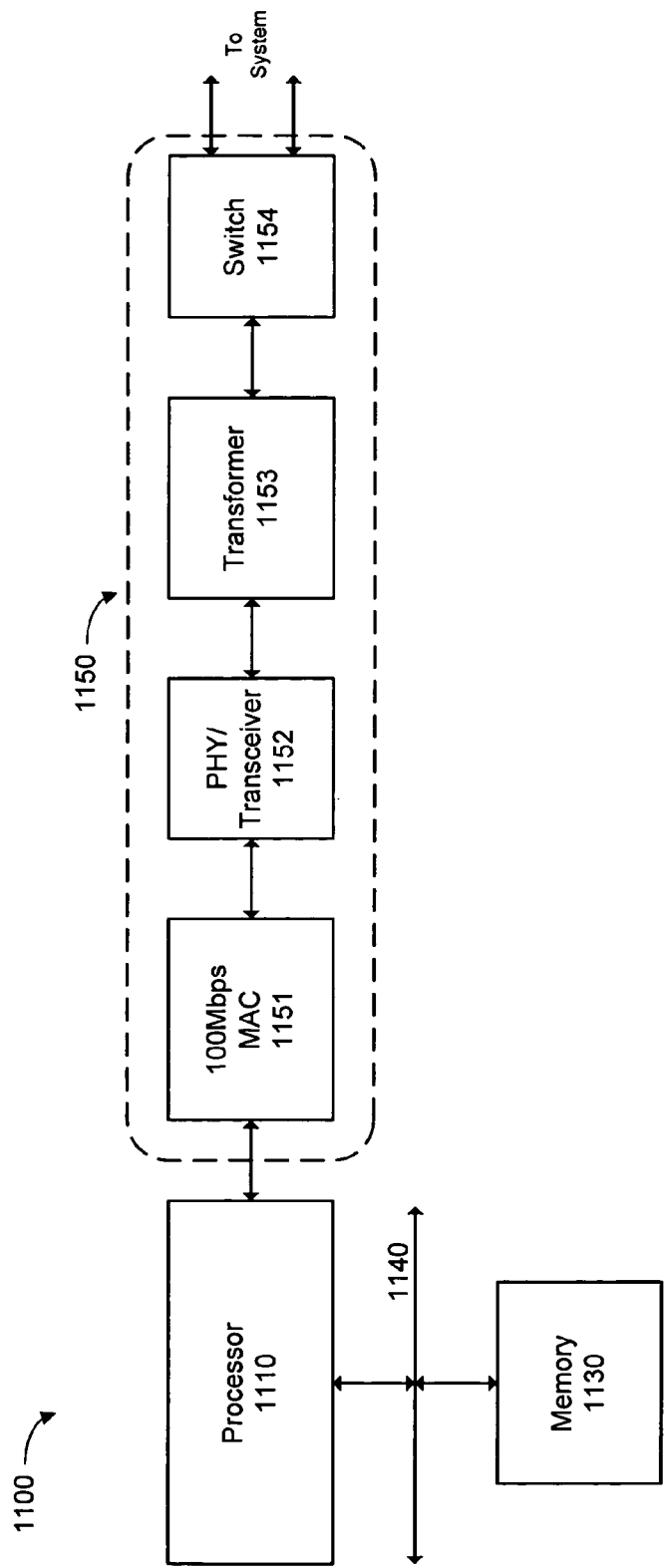
FIG. 11 illustrates a route processor.

FIG. 11 illustrates a route processor 1100. Route processor 1100 is a high-speed processor subsystem with relatively limited I/O capabilities. Route processor 1100 functions to receive link-failure indications from the line cards (not shown), computes an alternate route for failed connections using a restoration protocol such as that described in the co-pending application entitled "A METHOD FOR ROUTING INFORMATION OVER A NETWORK" and previously included by reference herein, and then sends one or more configuration requests to all affected nodes to achieve this new routing. Route processor 1100 is able to communicate directly with all system modules, including the line cards (not shown) and the matrix shelf processors (not shown) via a redundant high speed network connection to the system switch. In systems using Ethernet as the communication mechanism, route processor 1100 communicates with these elements via a redundant 100 Mbps connection to the system Ethernet switch. The core of route processor 1100 is a processor 1110 which runs software stored in memory 1130 via a CPU bus 1140. As noted, the software implements a routing protocol such as that mentioned above. Processor 1110 communicates with other systems of router 100 using an Ethernet communications mechanism via a 100 Mbps Ethernet transceiver 1150. Ethernet transceiver 1150 is depicted in FIG. 11 as including a 100 Mbps MAC 1151, a PHY/transceiver 1152, a transformer 1153 and a switch 1154. Switch 1154 provides a redundant connection to the other systems of router 100 to allow uninterrupted operation in the event of a communications failure.

System Switch

Figure 12:
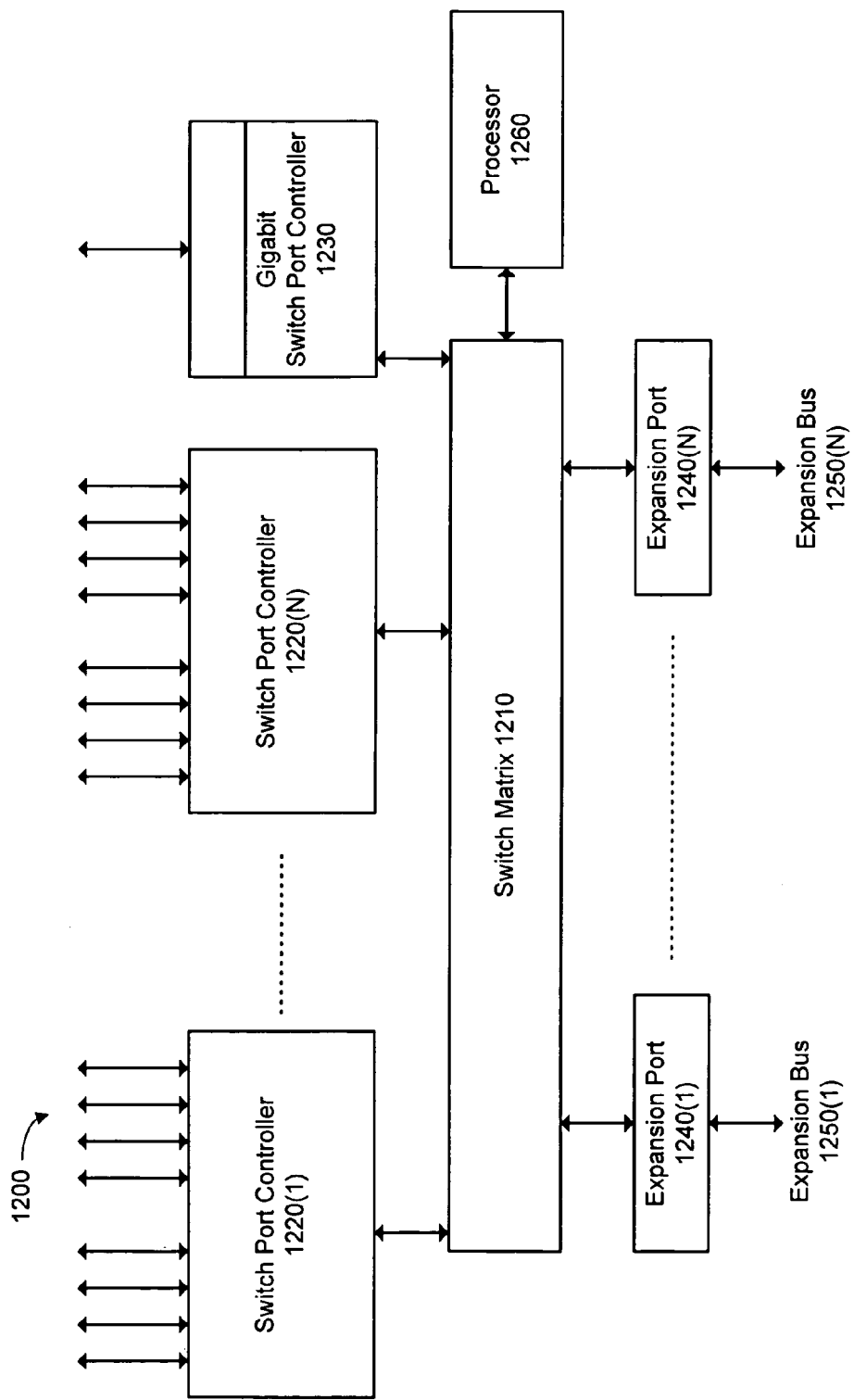
FIG. 12 illustrates an example of a system switch.

FIG. 12 illustrates an example of a system switch depicted as a system switch 1200, which can use an Ethernet-based communications, for example. In an Ethernet configuration, system switch 1200 manages the Ethernet connections from all level-1, level-2, route, and optional Wide Area Network (WAN) processors (not shown). System switch 1200 implements a high-speed, low-latency Ethernet switch that isolates local traffic to individual segments. The core of system switch 1200 is a switch matrix 1210. In one embodiment, switch matrix 1210 is an eight port bus that interconnects switch port controllers 1220(1)-(N), one or more high-speed interfaces (exemplified by a gigabit Ethernet switch port controller 1230), and expansion ports 1240(1)-(N). Each one of expansion ports 1240(1)-(N) communicates with a corresponding one of expansion buses 1250(1)-(N), respectively. Switch matrix 1210 is controlled by a processor 1260. Each copy of system Ethernet switch 1200 thus supports communications with level-1 processors, route processors, each I/O bay, and each matrix shelf processor. In Ethernet-based systems, these connections may be by 100 Mbps or 10 Mbps connections.

Software Architecture

Router 100 implements many functions in software to provide flexibility, support for communications protocols, and ease of implementation. The software architecture presented here forms a distributed management, control, and routing layer capable of spanning large numbers of nodes. The software architecture covers all protocol layers, management and control applications, and inter-node communication protocols and APIs.

The software modules described herein may be received by the various hardware modules of router 100, for example, from one or more computer readable media. The computer readable media may be permanently, removably or remotely coupled to the given hardware module. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Overall Architecture

The software running the various processors of router 100 normally includes three major components: operating system, inter-processor and inter-node communications, and management and control applications. The operating system should provide standard facilities for supporting program operation, communications, and system management tasks.

An important aspect of any software architecture is its underlying inter-process communications (IPC) mechanism. IPCs that provide for the isolation of tasks are preferable. Such IPCs use message passing as their preferred communication. Message passing allows for full, but isolated interaction among tasks. To the rest of the system, a task, no matter how complex, is reduced to a simple producer and consumer of messages. It provides a set of well defined services, each accessed through one or more messages. Though sometimes visible to other tasks, in one embodiment, none of a given task's variables and structures should be accessible outside its context. Limiting task interactions to message passing and keeping runtime variables private to each task allows individual software components to evolve independently and in parallel.

Management and control applications include high-level applications for provisioning circuits, protocol stacks, node management routines, and other such modules. The management of node facilities is of particular importance, and is discussed below.

Resource Manager

A resource manager (RM) is the software module responsible for collecting information about available resources (hardware and/or software) and monitoring their status during normal system operation. A resource is used generically in this document to refer to any manageable hardware or software element that performs one or more system functions. The RM builds its resource list from the receipt of unsolicited information from other modules in the system, and from periodic keep-alive messages exchanged with those modules. The RM, for example, is typically the first system application notified of card failures, insertions, and removals.

In one embodiment of router 100, there are two RM versions in the system. The first, which runs on the level-1 processor, is referred to herein as a node resource manager and is responsible for managing system resources and, in some cases, network-wide resources. The other version, which runs on level-2 processors, is referred to herein as a shelf resource manager and is responsible for managing resources in a single shelf. This multi-level hierarchy creates a flexible and expandable system where lower-level resource managers are custom designed for the specific shelf controlled.

The RM maintains information about a given resource in a structure called the Resource Control Block (RCB). An RCB typically includes of two main sections: a generic section, which is the same for all resources regardless of type, and a resource-specific section that varies according to resource type. Such an arrangement is depicted in the following data structure:

```
typedef struct
{
    u16         index;              // resource index
    u16         id;                 // global resource ID
    u16         type;               // resource type
    u08         state;              // resource's state
    t_hw_addr   hw_addr;            // h/w addr (shelf, slot)
    u08         mac_addr[6];        // MAC address
    u08         mcast_addr[6];      // multicast address
    u32         ip_addr;            // IP address
    u32         last_keepalive;     // time when last keep-
                                    // alive was received
    union
    {
        t_io_shelf_matrix io_shelf_matrix;
        t_io_shelf_controller io_shelf_controller;
        t_io_module io_module;
        t_matrix_shelf_controller matrix_shelf_controller;
        t_matrix_node_controller matrix_node_controller;
        t_system_controller system_controller;
    } resource_specific;
}t_rcb;
// Example resource types
// I/O shelf matrix
#define RCBT_IO_SHELF_MATRIX            0
// I/O shelf controller (level-2 processor)
#define RCBT_IO_SHELF_CONTROLLER        1
// I/O module/line card (level-3 processor)
#define RCBT_IO_MODULE                  2
// matrix shelf controller (level-2 processor)
```

-continued

```
#define RCBT_MATRIX_SHELF_CONTROLLER  3
// system node controller
#define RCBT_MATRIX_NODE_CONTROLLER   4
// system controller (level-1 processor)
#define RCBT_SYSTEM_CONTROLLER        5
// Example resource states
#define RCBS_UNUSED   0    // unused RCB
#define RCBS_PRESENT  1    // resource is present, not
                              started
#define RCBS_DOWN     2    // resource started,
                              currently down
#define RCBS_ACTIVE   3    // resource is active
```

All resource managers maintain a hierarchical list of resource control blocks that represents resources under their control. The list is referred to herein as the resource list and reflects the resources' hierarchy and their interdependencies. This allows the RM to determine, relatively quickly, the effect a given resource's failure has on other members of the hierarchy.

Router 100 preferably runs one or more versions of the Unix operating system on the level-1 processor and the level-2 processors (in the I/O and matrix shelves). Level-2 processors preferably run a real-time version of the Unix operating system (OS). Other processors (e.g., level-3, route, group, and matrix-node processors) preferably run a single task that does not require the services of an operating system or kernel. While Unix operating systems are described herein as being preferable, any one of a number of operating systems may be used.

Figure 13A:
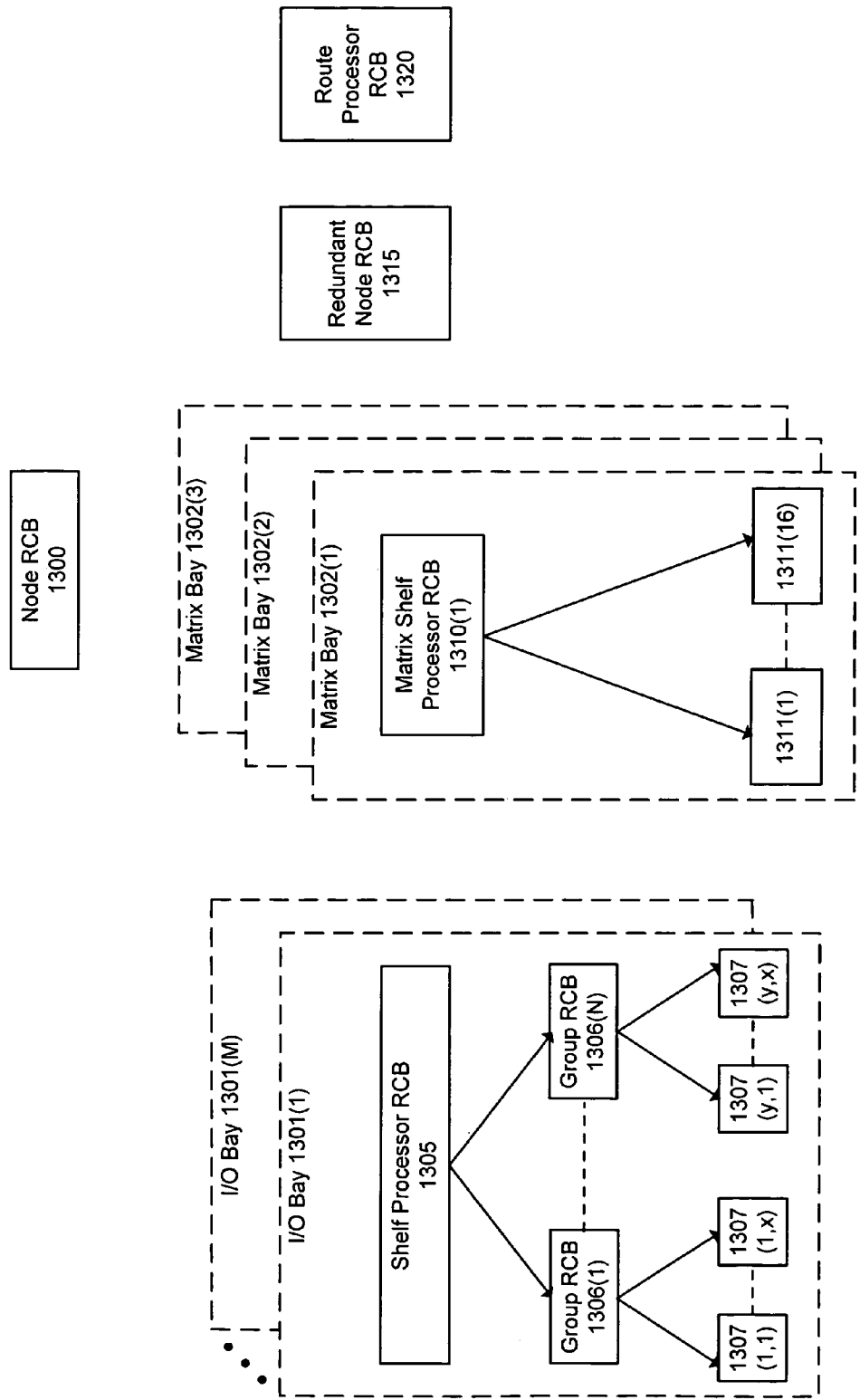
FIG. 13A illustrates the database showing the different RCB types and their position within the hierarchy in a router according to one embodiment of the present invention.

FIG. 13A illustrates the database which shows the different RCB types and their position within the hierarchy in a router, such as router 100, that includes a number of I/O bays 1301(1)-(M) and matrix bays 1302(1)-(3). As shown in FIG. 13, solid boxes are used to represent RCBs, while dashed boxes are used to represent groupings of RCBs. Shown in FIG. 13A is a node RCB 1300 which contains information regarding the various resources in router 100. Also shown is a shelf processor RCB 1305 which stores information regarding I/O bay 1301(1). As will be apparent, each one of I/O bays 1301(1)-(M) will have a shelf processor RCB associated therewith. Shelf processor RCB 1305 in turn maintains information regarding group RCBs 1306(1)-(N). Group RCBs 1306(1)-(N), in turn, maintain information regarding respective ones of line card RCBs 1307(1)-(y,x), which maintain information regarding their respective line cards (e.g., ones of line cards 220(1,1)-(N,N)). Also shown in FIG. 13A are matrix shelf processor RCBs 1310(1)-(3), which corresponding to matrix bays 1302(1)-(3) and store information regarding each of switch node RCBs 1311(1)-(16)). Also shown in FIG. 13A is a redundant node RCB 1315, which is redundant to node RCB 1300, and a route processor RCB 1320, which stores information regarding the route processor of router 100. The route processor executes a routing protocol such as that disclosed in the Patent Application entitled "A METHOD FOR ROUTING INFORMATION OVER A NETWORK," previously included by reference herein.

For example, the node RCB's database is built from power-up messages and GET_INVENTORY replies received from the shelf processors in the I/O and matrix bays. A power-up message causes each shelf processor RM to create an RCB for the shelf processor itself, while GET_INVENTORY replies cause the RM to create an RCB for every available line card in the corresponding shelf. Management bay resources are determined from power-up messages sent by the individual resources in that bay (route processors, redundant node processor, and the like).

It should be noted that while RCBs are described as representing the state of hardware subsystems of router 100, the RM could easily create RCBs to maintain information on software components running on the various subsystems of router 100. For example, an RCB could be created and maintained for the processes running on a line card, the route processor, or any other process running on a processor within router 100.

As shown in FIG. 13A, the node controller contains an equipment object for all the equipment in the system. The RM of the node controller interacts with a database that is constantly updated when changes to the equipment occur due to user commands or from shelf controllers notifying the RM about autonomous events. In the architecture depicted in FIG. 13A, a node controller manages all the equipment in a system, and, in a similar fashion, a shelf controller manages all the equipment in a shelf. The two controllers interact with each other in order to keep the databases at the two levels up to date.

Figure 13B:
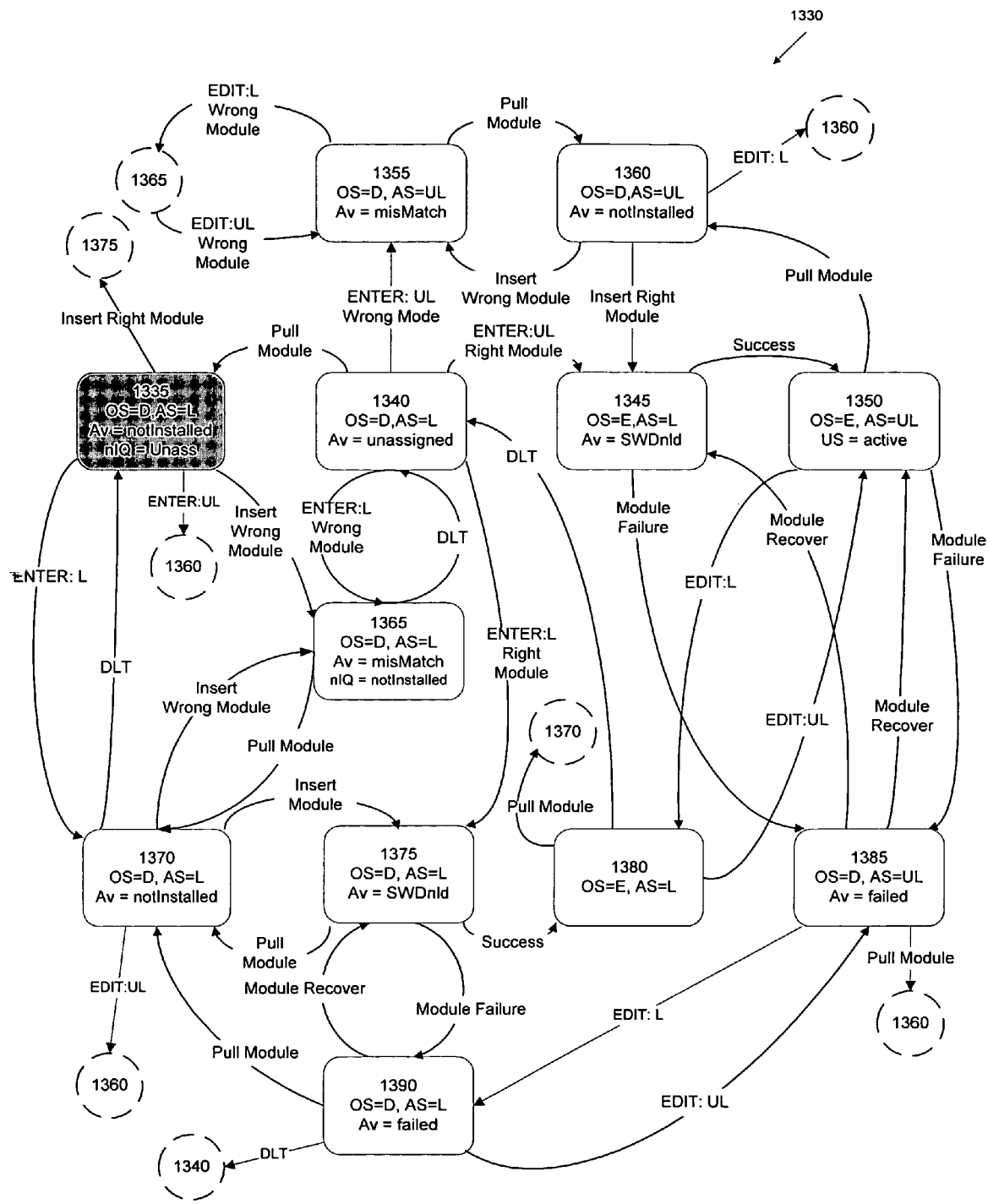
FIG. 13B illustrates a management state diagram according to one embodiment of the present invention.

FIG. 13B illustrates an exemplary state diagram 1330 which shows the states a resource may assume and the actions that transition the resource between states. Equipment state transitions are shown for basic commands and autonomous events. The management state of the objects represent the condition of the availability and operability of the resources from the point of view from the RM. This management state is reflected within fields of the database. The main components of the management state are state, status, and qualifiers. The state attributes are:

Operational State—Enabled or Disabled
This state attribute reflects the operability of the object. This attribute is not directly modified by commands but by autonomous notification or responses to commands. For example, the equipment goes into an enabled state after a successful download and passing any requisite diagnostics.

Administrative State—Locked or Unlocked
This state attribute reflects the management capability to control whether the resource is permitted or prohibited from providing service and is set by management commands. The user is able to enter equipment into a locked or unlocked state. After equipment has been entered, the user is able to edit the object into a locked or unlocked state.

Usage—Active or Nothing
The usage state of active is used for fully functional unlocked resources with no standing alarms. There is a standby status that is used for node controllers, shelf controllers, line cards and other equipment that are in a back-up capacity with (possibly) a subset of tasks in operation on them.

Status attributes contain detailed information to explain the operational and usage states. Status attributes may include, for example:

Availability: nothing, failed, notInstalled, SWDnld (software download), MisMatch, unassigned, unassDeld
Alarm: nothing, minor, major, critical
Standby: hot, cold
Control: part of services locked (optional)
Procedural: initialization required (optional)

Qualified attributes contain even more detail for the status attributes. Qualifiers are used for availability and control status in order to give a more detailed characterization of what is in the status attributes, although other attributes may be parameterized as well. For example, the following states can have the listed qualified attributes:

Availability status: notInstalled Qualifier (assigned, misMatch)

Administrative State: locked Qualifier (SWDnld)

FIG. 13B illustrates an exemplary state diagram 1330. State diagram 1330 depicts certain of the possible states that various hardware units can assume under a resource management system such as that described herein, as well as the transitions between those states. The transitions may also be treated as responses to commands, hardware status requests, and other such stimuli. The following descriptions of the states of state diagram 1330 are merely exemplary and are not given in any particular order. The first state that a hardware resource might assume is an Unassigned/notInstalled state 1335. In such a state, the hardware resource's operational state is disabled, its administrative state is locked, and its availability status is notInstalled. An Unassigned/Deleted ("unassDeld") state 1340 is provided that reflects the following attributes. UnassDeld state 1340 has an operational state of disabled, an administrative state of locked, and an availability state of UnassDeld. An Enabled Software Download ("SWDnld") state 1345 is provided to allow the download of operational software to the hardware resource being managed. Enabled SWDnld state 1345 reflects the following hardware resource attributes. Enabled SWDnld state 1345 has an operational state of enabled, an administrative state of locked, and an availability state of software download (SWDnld).

When a hardware resource is operational, it is normally in an Active state 1350, which has the following attributes. Active state 1350 has an operational state of enabled, an administrative state of unlocked, and a usage state of active. Active state 1350 has no availability state. If an equipment mismatch occurs, a hardware resource may find itself in an Unlocked/mismatch state 1355. A hardware resource in Unlocked/Mismatch state 1355 has an operational state of disabled, an administrative state of unlocked, and an availability of mismatch. An Unlocked/notInstalled state 1360 is provided to indicate when a hardware resource has an operational state of disabled, an administrative state of unlocked, and an availability of notInstalled. Mismatched hardware resources may also find themselves in a Locked/Mismatch state 1365 in the event that their operational state is disabled, their administrative state is locked, and their availability state is mismatch. A normal transition from Unassigned/notInstalled state 1335 is to a Locked/notInstalled state 1370, which has the following attributes. Locked/notInstalled state 1370 has an operational state of disabled, an administrative state of locked, and an availability of notInstalled. Software download to a disabled hardware resource is performed in a Disabled Software Download (Disabled SWDnld) state 1375, which has an operational state of disabled, an administrative state of locked, and an availability of software download. A successful SWDnld transitions the hardware resource from Disabled SWDnld state 1375 to a Locked/Enabled state 1380, in which the hardware resource's operational state is enabled and its administrative state is locked. In Locked/Enabled state 1380, the usage attribute and availability are unassigned. In the event of a failure of a hardware resource, that resource may find itself in an Unlocked/Failed state 1385, or a Locked/Failed state 1390. Unlocked/Failed state 1385 has an operational state of disabled, an administrative state of unlocked, and an availability of failed. Locked/Failed state 1390 has an operational state of disabled, an administrative state of locked, and an availability of failed.

Equipment User Commands

The user has the ability to issue commands to the system that change the status of equipment. State and operation of the equipment are among the possible changes a user may request. The resource manager will process the command and the result of the processing will be dependent on the command issued. Results include database changes, traffic moved off of the equipment, all equipment in the system locked to a copy of the system clock. The following commands affect Level 3 equipment, i.e. the interaction between the node controller (NC) and the shelf controller (SC). Many of the commands are applicable to the Level 2 (shelf controllers) and the Level 1 (administrative shelf equipment, (e.g., disk drives and the system switch)). Some of the commands may not be applicable due to the fact that the system will not allow some equipment to be in an unassigned state, for example.

Enter Equipment Commands

Enter commands on equipment moves the equipment into a manageable entity regardless of if the equipment is present or not.

Enter Unassigned, Not Present Equipment into Locked State

With a board not actually present, this command is simply a database change for both the Level 1 and the Level 2 resource managers. After insertion of the equipment, additional commands are issued to move the equipment into an enabled operational state.

TABLE 1

Transition description.

| FROM | TO |
|---|---|
| Unassigned/notInstalled State 1335 operationalState: disabled administrativeState: locked availabilityStatus: notInstalled notInstalledQualifier: unassigned | Locked/notInstalled State 1370 operationalState: disabled administrativeState: locked availStatus: notInstalled |

TABLE 2

Use Case for Level 1 RM.

| | |
|---|---|
| Name | ENTER-UNASSIGNED-MISSING-LOCKED |
| Description | Causes a transition of notInstalled/unassigned equipment into an assigned status. |
| Actors | Administrative User and Equipment Manager |
| Preconditions | administrativeState = locked availabilityStatus = notInstalled notInstalledQualifier = unassigned Unassigned/notInstalled State 1335 |

Typical Course Of Events

| Actor Action | System Response |
|---|---|
| User Enters Equipment command | |
| | NC verifies database for the equipment has the preconditions listed above. NC updates the database to clear out the notInstalledQualifier's unassigned value. Notifies the proper L2 processor of the database update. |
| Confirmation sent to the administrative user. | |

TABLE 3

Use Case for Level 2 RM.

| | |
|---|---|
| Name | ENTER-UNASSIGNED-MISSING-LOCKED |
| Description | Causes a transition of notInstalled/unassigned equipment into an assigned status. |
| Actors | L1 Equipment Manager and L2 Equipment Manager |

Typical Course Of Events

| Actor Action | System Response |
|---|---|
| L1 Equipment Manager sends message to L2 | |
| | SC updates the database as told by the L1 Equipment Manager. |
| Notifies the L1 Equipment Manager of change. | |

Enter Unassigned, Not Present Equipment into Unlocked State

When a board is not actually present, this command is simply a database change for both the Level 1 and the Level 2 resource managers. When equipment is inserted, the equipment goes into an enabled operational state.

TABLE 4

Transition description.

| FROM | TO |
|---|---|
| Unassigned/notInstalled 1335 operationalState: disabled administrativeState: locked availabilityStatus: notInstalled notInstalledQualifier: unassigned | Unlocked/notInstalled 1360 operationalState: disabled administrativeState: unlocked availStatus: notInstalled |

TABLE 5

Use Case for Level 1 RM.

| | |
|---|---|
| Name | ENTER-UNASSIGNED-MISSING-UNLOCKED |
| Description | Causes a transition of notInstalled/unassigned and locked equipment into an assigned, unlocked administrativeState |
| Actors | Administrative User and Equipment Manager |
| Preconditions | administrativeState = locked availabilityStatus = notInstalled notInstalledQualifier = unassigned Unassigned/notInstalled state 1335 |

Typical Course Of Events

| Actor Action | System Response |
|---|---|
| User Enters Equipment command | |
| | NC verifies database for the equipment has the preconditions listed above. NC updates the database to clear out the notInstalledQualifier's unassigned value, unlock the administrativeState. Notifies the proper L2 processor of the database update. |
| Confirmation sent to the administrative user. | |

TABLE 6

Use Case for Level 2 RM.

| | |
|---|---|
| Name | ENTER-UNASSIGNED-MISSING-UNLOCKED |
| Description | Causes a transition of notInstalled/unassigned equipment into an assigned status, unlocked administrativeState. |
| Actors | L1 Equipment Manager and L2 Equipment Manager |

Typical Course Of Events

| Actor Action | System Response |
|---|---|
| L1 Equipment Manager sends message to L2 | |
| | SC updates the database as told by the L1 Equipment Manager. |
| Responds to the L1 Equipment Manager. | |

Enter Unassigned, Present Equipment into Unlocked State

This command moves the equipment into a fully operational enabled, active state. This command has three possible outcomes:

1. correct equipment in the slot and success;
2. correct equipment in the slot but a failure with download or diagnostics, and
3. incorrect equipment in the slot.

TABLE 7

Transition description.

| FROM | TO | TO |
|---|---|---|
| Unassigned/notInstalled state 1335 → Unlocked/notInstalled state 1360 | SWDnld State 1345 | Active State 1350 |
| operationalState: disabled | operationalState: enabled | operationalState: enabled |
| administrativeState: locked | administrativeState: locked | administrativeState: unlocked |
| availabilityStatus: notInstalledQualifier: unassigned | availabilityStatus: lockedQualifier: SWDnld | availabilityStatus: usage state: active |

TABLE 8

Transition description.

| FROM | TO | TO |
|---|---|---|
| Unassigned/notInstalled state 1335 → Unlocked/notInstalled state 1360 | SWDnld state 1345 | Unlocked/failed state 1385 |
| operationalState: disabled | operationalState: enabled | operationalState: disabled |
| administrativeState: locked | administrativeState: locked | administrativeState: unlocked |
| availabilityStatus: | availabilityStatus: | availabilityStatus: failed |
| notInstalledQualifier: unassigned | lockedQualifier: SWDnld | |

TABLE 9

Description of the transitions for mismatched equipment.

| FROM | TO |
|---|---|
| Unassigned/notInstalled state 1335 | Locked/Mismatch State 1365 |
| operationalState: disabled | operationalState: disabled |
| administrativeState: locked | administrativeState: unlocked |
| availabilityStatus: | availabilityStatus: notInstalled |
| notInstalledQualifier: unassigned | notInstalledQualifier: misMatch |

TABLE 10

Use Case for Level 1 RM.

| | |
|---|---|
| Name | ENTER-UNASSIGNED-TO-UNLOCKED |
| Description | Causes a transition of installed/unassigned equipment into the unlocked administrativeState and assigned status. |
| Actors | Administrative User and Equipment Manager |
| Preconditions | administrativeState = locked, notInstalledQualifier = unassigned |

Typical Course Of Events

| Actor Action | System Response |
|---|---|
| User Enters Equipment command | |
| | NC verifies database for the equipment has the preconditions listed above. |
| | NC verifies the equipment in slot is valid, if not then perform Alternative 1) below and notify administrative user. |
| | NC updates the database to clear out the notInstalledQualifier's unassigned value, set the operationalState to enabled, clear out an proceduralStatus value, and set the lockedQualifier value to SWDnld. SWDnld state 1345. |
| | Notifies the proper L2 processor of the database update and the need to download software. |
| | On response from L2 NC changes the administrativeState to unlocked and clears out the lockedQualifier. Unlocked/Failed state 1385 |
| | If an unsuccessful response is returned by the L2 the NC sets the operationalState to disabled, sets the availabilityStatus to failed, and clears our the lockedQualifier. |
| Confirmation sent to the administrative user. | |

Alternatives:
1) NC updates the database to change notInstalledQualifier to misMatch, administrativeState is unlocked. Notify L2 of the database changes. Unlocked/Mismatch state 1355.

TABLE 11

Use Case for Level 2 RM.

| | |
|---|---|
| Name | ENTER-UNASSIGNED-TO-UNLOCKED |
| Description | Causes a transition of installed/unassigned equipment into the unlocked administrativeState and assigned status. |
| Actors | Administrative User and Equipment Manager |

TABLE 11-continued

Use Case for Level 2 RM.

Typical Course Of Events

| Actor Action | System Response |
|---|---|
| L1 Equipment Manager sends message to L2 | |
| | SC verifies the equipment in slot is valid, if not then perform Alternative 1) below. L1 manager is already aware of this condition and this is just a database sync mechanism. |
| | SC updates the database to clear out the notInstalledQualifier's unassigned value, set the operationalState to enabled, clears out the proceduralStatus, and set the lockedQualifier value to SWDnld. |
| | SC requests a reset of the L3 card. A timer will be set awaiting a response of successful reset. |
| | On response from L3 after reset a timer will be set awaiting notification from L3 that the Framework is up and ready. |
| | On notification from L3 that Framework is ready SC will request board level diagnostics. |
| | On completion of board level diagnostics the diagnostic information will be sent to the L1 manager and the database will be sent to the L3. |
| | On success response from the L3 the SC changes the administrativeState to unlocked and clears out the lockedQualifier. |
| | If an unsuccessful response has returned by the L3 or any timeouts at any steps the SC sets the operationalState to disabled, sets the availabilityStatus to failed, clears out the lockedQualifier. |
| Confirmation sent to the L1 manager with any pertinent information such as failed, etc. | |

Alternatives:
1) SC updates the database to change notInstalledQualifier to MisMatch, administrativeState is unlocked.

Enter Unassigned, Present Equipment into Locked State

The purpose of this command is to move the equipment into an enabled (but still locked) operational state requiring a command to move into active equipment. This command has three possible outcomes:

1. correct equipment in the slot and success,
2. correct equipment in the slot but a failure with download or diagnostics; and
3. incorrect equipment in the slot.

TABLE 12

Description of the transitions for correct equipment and successful execution.

| FROM | TO | TO |
|---|---|---|
| Unassigned/notInstalled state 1335 | Disabled/SWDlnd state 1375 | Locked/Enabled state 1380 |
| operationalState: disabled | operationalState: enabled | operationalState: enabled |
| administrativeState: locked | administrativeState: locked | administrativeState: locked |
| availabilityStatus: | availabilityStatus: | |
| notInstalledQualifier: Unassigned | LockedQualifier: SWDnld | |

TABLE 13

Transition description.

| FROM | TO | TO |
|---|---|---|
| Unassigned/notInstalled state 1335 operationalState: disabled administrativeState: locked availabilityStatus: notInstalledQualifier: unassigned | Disabled/SWDlnd state 1375 operationalState: disabled administrativeState: locked availabilityStatus: lockedQualifier: SWDnld | Locked/Failed state 1390 operationalState: disabled administrativeState: locked availabilityStatus: failed |

TABLE 14

Description of the transitions for mismatched equipment.

| FROM | TO |
|---|---|
| Unassigned/notInstalled state 1335 operationalState: disabled administrativeState: locked availabilityStatus: notInstalledQualifier: unassigned | Locked/Mismatch state 1365 operationalState: disabled administrativeState: locked availabilityStatus: notInstalled notInstalledQualifier: misMatch |

TABLE 15

Use Case for Level 1 RM.

| | |
|---|---|
| Name | ENTER-UNASSIGNED-TO-LOCKED |
| Description | Causes a transition of installed/unassigned equipment into the locked and enabled status. |
| Actors | Administrative User and Equipment Manager |
| Preconditions | administrativeState = locked availabilityStatus = notInstalled notInstalledQualifier = unassigned |

Typical Course Of Events

| Actor Action | System Response |
|---|---|
| User Enters Equipment command | |
| | NC verifies database for the equipment has the preconditions listed above. NC verifies the equipment in slot is valid, if not then perform Alternative 1) below and notify administrative user. NC updates the database to clear out the notInstalledQualifier's unassigned value, set the lockedQualifier value to SWDnld, and clear out the proceduralStatus. Disabled/SWDlnd state 1375 Notifies the proper L2 processor of the database update and the need to download software. If successful response from L2 NC changes the operationalState to enabled and clears the lockedQualifier. Locked/Enabled state 1380 If an unsuccessful response is returned by the L2 the NC sets the availabilityStatus to failed and clears the lockedQualifier. Locked/Failed state 1390 |
| Confirmation sent to the administrative user. Alternatives: 1) NC updates the database to change notInstalledQualifier is changed to misMatch. Locked/Mismatch state 1365 | |

TABLE 16

Use Case for Level 2 RM.

| | |
|---|---|
| Name | ENTER-UNASSIGNED-TO-LOCKED |
| Description | Causes a transition of installed/unassigned equipment into the locked administrativeState and assigned status. |
| Actors | Administrative User and Equipment Manager |

Typical Course Of Events

| Actor Action | System Response |
|---|---|
| L1 Equipment Manager sends message to L2 | |
| | SC verifies the equipment in slot is valid, if not then perform Alternative 1) below. L1 manager is already aware of this condition and this is just a database sync mechanism. SC updates the database to clear out the notInstalledQualifier's unassigned value, set the lockedQualifier value to SWDnld, and clear out the proceduralStatus. SC requests a reset of the L3 card. A timer will be set awaiting a response of successful reset. On response from L3 after reset a timer will be set awaiting notification from L3 that the Framework is up and ready. On notification from L3 that Framework is ready SC will request board level diagnostics. On completion of board level diagnostics the diagnostic information will be sent to the L1 manager and the database will be sent to the L3. On success response from the L3 the SC changes the operationalState is set to enabled and clears out the lockedQualifier. Locked/Enabled state 1380 If an unsuccessful response has returned by the L3 or any timeouts at any steps the SC sets the availabilityStatus to failed, clears out the lockedQualifier. Locked/Failed state 1390 |
| Confirmation sent to the L1 manager with any pertinent information such as failed, etc. Alternatives: 1) SC updates the database to change notInstalledQualifier to misMatch, administrativeState is unlocked. | |

Delete Equipment Commands

Delete commands move the managed equipment into an unmanageable state, which is unassigned for the notInstalledQualifier. The availability status is dependent on whether or not there is equipment in the slot. This command is normally issued when the equipment is in a locked administrativeState. In order to keep any automatic re-initialization and progression into an enabled operationalState of equipment object that has been manager-Deleted, a proceduralStatus attribute is updated with initRequired. This field is cleared on any type of action that would initialize the board like Enter commands and Insertion notifications.

Delete Locked Equipment into Unassigned

TABLE 17

Description of the transition for equipment not present.

| FROM | TO |
|---|---|
| Locked/notInstalled state 1370 operationalState: disabled administrativeState: locked availabilityStatus: notInstalled | Unassigned/notInstalled state 1335 operationalState: disabled administrativeState: locked availabilityStatus: notInstalled notInstalledQualifier: unassigned |

TABLE 18

Description of the transition for equipment present but failed.

| FROM | TO |
|---|---|
| Locked/Failed state 1390 operationalState: disabled administrativeState: locked availabilityStatus: failed | UnassDeld state 1340 operationalState: disabled administrativeState: locked availabilityStatus: notInstalledQualifier: unassigned |

TABLE 19

Description of the transition for equipment operationally enabled.

| FROM | TO |
|---|---|
| Locked/enabled state 1380 operationalState: enabled administrativeState: locked | UnassDeld state 1340 operationalState: disabled administrativeState: locked availabilityStatus: notInstalledQualifier: unassigned |

TABLE 20

Description of the transition for mismatched equipment.

| FROM | TO |
|---|---|
| Locked/Mismatch state 1365 operationalState: disabled administrativeState: locked availabilityStatus: notInstalled notInstalledQualifier: misMatch | UnassDeld state 1340 operationalState: disabled administrativeState: locked availabilityStatus: notInstalledQualifier: unassigned |

TABLE 21

Use Case of Level 1 RM.

| | |
|---|---|
| Name | DLT-LOCKED |
| Description | Causes a transition of equipment into an unassigned status. |
| Actors | Administrative User and Equipment Manager |
| Preconditions | administrativeState = locked notInstalledQualifier not = unassigned |

Typical Course Of Events

| Actor Action | System Response |
|---|---|
| User Enters Equipment command | |
| | NC verifies database for the equipment has the preconditions listed above. NC updates the database to set the operationalState to disabled, if availabilityStatus at notInstalled AND notInstalledQualifier is misMatch, clear availabilityStatus, set the notInstalledQualifier to unassigned value, and set the proceduralStatus to initRequired. Notifies the proper L2 processor of the database update. |
| Confirmation sent to the administrative user. | |

TABLE 22

Use Case for Level 2 RM.

| | |
|---|---|
| Name | DLT-LOCKED |
| Description | Causes a transition of equipment into an unassigned status. |
| Actors | Administrative User and Equipment Manager |
| Preconditions | administrativeState = locked notInstalledQualifier not = unassigned |

Typical Course Of Events

| Actor Action | System Response |
|---|---|
| L1 Equipment Manager sends message to L2 | |
| | SC updates the database to set the operationalState to disabled, if availabilityStatus at notInstalled AND notInstalledQualifier is misMatch, clear availabilityStatus, set the notInstalledQualifier to unassigned value, and set the proceduralStatus to initRequired. If availabilityStatus is not notInstalled (meaning correct equipment in the shelf) then send message to L3 to shut down any scanners. |
| Confirmation sent to the administrative user. | |

Edit Equipment Commands

Edit commands move the equipment from/to a locked/unlocked state.

Edit Unlocked Equipment into Locked State

TABLE 23

Transition description.

| FROM | TO |
| --- | --- |
| Unlocked/Failed state 1385<br>operationalState: disabled<br>administrativeState: unlocked<br>availabilityStatus: failed | Locked/Failed state 1390<br>operationalState: disabled<br>administrativeState: locked<br>availabilityStatus: failed |

TABLE 24

Transition description.

| FROM | TO |
| --- | --- |
| Active state 1350<br>operationalState: enabled<br>administrativeState: unlocked<br>usageState: active | Locked/Enabled state 1380<br>operationalState: enabled<br>administrativeState: locked |

TABLE 25

Transition description.

| FROM | TO |
| --- | --- |
| Unlocked/notInstalled state 1360<br>operationalState: disabled<br>administrativeState: unlocked<br>availabilityStatus: notInstalled | Locked/notInstalled state 1370<br>operationalState: disabled<br>administrativeState: locked<br>availabilityStatus: notInstalled |

TABLE 26

Transition description.

| FROM | TO |
| --- | --- |
| Unlocked/Mismatch state 1355<br>operationalState: disabled<br>administrativeState: unlocked<br>availabilityStatus: notInstalled<br>notInstalledQualifier: misMatch | Locked/Mismatch state 1365<br>operationalState: disabled<br>administrativeState: locked<br>availabilityStatus: notInstalled<br>notInstalledQualifier: misMatch |

TABLE 27

Use Case for Level 1 RM.

| | |
| --- | --- |
| Name | EDIT-LOCKED |
| Description | Edit equipment to set the administrativeState to locked state. |
| Actors | Administrative User and Equipment Manager |
| Preconditions | administrativeState = unlocked<br>lockedQualifier clear<br>notInstalledQualifier not unassigned. |

TABLE 27-continued

Use Case for Level 1 RM.

Typical Course Of Events

| Actor Action | System Response |
| --- | --- |
| User Enters Equipment command | |
| | NC verifies database for the equipment has the preconditions listed above. |
| | NC updates the database to set the administrativeState to locked. |
| | Notifies the proper L2 processor of the database update. |
| Confirmation sent to the administrative user. | |

TABLE 28

Use Case for Level 2 RM.

| | |
| --- | --- |
| Name | EDIT-LOCKED |
| Description | Edit equipment to set the administrativeState to locked state. |
| Actors | L1 Equipment Manager and L2 Equipment Manager |
| Preconditions | administrativeState = unlocked<br>lockedQualifier clear<br>notInstalledQualifier not unassigned. |

Typical Course Of Events

| Actor Action | System Response |
| --- | --- |
| User Enters Equipment command | |
| | SC updates the database to set the administrativeState to locked. |
| Confirmation sent to the Level 1 Manager. | |

TABLE 29

Transition description.

| FROM | TO |
| --- | --- |
| Locked/Failed state 1390<br>operationalState: disabled<br>administrativeState: locked<br>availabilityStatus: failed | Unlocked/Failed state 1385<br>operationalState: disabled<br>administrativeState: unlocked<br>availabilityStatus: failed |

TABLE 30

Transition description.

| FROM | TO |
| --- | --- |
| Locked/Enabled state 1380<br>operationalState: enabled<br>administrativeState: locked | Active state 1350<br>operationalState: enabled<br>administrativeState: locked<br>usageState: active |

TABLE 31

Transition description.

| FROM | TO |
|---|---|
| Locked/notInstalled state 1370<br>operationalState: disabled<br>administrativeState: locked<br>availabilityStatus: notInstalled | Unlocked/notInstalled state 1360<br>operationalState: disabled<br>administrativeState: unlocked<br>availabilityStatus: notInstalled |

TABLE 32

Transition description.

| FROM | TO |
|---|---|
| Locked/Mismatch state 1365<br>operationalState: disabled<br>administrativeState: locked<br>availabilityStatus: notInstalled<br>notInstalledQualifier: misMatch | Unlocked/Mismatch state 1355<br>operationalState: disabled<br>administrativeState: unlocked<br>availabilityStatus: notInstalled<br>notInstalledQualifier: misMatch |

TABLE 33

Use Case for Level 1 RM.

| | |
|---|---|
| Name | EDIT-UNLOCKED |
| Description | Edit of equipment to set the administrativeState to unlocked state. |
| Actors | Administrative User and Equipment Manager |
| Preconditions | administrativeState = locked<br>lockedQualifier clear<br>notInstalledQualifier not unassigned. |

Typical Course Of Events

| Actor Action | System Response |
|---|---|
| User Enters Equipment command | |
| | NC verifies database for the equipment has the preconditions listed above.<br>NC updates the database to set the administrativeState to unlocked.<br>Notifies the proper L2 processor of the database update. |
| Confirmation sent to the administrative user. | |

TABLE 34

Use Case for Level 2 RM.

| | |
|---|---|
| Name | EDIT-UNLOCKED |
| Description | Edit equipment to set the administrativeState to locked state. |
| Actors | L1 Equipment Manager and L2 Equipment Manager |
| Preconditions | administrativeState = locked<br>lockedQualifier clear<br>notInstalledQualifier not unassigned. |

TABLE 34-continued

Use Case for Level 2 RM.

Typical Course Of Events

| Actor Action | System Response |
|---|---|
| User Enters Equipment command | |
| | SC sends down database merely as a resynching mechanism.<br>SC updates the database to set the administrativeState to unlocked. |
| Confirmation sent to the Level 1 Manager. | |

Autonomous Notifications

Examples of autonomous notifications are equipment failure and card presence changes due to removals or insertions of equipment. The state of the equipment, alarm status, and specific database information change based on notifications from the SC.

Equipment Insertions

On insertions the equipment manager on the SC detects the card insertion from the card presence indicator on that shelf. The manager updates the alarm block for that card so the NC can be notified. The SC that notified the NC handles the process of bringing up the card as the process occurs.

Locked, Unassigned Equipment Insertion

On an insertion from the initial starting point for the state of equipment, the equipment automatically moves through Disabled/SWDnld state 1375 into an operational state wherein the equipment is enabled but locked (i.e., Locked/Enabled state 1380). The equipment is automatically assigned but requires management commands to transition into an active state. This action typically has three possible outcomes:

1. correct equipment in the slot and success,
2. correct equipment in the slot but a failure with download or diagnostics, or
3. incorrect equipment inserted in the slot.

TABLE 35

Description of the transitions for successful execution after insertion.

| FROM | TO | TO |
|---|---|---|
| Unassigned/notInstalled state 1335<br>operationalState: disabled<br>administrativeState: locked<br>availabilityStatus: notInstalled<br>notInstalledQualifier: unassigned | Disabled/SWDlnd state 1375<br>operationalState: disabled<br>administrativeState: locked<br>lockedQualifier: SWDnld | Locked/Enabled state 1380<br>operationalState: enabled<br>administrativeState: locked |

TABLE 36

Description of the transitions for unsuccessful execution after insertion.

| FROM | TO | TO |
|---|---|---|
| Unassigned/notInstalled state 1335<br>operationalState: disabled<br>administrativeState: locked | Disabled/SWDlnd state 1375<br>operationalState: disabled<br>administrativeState: locked | Locked/Failed state 1390<br>operationalState: disabled<br>administrativeState: locked |

TABLE 36-continued

Description of the transitions for unsuccessful execution after insertion.

| FROM | TO | TO |
|---|---|---|
| availabilityStatus: notInstalled notInstalledQualifier: unassigned | lockedQualifier: SWDnld | availabilityStatus: failed |

TABLE 37

Description of the transitions for insertion of mismatched equipment.

| FROM | TO |
|---|---|
| Unassigned/notInstalled state 1335 operationalState: disabled administrativeState: locked availabilityStatus: notInstalled notInstalledQualifier: unassigned | Locked/Mismatch state 1365 operationalState: disabled administrativeState: locked availabilityStatus: notInstalled notInstalledQualifier: misMatch |

TABLE 38

Use Case for Level 1 RM.

| | |
|---|---|
| Name | INSERT-UNASSIGNED |
| Description | Insertion event of locked unassigned equipment causing transition into assigned and other states dependent on results. |
| Actors | L2 Controller and Equipment Manager |
| Preconditions | administrativeState = locked availabilityStatus = notInstalled notInstalledQualifier = unassigned |

Typical Course Of Events

| Actor Action | System Response |
|---|---|
| Autonomous notification from L2 creates Event to process information. | |
| | NC verifies the equipment in slot is valid, if not then performs Alternative 1) below and notifies administrative user. NC updates the database to set the lockedQualifier value to SWDnld, clear out the availabilityStatus of notInstalled, clear out unassigned value in the notInstalledQualifier, and clear out any proceduralStatus value. L2 will be in the process of downloading/testing equipment, NC sets timer for indication from L2 on the results. On successful notification from L2 NC sets the operationalState to enabled and clears out the lockedQualifier. If an unsuccessful notification is sent by the L2 the NC sets the availabilityStatus to failed. |
| Notification sent to the administrative user. | |

Alternatives:
1) NC updates the database to change notInstalledQualifier to misMatch and clear out any proceduralStatus value.

TABLE 39

Use Case for Level 2 RM.

| | |
|---|---|
| Name | INSERT-UNASSIGNED |
| Description | Insertion event of locked unassigned equipment causing transition to assigned and other states dependent on results. |
| Actors | L2 Controller and L2 Equipment Manager |
| Preconditions | administrativeState = locked availabilityStatus = notInstalled notInstalledQualifier = unassigned |

Typical Course Of Events

| Actor Action | System Response |
|---|---|
| Autonomous notification from L2 card presence indicator creates Event to process information. | |
| | SC updates Alarm Block with change information. SC Verifies equipment in slot is valid, if not then perform Alternative 1) below. SC updates database to set lockedQualifier to SWDnld, clear out availabilityStatus of notInstalled, and clear out unassigned value in the notInstalledQualifier. Sets timer awaiting L3 notification that board initialization is going on. L3 will notifies us that he is working on initialization of the board, set a timer awaiting notification from L3 that Framework is up and ready. On notification that Framework is up and ready SC will request board level diagnostics. On completion of board level diagnostics the diagnostic information will be sent to the L1 manager and the database will be sent to the L3. On success response from the L3 the SC changes the operationalState to enabled and clears out the lockedQualifier. If any unsuccessful response has been returned by the L3 or any timeouts at any steps the SC sets the availabilityStatus to failed and clears out the lockedQualifier. |
| Confirmation set to L1 manager with any pertinent information such as failed, etc. | |

Alternatives:
1) SC updates the database to change notInstalledQualifier to misMatch, proceduralStatus is cleared.

Locked, Assigned Equipment Insertion

On insertion of a card in the locked assigned state, the card progresses through a software download into the enabled operational state but still locked, requiring a command to move the equipment into an active state. This action has three possible outcomes:

1. correct equipment in the slot and success;
2. correct equipment in the slot but a failure with download or diagnostics; or
3. incorrect equipment inserted in the slot.

TABLE 40

Description of the transitions for successful execution after insertion.

| FROM | TO | TO |
|---|---|---|
| Locked/Not Installed state 1370 operationalState: disabled | Disabled/SWDlnd state 1375 operationalState: disabled | Locked/Enabled state 1380 operationalState: enabled |

TABLE 40-continued

Description of the transitions for successful execution after insertion.

| FROM | TO | TO |
|---|---|---|
| administrativeState: locked availabilityStatus: notInstalled | administrativeState: locked lockedQualifier: SWDnld | administrativeState: locked |

TABLE 41

Description of the transitions for unsuccessful execution after insertion.

| FROM | TO | TO |
|---|---|---|
| Locked/notInstalled state 1370 operationalState: disabled administrativeState: locked availabilityStatus: notInstalled | Disabled/SWDlnd state 1375 operationalState: disabled administrativeState: locked lockedQualifier: SWDnld | Locked/Failed state 1390 operationalState: disabled administrativeState: locked availabilityStatus: failed |

TABLE 42

Description of the transitions for insertion of invalid equipment.

| FROM | TO |
|---|---|
| Locked/Not Installed state 1370 operationalState: disabled administrativeState: locked availabilityStatus: notInstalled | Locked/Mismatch state 1365 operationalState: disabled administrativeState: locked availabilityStatus: notInstalled notInstalledQualifier: misMatch |

TABLE 43

Use Case for Level 1 RM.

| | |
|---|---|
| Name | INSERT-LOCKED |
| Description | Insertion event of locked assigned equipment causing transition of operationalState and availabilityStatus based on results. |
| Actors | L2 Controller and Equipment Manager |
| Preconditions | administrativeState = locked availabilityStatus = notInstalled |

Typical Course Of Events

| Actor Action | System Response |
|---|---|
| Autonomous notification from L2 creates Event to process information. | |
| | The action for INSERT-LOCKED is the same as INSERT-UNASSIGNED with the exception of the fact that clearing of the notInstalledQualifier of unassigned is not required because the notInstalledQualifier is already cleared. |
| Notification sent to the administrative user. | |

Alternatives:
1) NC updates the database to change notInstalledQualifier to misMatch.

TABLE 44

Use Case for Level 2 RM.

| | |
|---|---|
| Name | INSERT-LOCKED |
| Description | Insertion event of locked assigned equipment causing transition of operationalState and availabilityStatus based on results. |
| Actors | L2 Controller and L2 Equipment Manager |
| Preconditions | administrativeState = locked availabilityStatus = notInstalled |

Typical Course Of Events

| Actor Action | System Response |
|---|---|
| Autonomous notification from L2 card presence indicator creates Event to process information. | |
| | The action for INSERT-LOCKED is the same as INSERT-UNASSIGNED with the exception of the fact that clearing of the notInstalledQualifier of unassigned is not required because the notInstalledQualifier is already cleared. |
| Confirmation sent to the L1 manager with any pertinent information such as filed information, etc. | |

Alternatives:
1) SC updates the database to change notInstalledQualifier to misMatch and updates the Alarm Block with the information.

Unlocked Equipment Insertion

On insertion of a card in the unlocked assigned state, the card progresses through software download into the enabled operational, unlocked, and active state. This action has three possible outcomes:

1. correct equipment in the slot and success,
2. correct equipment in the slot but a failure with download or diagnostics, or
3. incorrect equipment inserted in the slot.

TABLE 45

Description of the transitions for successful execution after insertion.

| FROM | TO | TO |
|---|---|---|
| Unlocked/notInstalled state 1360 operationalState: disabled administrativeState: unlocked availabilityStatus: notInstalled | SWDnld state 1345 operationalState: enabled administrativeState: locked lockedQualifier: SWDnld | Active state 1350 operationalState: enabled administrativeState: unlocked usageState: active |

TABLE 46

Description of the transitions for unsuccessful execution after insertion.

| FROM | TO | TO |
|---|---|---|
| Unlocked/notInstalled state 1360 operationalState: disabled administrativeState: unlocked availabilityStatus: notInstalled | SWDnld state 1345 operationalState: enabled administrativeState: locked lockedQualifier: SWDnld | Unlocked/Failed state 1385 operationalState: disabled administrativeState: unlocked availabilityStatus: failed |

TABLE 47

Description of the transitions for insertion of mismatched equipment.

| FROM | TO |
|---|---|
| Unlocked/notInstalled state 1360 | Unlocked/Mismatch state 1355 |
| operationalState: | operationalState: |
| disabled | disabled |
| administrativeState: | administrativeState: |
| unlocked | unlocked |
| availabilityStatus: | availabilityStatus: |
| notInstalled | notInstalled |
|  | notInstalledQualifier: |
|  | misMatch |

TABLE 48

Use Case for Level 1 RM.

| | |
|---|---|
| Name | INSERT-UNLOCKED |
| Description | Insertion event of unlocked assigned equipment causing transition of operationalState and availabilityStatus based on results. |
| Actors | L2 Controller and Equipment Manager |
| Preconditions | administrativeState = unlocked |
|  | availabilityStatus = notInstalled |

Typical Course Of Events

| Actor Action | System Response |
|---|---|
| Autonomous notification from L2 creates Event to process information. |  |
|  | NC verifies the equipment in slot is valid, if not then perform Alternative 1) below and notify administrative user. |
|  | NC updates the database to set operationalState to enabled, lock the administrativeState, and set the lockedQualifier value to SWDnld, and clear out the availabilityStatus of notInstalled. |
|  | L2 will be in the process of downloading/testing equipment, NC sets timer for indication from L2 on the results. |
|  | On response from L2 NC changes the administrativeState to unlocked and clears out the lockedQualifier. |
|  | If an unsuccessful response is returned by the L2 the NC sets the operationalState to disabled and sets the availabilityStatus to failed. |
| Alternatives: | |
| 1) NC updates the database to change notInstalledQualifier to misMatch. | |

TABLE 49

Use Case for Level 2 RM.

| | |
|---|---|
| Name | INSERT-UNLOCKED |
| Description | Insertion event of unlocked equipment causing transition of operationalState and availabilityStatus based on results. |
| Actors | L2 Controller and L2 Equipment Manager |
| Preconditions | administrativeState = unlocked |
|  | availabilityStatus = notInstalled |

TABLE 49-continued

Use Case for Level 2 RM.

Typical Course Of Events

| Actor Action | System Response |
|---|---|
| Autonomous notification from L2 card presence indicator creates Event to process information. |  |
|  | SC updates Alarm Block with change information. |
|  | SC Verifies equipment in slot is valid, if not then perform Alternative 1) below. |
|  | SC updates database to set the administrativeState to locked, set lockedQualifier to SWDnld, clear out availabilityStatus of notInstalled. Sets timer awaiting L3 notification that board initialization is going on. |
|  | L3 will notifies us that he is working on initialization of the board, set a timer awaiting notification from L3 that Framework is up and ready. |
|  | On notification that Framework is up and ready SC will request board level diagnostics. |
|  | On completion of board level diagnostics the diagnostic information will be sent to the L1 manager and the database will be sent to the L3. |
|  | On success response from the L3 the SC changes the administrativeState to unlocked and clears out the lockedQualifier. |
|  | If any unsuccessful response has been returned by the L3 or any timeouts at any steps the SC sets the operationalStatus to disabled, availabilityStatus to failed, clears out the lockedQualifier. |
| Confirmation set to L1 manager with any pertinent information such as failed, etc. | |
| Alternatives: | |
| 1) SC updates the database to change notInstalledQualifier to misMatch, procedureStatus is cleared. | |

Equipment Pulls

Equipment pulls move the equipment into a notInstalled availabilityStatus. The administrativeState remains the same.

Locked, Unassigned Equipment Pull

TABLE 50

Transition description.

| FROM | TO |
|---|---|
| UnassDeld state 1340 | Unassigned/notInstalled state 1335 |
| operationalState: | operationalState: |
| disabled | disabled |
| administrativeState: | administrativeState: |
| locked | locked |
| availabilityStatus: | availabilityStatus: |
|  | notInstalled |
| notInstalledQualifier: | notInstalledQualifier: |
| unassigned | unassigned |

TABLE 51

Case Use for Level 1 RM.

| | |
|---|---|
| Name | PULL-UNASSIGNED |
| Description | Pull event of locked unassigned equipment causing availabilityStatus to transition to notInstalled. |

TABLE 51-continued

Case Use for Level 1 RM.

| | |
|---|---|
| Actors | L2 Controller and Equipment Manager |
| Preconditions | administrativeState = locked |
| | availabilityStatus is clear |
| | notInstalledQualifier = unassigned |

Typical Course Of Events

| Actor Action | System Response |
|---|---|
| Autonomous notification from L2 creates Event to process information. | |
| | NC updates the database to set the availabilityStatus to notInstalled, clear out the proceduralStatus field. |
| Notification sent to the administrative user. | |

TABLE 52

Case Use for Level 2 RM.

| | |
|---|---|
| Name | PULL-UNASSIGNED |
| Description | Pull event of locked unassigned equipment causing availabilityStatus to transition to notInstalled. |
| Actors | L2 card presence indicator and L2 Equipment Manager |
| Preconditions | administrativeState = locked |
| | availabilityStatus is clear |
| | notInstalledQualifier = unassigned |

Typical Course Of Events

| Actor Action | System Response |
|---|---|
| Autonomous notification from L2 card presence indicator creates Event to process information. | |
| | SC updates the Alarm Block with change. SC updates the database to set the availabilityStatus to notInstalled, clear out the proceduralStatus field. |

Unlocked Equipment Pull

TABLE 53

Transition description.

| FROM | TO |
|---|---|
| Unlocked/failed state 1385 operationalState: disabled administrativeState: unlocked availabilityStatus: failed | Unlocked/notInstalled state 1360 operationalState: disabled administrativeState: unlocked availabilityStatus: notInstalled |

TABLE 54

Transition description.

| FROM | TO |
|---|---|
| Active state 1350 operationalState: enabled administrativeState: unlocked usageState: active | Unlocked/notInstalled state 1360 operationalState: disabled administrativeState: unlocked availabilityStatus: notInstalled |

TABLE 55

Transition description.

| FROM | TO |
|---|---|
| Unlocked/Mismatch state 1355 operationalState: disabled administrativeState: unlocked availabilityStatus: notInstalledQualifier: misMatch | Unlocked/notInstalled state 1360 operationalState: disabled administrativeState: unlocked availabilityStatus: notInstalled |

TABLE 56

Use Case for Level 1 RM.

| | |
|---|---|
| Name | PULL-TO-UNLOCKED |
| Description | Equipment pull causes a transition of equipment into disabled, unlocked, notInstalled. |
| Actors | L2 Controller and Equipment Manager |
| Preconditions | To use this use-case the equipment is either unlocked or in a state of autonomously going to unlocked (software download). |

Typical Course Of Events

| Actor Action | System Response |
|---|---|
| Autonomous notification from L2 creates Event to process information. | |
| | NC updates the database to clear out the notInstalledQualifier's value, set the operationalState to disabled, set administrativeState to unlocked, set the availabilityStatus to notInstalled, and clear out any lockedQualifier value. |
| Notification sent to the administrative user. | |

TABLE 57

Use Case for Level 2 RM.

| | |
|---|---|
| Name | PULL-TO-UNLOCKED |
| Description | Equipment pull causes a transition of equipment into disabled, unlocked, notInstalled. |
| Actors | L2 card presence indicator and L2 Equipment Manager |
| Preconditions | To use this use-case the equipment is either unlocked or in a state of autonomously going to unlocked (software download). |

Typical Course Of Events

| Actor Action | System Response |
|---|---|
| Autonomous notification from L2 creates Event to process information. | |
| | SC updates the Alarm Block with change. SC updates the database to clear out the notInstalledQualifier's value, set the operationalState to disabled, set administrativeState to unlocked, set the availabilityStatus to notInstalled, and clear out any lockedQualifier value. |

Locked Equipment Pull

TABLE 58

Transition description.

| FROM | TO |
|---|---|
| Locked/Enabled state 1380 operationalState: enabled administrativeState: locked | Locked/notInstalled state 1370 operationalState: disabled administrativeState: locked availabilityStatus: notInstalled |

TABLE 59

Transition description.

| FROM | TO |
|---|---|
| Disabled/SWDlnd state 1375 operationalState: disabled administrativeState: locked lockedQualifier: SWDnld | Locked/notInstalled state 1370 operationalState: disabled administrativeState: locked availabilityStatus: notInstalled |

TABLE 60

Transition description.

| FROM | TO |
|---|---|
| Locked/Failed state 1390 operationalState: disabled administrativeState: locked availabilityStatus: failed | Locked/notInstalled state 1370 operationalState: disabled administrativeState: locked availabilityStatus: notInstalled |

TABLE 61

Transition description.

| FROM | TO |
|---|---|
| Locked/Mismatch state 1365 operationalState: disabled administrativeState: locked availabilityStatus: notInstalled notInstalledQualifier: misMatch | Locked/notInstalled state 1370 operationalState: disabled administrativeState: locked availabilityStatus: notInstalled |

TABLE 62

Transition description.

| FROM | TO |
|---|---|
| operationalState: disabled administrativeState: locked availabilityStatus: notInstalledQualifier: unassigned | operationalState: disabled administrativeState: locked availabilityStatus: notInstalled notInstalledQualifier: unassigned |

TABLE 63

Use Case for Level 1 RM.

| | |
|---|---|
| Name | PULL-TO-LOCKED |
| Description | Equipment pull causes a transition of equipment into disabled, locked, notInstalled. |
| Actors | L2 Controller and Equipment Manager |
| Preconditions | To use this use-case the equipment is in a locked state. |

Typical Course Of Events

| Actor Action | System Response |
|---|---|
| Autonomous notification from L2 creates Event to process information. | |
| | NC updates the database to set the operationalState to disabled, and set the availabilityStatus to notInstalled, clear any lockedQualifier value, if notInstalledQualifier is set to a mismatch of equipment then clear it. |
| Notification sent to the administrative user. | |

TABLE 64

Use Case for Level 2 RM.

| | |
|---|---|
| Name | PULL-TO-LOCKED |
| Description | Equipment pull causes a transition of equipment into disabled, locked, notInstalled. |
| Actors | L2 card presence indicator and L2 Equipment Manager |
| Type | |
| Cross-references | |
| Preconditions | To use this use-case the equipment is in a locked state. |

Typical Course Of Events

| Actor Action | System Response |
|---|---|
| Autonomous notification from L2 creates Event to process information. | |
| | SC updates the Alarm Block with change. SC updates the database to set the operationalState to disabled, and set the availabilityStatus to notInstalled, clear any lockedQualifier value, if notInstalledQualifier is set to a mismatch of equipment then clear it. |

Equipment Failure/Recovery

Scanners running on the Level 3 cards have the capability of identifying problems that could result in a decision that would alarm the equipment due to a failure or to clear an existing alarm.

Enabled/Active Equipment Failure

TABLE 65

Transition description.

| FROM | TO |
|---|---|
| Active state 1350 operationalState: enabled administrativeState: unlocked usageState: active | Unlocked/failed state 1385 operationalState: disabled administrative State: unlocked availabilityStatus: failed |

TABLE 66

Use Case for Level 1 RM.

| | |
|---|---|
| Name | AUTO-FAIL |
| Description | Notification from below that equipment has failed. |
| Actors | L2 Controller and Equipment Manager |
| Preconditions | Autonomous failure will only happen in an unlocked, enabled state. |

Typical Course Of Events

| Actor Action | System Response |
|---|---|
| Autonomous notification from L2 creates Event to process information. | |
| | NC updates the database to set the operationalState to disabled, and set the availabilityStatus to failed. |
| Notification sent to the administrative user. | |

TABLE 67

Use Case for Level 2 RM.

| | |
|---|---|
| Name | AUTO-FAIL |
| Description | Notification from below that equipment has failed. |
| Actors | L2 Controller and L2 Equipment Manager |
| Preconditions | Autonomous failure will only happen in an unlocked, enabled state. |

Typical Course Of Events

| Actor Action | System Response |
|---|---|
| Autonomous notification from L2 creates Event to process information. | |
| | SC updates the Alarm Block with the change. SC updates the database to set the operationalState to disabled, and set the availabilityStatus to failed. |

Disabled/Failed Equipment Recovery

TABLE 68

Description of the Transitions.

| FROM | TO |
|---|---|
| Unlocked/failed state 1385 operationalState: disabled administrativeState: unlocked availabilityStatus: failed | Active state 1350 operationalState: enabled administrativeState: unlocked usageState: active |

TABLE 69

Use Case for Level 1 RM.

| | |
|---|---|
| Name | AUTO-RECOVER |
| Description | Notification from below that equipment has recovered. |
| Actors | L2 Controller and Equipment Manager |
| Preconditions | Autonomous failure will only happen in an unlocked, disabled state. |

TABLE 69-continued

Use Case for Level 1 RM.

Typical Course Of Events

| Actor Action | System Response |
|---|---|
| Autonomous notification from L2 creates Event to process information. | |
| | NC updates the database to set the operationalState to enabled and clear the availabilityStatus. |
| Notification sent to the administrative user. | |

TABLE 70

Use Case for Level 2 RM.

| | |
|---|---|
| Name | AUTO-RECOVER |
| Description | Notification from below that equipment has recovered. |
| Actors | L2 Controller and L2 Equipment Manager |
| Preconditions | Autonomous failure will only happen in an unlocked, disabled state. |

Typical Course Of Events

| Actor Action | System Response |
|---|---|
| Autonomous notification from L2 creates Event to process information. | |
| | SC updates Alarm Block with change. SC updates the database to set the operationalState to enabled and clear the availabilityStatus. |

System Controller

The system controller is responsible for overall system management and control. The system controller uses a variety of protocols to communicate with other nodes in the network, including the operating system (OS). Some of the protocols satisfy specific requirements (e.g. in a SONET based system, the transfer of OAM&P message across SONET/SDH communications channels), while others implement features, or functions, that are not part of the physical protocol used. To facilitate these functions, routers in a network are assigned an ID that uniquely identifies them within the network. The ID can also serve as a priority metric that determines the node's level within the hierarchy. However, the network can be configured to allow the user to override this by manually assigning priorities to network nodes.

The system controller supports a number of tasks that perform management, control, and routing functions, including, various internetworking protocols, HTTP, numerous service elements, Intermediate System to Intermediate System (IS-IS), a configuration manager (CM), and an Operations System (OS) Interface (OSI) which handles all interactions with an OS.

The RM cn the system controller is responsible for starting all level-2 processors, monitoring their operation, and maintaining a list of system resources. Information about each system element is maintained in a resource control block (RCB), as noted. The database is a hierarchical list of RCBs that reflects the physical hardware (or software) present in the system.

System Controller Startup

Figure 14:
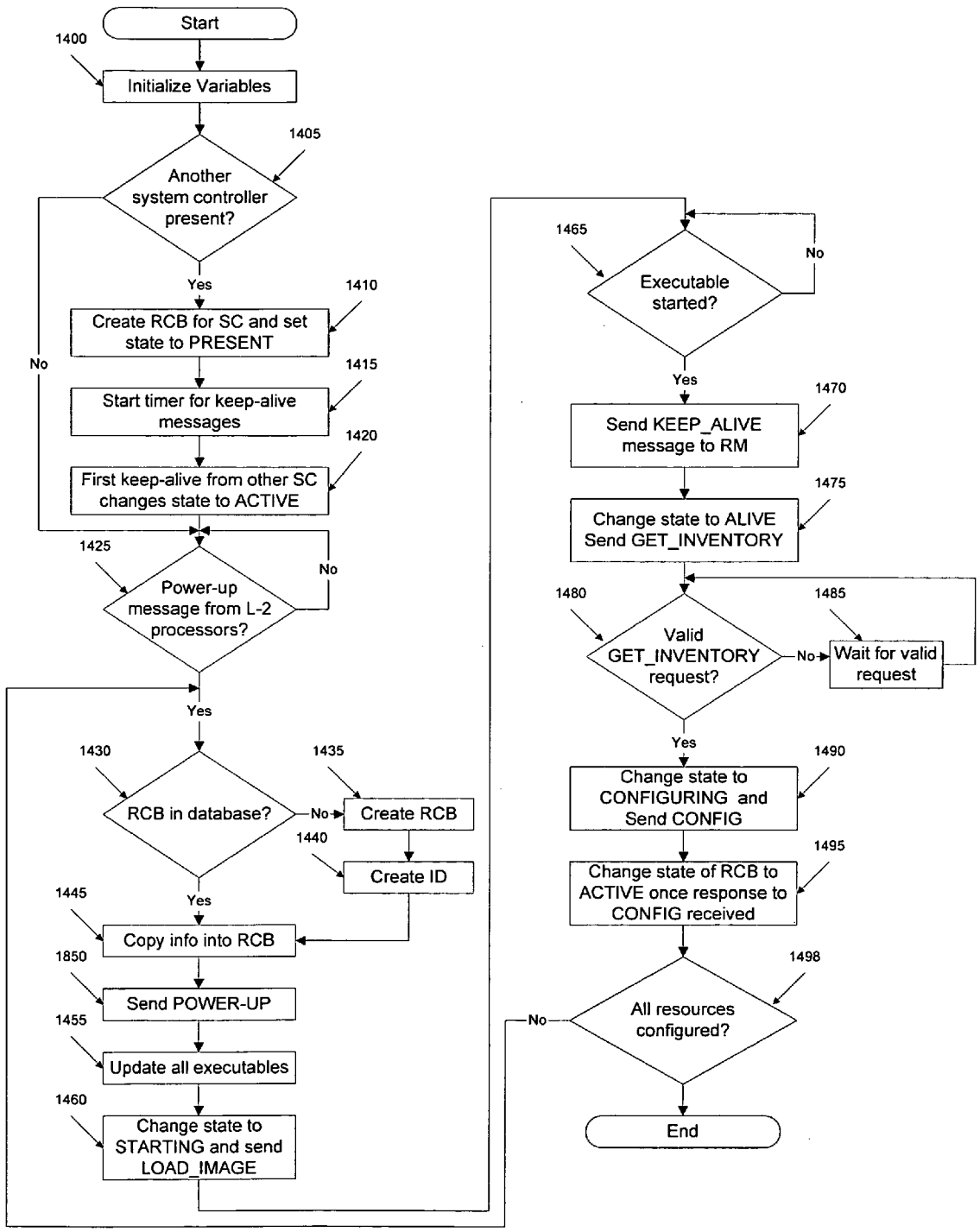
FIG. 14 illustrates a flow diagram depicting an exemplary sequence of actions performed by a resource manager (RM) when a system controller is first powered-up or reset.

FIG. 14 illustrates a flow diagram depicting an exemplary sequence of actions performed by a resource manager when a system controller is first powered-up or reset. It will be appreciated by one of skill in the art that operations discussed herein may consist of directly entered commands by a computer system user or by steps executed by application specific hardware modules although steps executed by software modules is preferred.

The operations referred to herein may be modules or portions of modules (e.g., software, firmware, or hardware modules). For example, although the described embodiment includes software modules and/or includes manually entered user commands, the various exemplary modules may be application specific hardware modules. The software modules discussed herein may include script, batch, or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiment are for illustration only. Operations may be combined or the functionality of the operations may be distributed in additional operations in accordance with the invention. The preceding discussion applies to the flow diagram depicted in FIG. 14, as well as to all other flow diagrams and software descriptions provided herein.

As FIG. 14 illustrates, the first action taken by the RM is to initialize local variables and structures (step 1400). A system controller presence input is then checked (step 1405). This input indicates whether another system controller is installed in the management bay (e.g., of the type illustrated as system controller 1300). If one is installed, an RCB is created for it and its state set to PRESENT (step 1410). A periodic timer is then set to send, and check for, keep-alive messages from the other copy (step 1415). The first keep-alive from the second level-1 processor changes its state to ACTIVE (step 1420), using the element-to-element protocol (EEP) described subsequently.

At this point, the RM waits for power-up messages from installed level-2 processors (step 1425), which include the following:
1. I/O shelf processor modules;
2. Matrix shelf processor modules;
3. Route processor modules.

The power-up message contains information regarding the resource, including software version numbers. Some resources, like the I/O shelf processor, maintain more than one executable image; one for their own use and one for each resource-type they control. The version number information is used by RM to determine whether the local copy of the executable image is more recent than the one maintained by the resource. If the controlling processor's version of the executable image is more recent, the resource updates the executable image with the newer copy. The resource sends a zero in the version number field if the corresponding image is either not present or corrupted, which causes the update procedure to occur.

Upon receiving a power-up message from one of the level-2 resources, the RM checks its database for an existing RCB (step 1430) and, if one isn't found (implying that this is a new resource), the RM creates a new RCB for the level-2 resource (step 1435). The RM then assigns an ID to the RCB that uniquely identifies the resource within the system (step 1440). The ID can also be configured to serve as an index into a table of RCB pointers, which simplifies correlating received messages to RCBs. Once an RCB and a corresponding ID are allocated for the resource (or the RCB is found), the RM copies the information contained in the power-up message into the RCB (step 1445) and sends back a POWER-UP reply message to the resource (step 1450). The reply contains the resource ID in its body, which is required for subsequent communication with the system controller. The RM then sets the state of the RCB to UPDATING and updates all executable images on the resource by performing one or more file transfers (step 1455).

At this point of the startup sequence, the level-2 resource is still executing its startup code and is ready to transfer control to its main executable image. The RM initiates this action by changing the state of the RCB to STARTING, and sending a LOAD_IMAGE command to the resource (step 1460). Once the main executable image has started on the level-2 processor (step 1465), the level-2 processor sends a keep-alive message to the RM (step 1470). The keep-alive message causes the RM to change the state of the RCB to ALIVE, and send back a GET_INVENTORY message requesting a list of all available resources in the shelf (step 1475).

Upon receiving a valid response to the GET_INVENTORY request (steps 1480 and 1485), RM changes the state of RCB to CONFIGURING, and sends a CONFIG request to the level-2 processor (step 1490). The CONFIG request contains all resource-specific configuration parameters, as well as any global parameters that the level-2 processor should know about. The response to the CONFIG request changes the state of the RCB to ACTIVE (step 1495), which indicates the end of the startup sequence for the resource. The RM then determines if more resources are awaiting configuration (step 1498) and either proceeds to configure them (step 1430) or exits.

All active resources send a periodic keep-alive message to the RM. A resource is considered inactive if no such message is received within a given number of keep-alive periods (e.g., 3). This allows a number of messages (e.g., up to 2) to be lost without causing the resource to be considered down.

Once the level-2 resources have been started, the RM sends a copy of the resource list (or subset thereof) to all modules that need this information. Preferably, the size and content of the resource list varies depending on the module to which the resource list is being sent. The RM preferably includes only enough resources in the response list to ensure the proper operation of the module, in order to simplify future updates.

Level-2 RCB State Diagram

Figure 15:
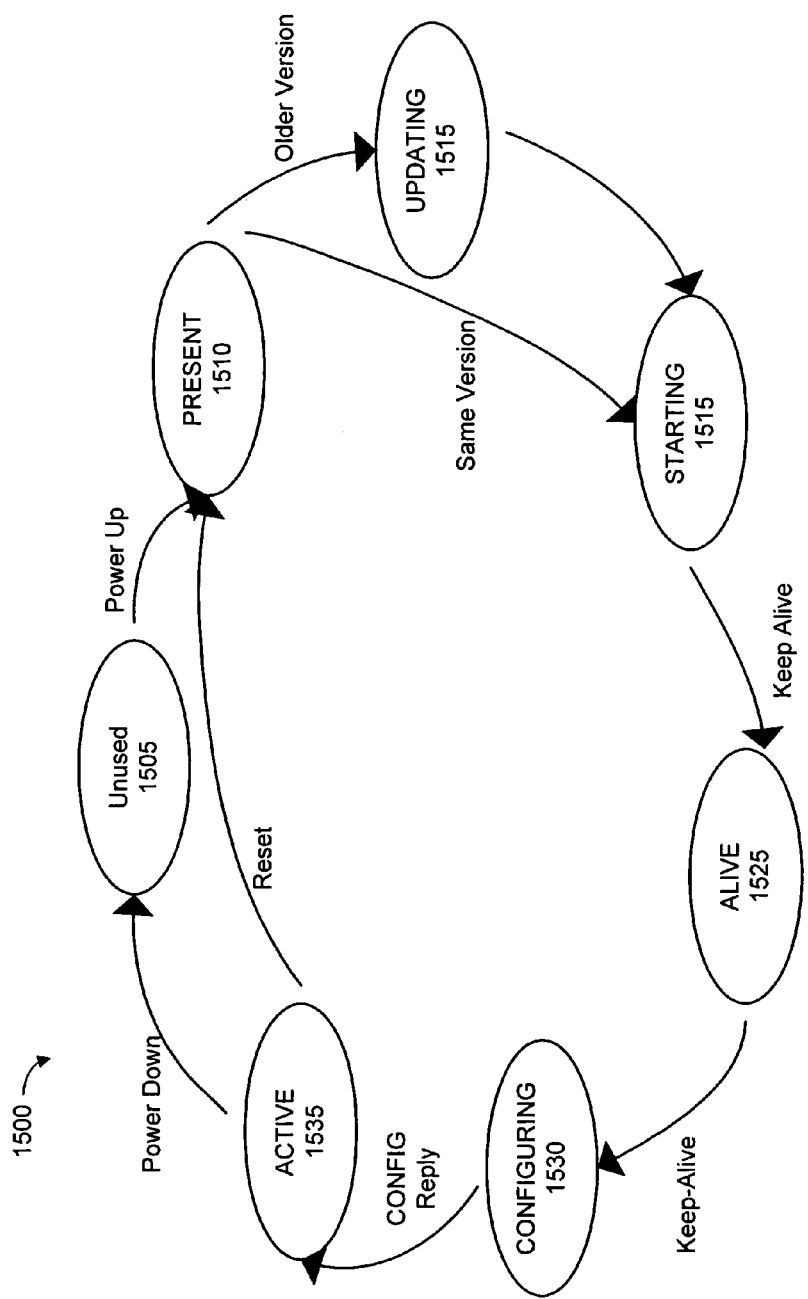
FIG. 15 illustrates a state diagram for a level-2 resource control block (RCB).

FIG. 15 illustrates a state diagram for a level-2 resource control block (RCB), and RCB state diagram 1500. Level-2 RCBs are maintained by level-2 processors, such as shelf processors and matrix processor. As shown in FIG. 15, RCB state diagram 1500 includes seven RCB states:
1. an UNUSED state 1505,
2. a PRESENT state 1510,
3. an UPDATING state 1515,
4. a STARTING state 1520, 5. an ALIVE state 1525,
6. a CONFIGURING state 1530, and
7. an ACTIVE state 1535.

The RCB transitions from UNUSED state 1805 to PRESENT state 1510 in response to the resource being powered up. If the RCB is an older version, the RCB goes into UPDATING state 1515. Once updated, or if there have been no changes, the RCB then transitions into STARTING state 1520. From that point, the RCB transitions to ALIVE state 1525 upon the reception of a keep-alive message. The RCB transitions from LIVE state 1525 to CONFIGURING state 1530 also upon the reception of a keep-alive message. Once a configuration reply has been sent/received, the RCB goes into ACTIVE state 1535, where it remains until it receives either a power down (then transitioning into unused state 1505) or a reset (then transitioning into PRESENT state 1510, in which the startup, updating, and configuring of the RCB is repeated).

Routing Protocol

A routing protocol that takes advantage of, and facilitates, the features and capabilities of a router such as router 100 is extensively described in patent application Ser. No. 09/232, 397, filed Jan. 15, 1999, entitled "A METHOD FOR ROUTING INFORMATION OVER A NETWORK," having A. Saleh, H. M. Zadikian, Z. Baghdasarian, and V. Parsi as inventors, as previously referenced herein. Such a routing protocol can be executed by a node controller (e.g., L-1 (level-1) processors 350 and 351 of FIG. 3) or by a route processor (e.g., route processors 360 and 361 of FIG. 3).

I/O Shelf Processor

The software on the I/O shelf processor communicates with other system processors and has onboard memory that is divided into at least the following three sections:

1. A read-only boot block that contains the startup code
2. A level-2 application block that contains the image executed by the level-2 processor, and
3. A level-3 application block that contains the image executed by the level-3 processors.

Startup Code

Figure 16:
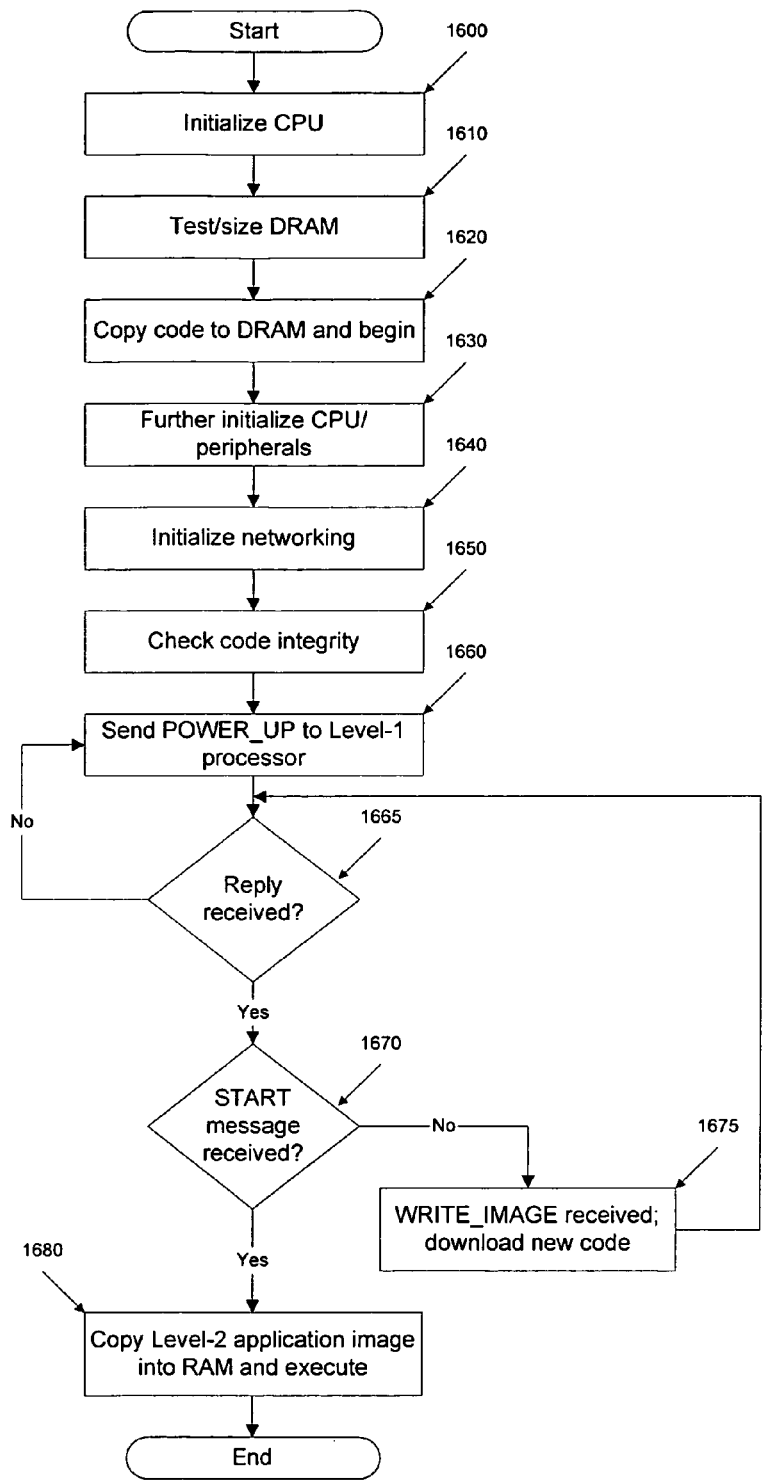
FIG. 16 illustrates an initialization sequence for a level-2 processor according to the present invention.

FIG. 16 illustrates actions performed by the startup code that is responsible for functions such as power-up diagnostics, initialization, and bootstrap loading of the application image. The startup sequence begins by initializing the CPU (e.g., initializing relevant CPU registers, including the memory controller, interrupt controller, timers, and the debug port) (step 1600). Memory is then tested (step 1610). At step 1620, startup code is copied into memory and execution started. Initialization of the CPU is then completed at step 1630. This may include, for example, initializing the rest of the CPU's registers and other external peripherals. Next, networking capabilities are initialized (step 1640). An integrity check is then run on all application code blocks.

A power-up message is then sent to the level-1 processor (step 1665). The message is re-sent if a reply isn't received within a predetermined period (e.g., 15 seconds) (step 1660). The power up message contains information about the hardware. If any of the application code blocks was found to be bad in the previous step, the startup code sends a message to the level-1 processor indicating that the level-1 processors version of the code is more recent. This causes a new image to be downloaded into the I/O shelf processor.

Once a power-up response has been received by the startup code, the startup code enters a loop, awaiting a message from the level-1 processor (step 1670). This message is typically one of two messages: WRITE_IMAGE, which causes the startup code to call a function that receives a binary image from the level-1 processor and writes that image into memory (step 1675), and START, which causes the startup code to copy the level-2 application code image into memory and pass control to the code (step 1680). The above step is repeated until a START message is received from the level-1 processor (step 1670), which transfers control to the main application task.

Application Code

The application code is responsible for shelf startup, management, and control. Chief among the modules executed is the RM. The RM is responsible for collecting information about installed/available shelf resources and monitoring their status during normal system operation. The RM maintains all information about a given resource in an RCB structure. The RM uses several processes to determine the type and number of resources present in its shelf.

Figure 17:
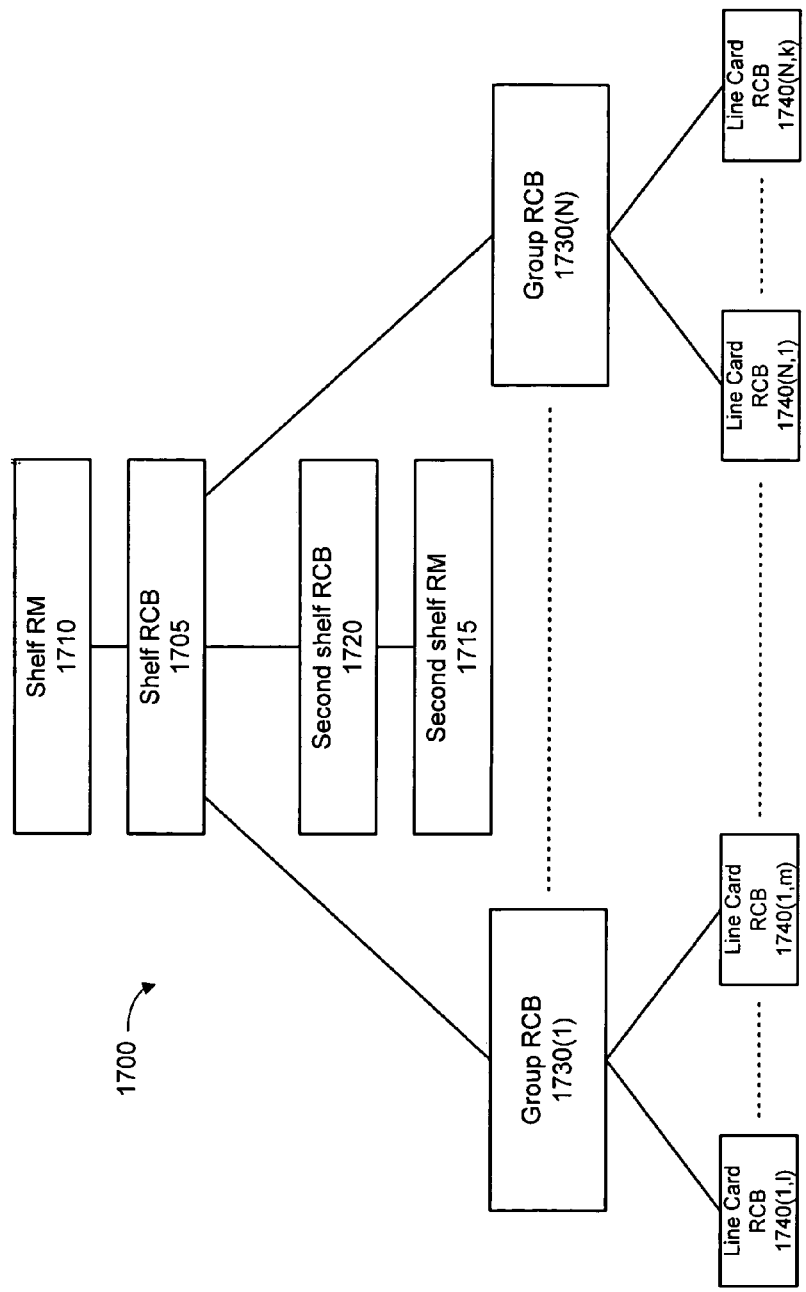
FIG. 17 illustrates an RCB hierarchy that is maintained on a shelf processor of the present invention.

FIG. 17 illustrates an RCB hierarchy 1700 that is maintained on a shelf processor. A shelf RM 1705 maintains a shelf RCB 1710 which stores information with regard to the various resources available to the shelf processor. This optionally includes communications with a second shelf processor RM 1715 regarding information stored in a second node RCB 1720, which stores information regarding the group matrices and line cards in the shelf, for example. Also maintained are group RCBs 1730(1)-(N). Group RCBs 1730(1)-(N), in turn, maintain information regarding the line cards in the shelf. Information specific to each line card is maintained in line card RCBs 1740(1,1)-(N,k).

Shelf Processor Modules

A presence input indicates the presence (or absence) of the other copy of the shelf processor module. Even if the other copy of the shelf processor module is present, however, this does not necessarily indicate that the other copy is operational. To determine the other shelf processor module's status, the RM sends a POWER_UP message to the other shelf processor and waits for a response or time-out. If a valid response isn't received after three consecutive attempts, the card is considered bad and is tagged as such in the RCB. Otherwise, the state of the corresponding RCB is changed to DOWN, and a 3-second timer is started to exchange periodic keep-alive messages with the processor. The state of the RCB is changed to ACTIVE when a keep-alive message is received from the node.

Shelf Matrix Modules

Figure 18:
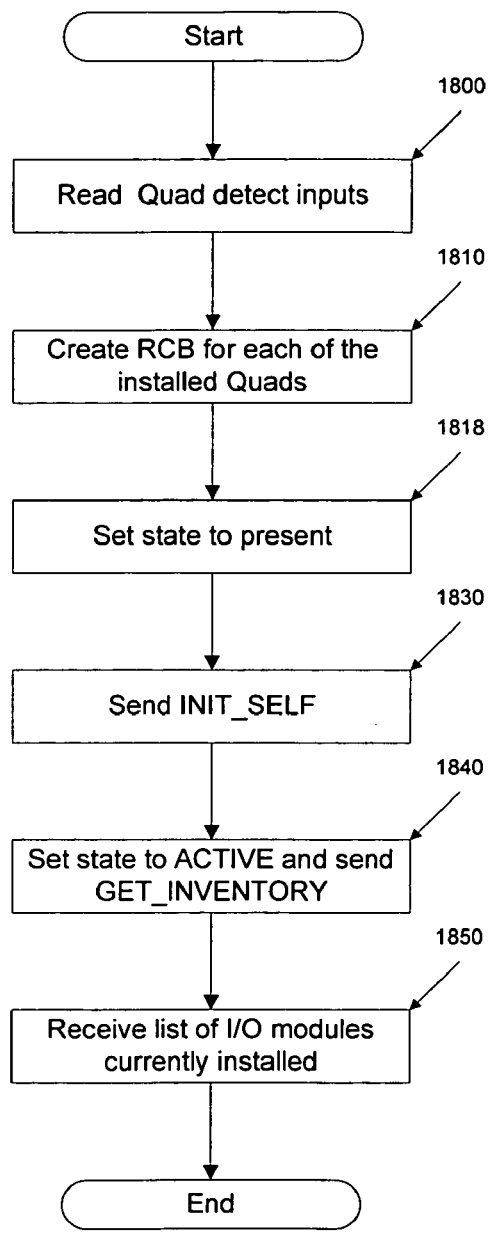
FIG. 18 illustrates an RCB creation sequence according to the present invention.

FIG. 18 illustrates the process used by the shelf matrix's RM in creating RCBs. The RM first reads the inputs that indicate whether the groups are installed to determine which groups are actually installed in shelf (step 1800). The RM then creates and RCB for each of the installed groups (step 1810), sets its state to PRESENT (step 1820), then sends an INIT_SELF message to one of the modules (step 1830). The response from the module changes its state to ACTIVE, and causes a GET_INVENTORY message to be sent to its processor (step 1840). The response to this message contains a list of all line cards installed in the group (step 1850). The shelf matrix processor sends two other messages to RM that are inventory-related. The first, ADD_RESOURCE, is sent when a new line card is inserted into a group. The other, DELETE_RESOURCE, is sent when an line card is removed from a group.

Line Cards

Figure 19:
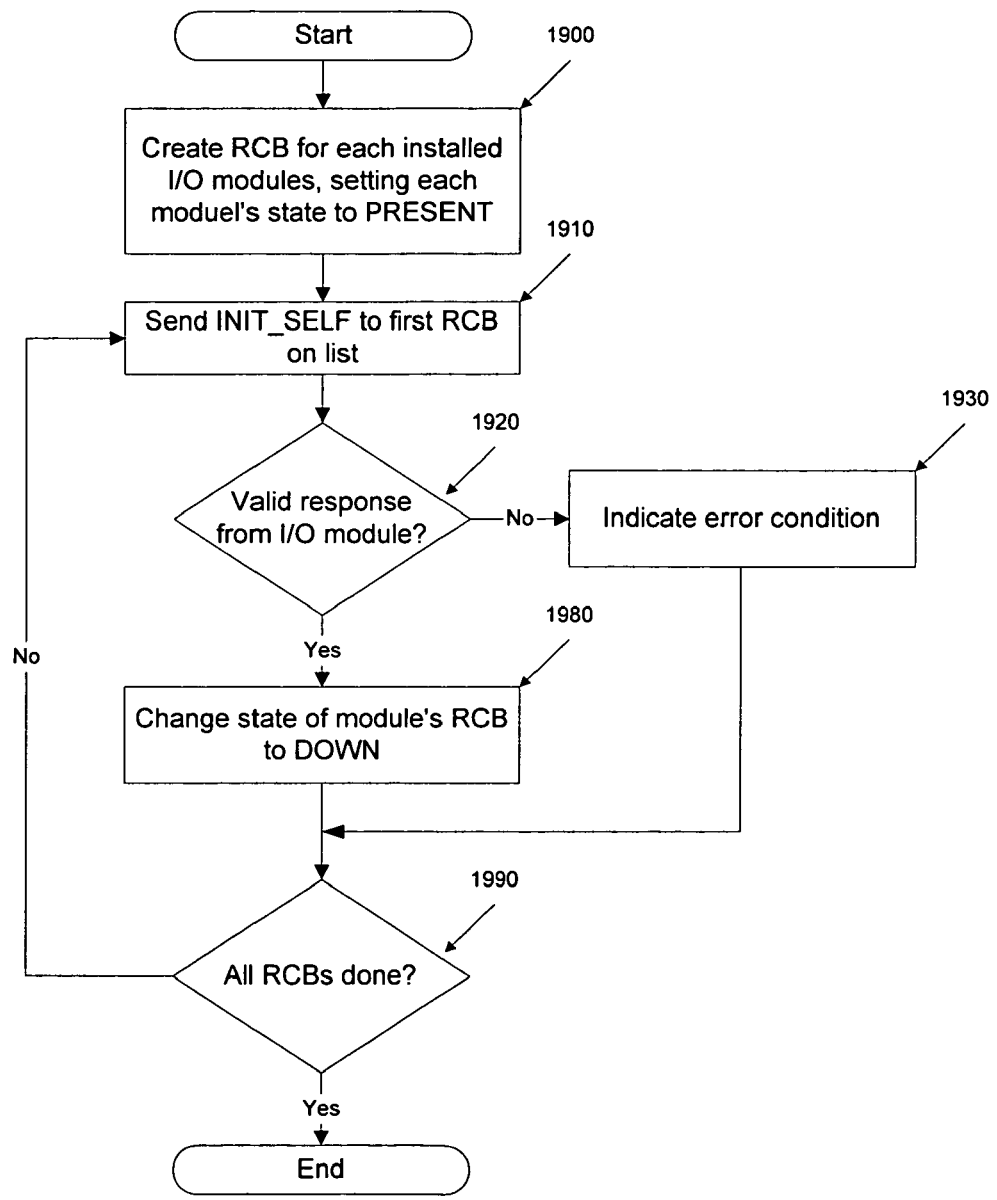
FIG. 19 illustrates an RCB creation sequence according to the present invention.

FIG. 19 illustrates the process used by the shelf matrix's RM in creating RCBs for line cards. Using information contained in the GET_INVENTORY response from the shelf matrix processor, the RM creates an RCB for each of the installed line cards, setting the RCB's state to PRESENT (step 1900). The RM then sends an INIT_SELF message to the first RCB on the list (step 1910). The INIT_SELF message typically serves three purposes: (1) the message passes operational parameters to the card processor; (2) the message returns information about the card; and (3) the message verifies that the card and the card's LAN link are functioning properly. An invalid response from the given line card (step 1920) generates an error condition (step 1930). A valid response from the given line card (step 1920) changes the state of the line card's RCB to DOWN (step 1980), which indicates that the line card hasn't yet been configured. If more RCBs remain, the process is repeated (step 1990). Information about other system resources is received from the level-1 processor, which sends a selective copy of its internal resource list to all level-2 processors.

It will be noted that the RM sends a periodic keep-alive message to every resource in that RM's shelf, which helps the RM detect failures caused by software bugs, hardware defects and the like. Any resource receiving such a message is required to send back a valid response within a certain time-out period. If no such response is received from the device within the time-out period, the RM increments the missed-polls counter in the corresponding RCB and declares the device non-operational when the counter reaches a preset limit.

A performance monitor (PM) is also provided and is responsible for collecting PM data from the line cards, maintaining and updating all required PM counters, and sending triggered updates to the level-1 processor.

Matrix Shelf Processor

The matrix shelf processor is responsible for the overall operation of a single main matrix shelf. It communicates with the system controller, the route processor, and the microcontroller on each of the switch nodes, to provide local control and management for the shelf, including matrix configuration, diagnostics, and error reporting.

The RM on the matrix shelf processor is responsible for managing the hardware resources in the given shelf. Like other resource managers in the system, the level-2 manager on this module uses a combination of hardware and software to discover and maintain a list of available shelf resources. An element-to-element protocol (EEP) is implemented to support such messaging and is discussed subsequently. In such a protocol, the RM uses special messages within the EEP (e.g. RESOURCE_UP, RESOURCE_DOWN, ADD_RESOURCE, and DELETE_RESOURCE) to update the level-1 resource manager with changes in its resource list.

Figure 20:
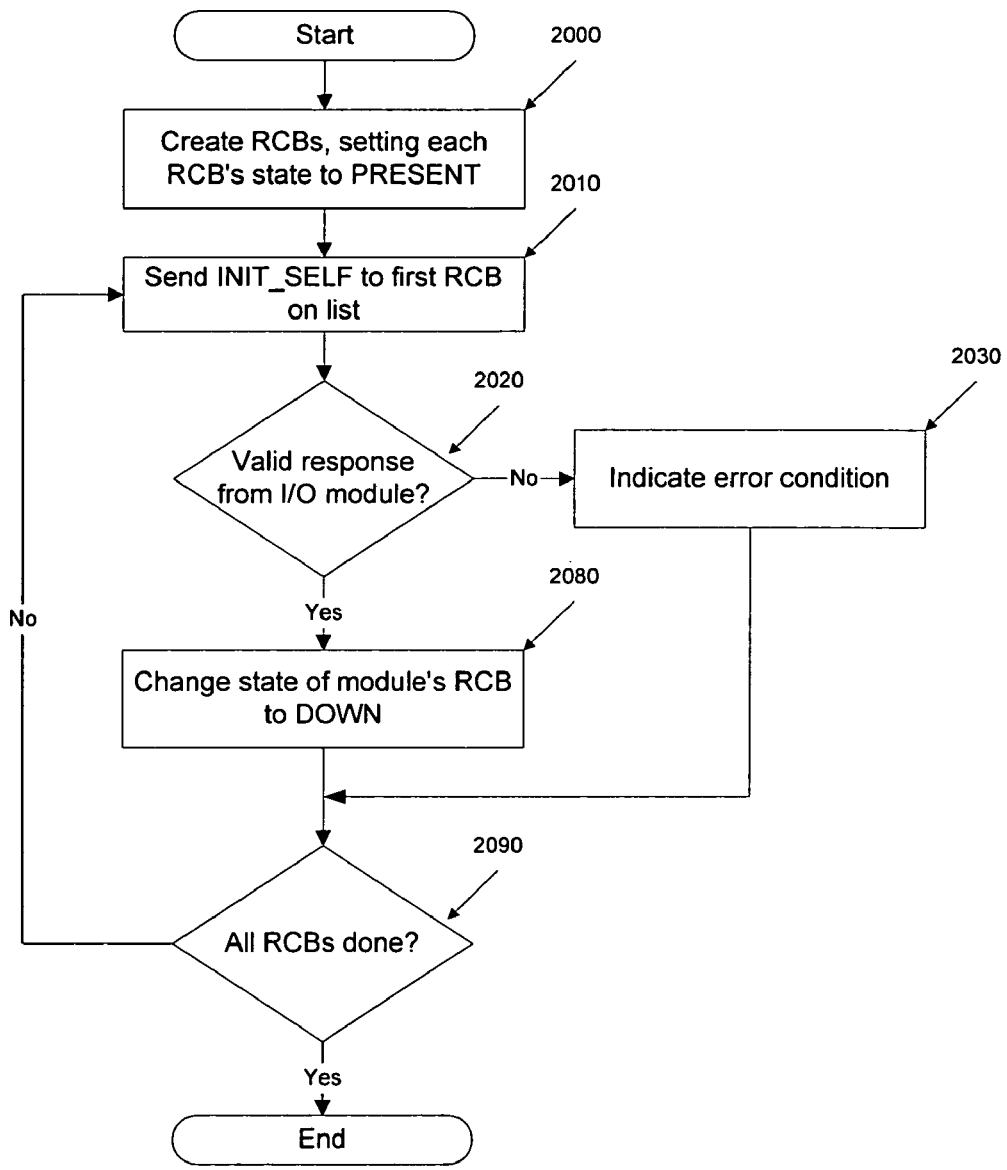
FIG. 20 illustrates the sequence used by the RM to create a list of resources in its shelf.

FIG. 20 illustrates the sequence used by the RM to create a list of resources in the RM's shelf. First, an RCB is created for every card that is present (step 2000). The state of each RCB is initially set to PRESENT (step 2000), which indicates that the slot is occupied, but the health of the card hasn't been determined yet. An INIT_SELF message is then sent to the first RCB on the list (step 2010). The INIT_SELF message typically serves three purposes: (1) the message passes important operational parameters, to the card processor; (2) the message returns information about the card; and (3) the message verifies that the card and the card's communications link are functioning properly. An invalid response from the card (step 2020) generates an error condition (step 2030).

A valid response from the card (2020) changes the state of the card's RCB to DOWN (step 2080), which indicates that the card hasn't been configured yet. If more RCBs remain, the process is repeated (step 2090). Every time a new matrix configuration is received from the system controller (or route processor), the resource manager sends each card whose RCB is in the DOWN or ACTIVE state a list of node-specific parameters. Cards that are in the DOWN state when the configuration message is received are moved to the ACTIVE state once the node has properly acknowledged the message.

The status of active resources is closely watched by an RM using periodic keep-alive messages, in order to detect failures. Periodically, the RM sends a keep-alive message to one of the resources, starts a reply timer, and, depending on whether a response is received or not, does one of two things:

1. If a response is received within the time-out period, RM clears the missed-polls counter in the RCB.
2. If a response isn't received within the time-out period, RM increments the missed-polls counter and, if the count now exceeds the maximum allowed, the RM assumes that the resource has died and changes the RM's state to PRESENT. In this case, an appropriate message is typically sent to the level-1 processor.

To optimize the failure detection algorithm, the following additional test can be added: If a valid message is received from a resource between keep-alive polls, the RM can clear the missed-polls counter in the corresponding RCB and skip the resource during the next polling cycle.

The active RM keeps the standby manager, which runs on the backup module, up-to-date and in synchronization. The active RM preferably uses a dedicated link between the two cards to exchange keep-alive messages and resource information with the standby resource manager. The keep-alive messages allow the standby RM to detect failure on the active module, while the update messages allow the standby RM to build an exact copy of the RCB list in its own memory. When failures do occur, the standby RM is thus able to assume the active role in a relatively short time.

Failure Isolation

Fault isolation may be implemented, for example, by a dedicated task that is responsible for locating failures within the shelf. The software running on the shelf processor, with help from the microcontroller on the switch node, is able to determine input signal quality. A method and apparatus for detecting failures is given in the co-pending application entitled "A METHOD AND APPARATUS FOR ISOLATING FAULTS IN A SWITCHING MATRIX" (as included by reference previously).

Line Card Processor

The line card terminates an input signal from one of the other nodes in the network. For example, in a SONET-based implementation, a single SONET/SDH OC-48 signal is terminated by a line card, although other signal levels (OC-192, OC-12, and so on) may be supported. As a result of its limited functionality, fast response time requirements, and limited hardware resources, the software on the line card preferably runs without an operating system. In one embodiment, the software consists of two threads, one that runs in the background and is responsible for non-time critical tasks. The other thread, which runs at the interrupt level, is responsible for all real-time aspects of the software, including limited overhead processing, alarm detection and forwarding, and fault detection and recovery. The line card preferably maintains a copy of its firmware and startup code onboard.

Startup Sequence

Figure 21:
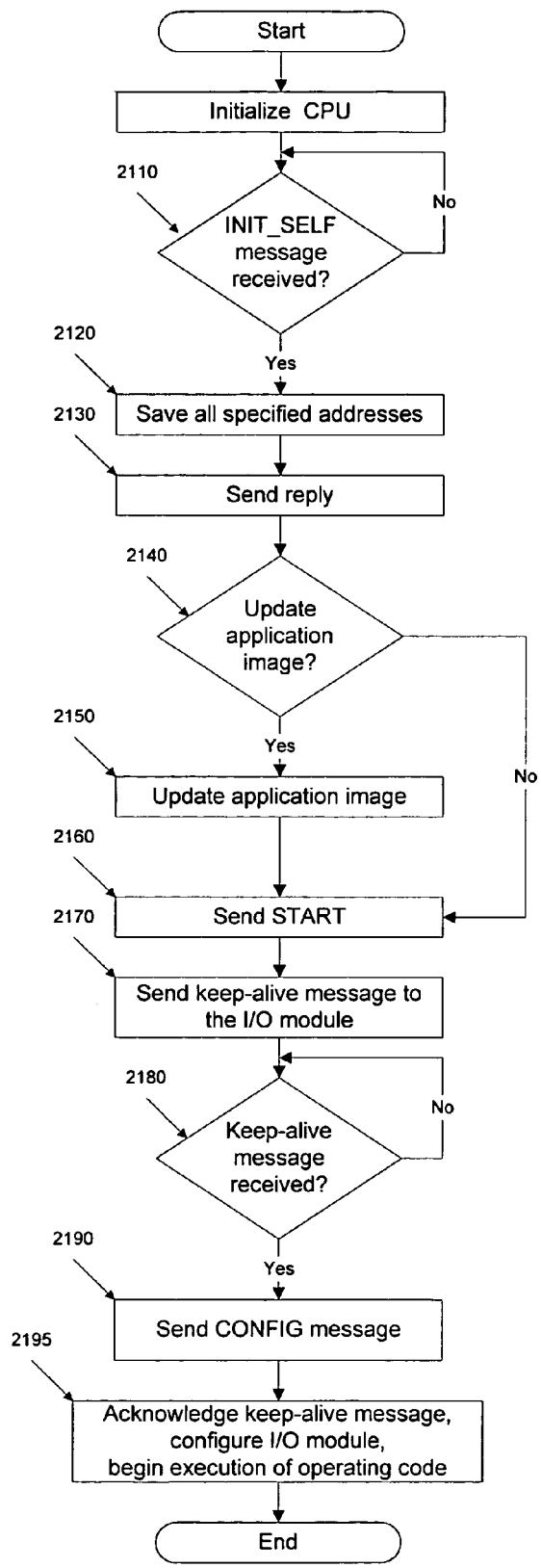
FIG. 21 illustrates the process carried out in starting an line card.

FIG. 21 illustrates the process carried out in starting a line card. The startup code begins by initializing the line card's CPU (step 2100). Next, the line card waits for an INIT_SELF message from the I/O shelf processor (step 2110). The message contains information needed for initialization such as shelf configuration information, communication parameters, and the like.

Upon receiving the INIT_SELF message, the startup code saves all specified addresses (step 2120) and sends back a reply that contains module-specific information (step 2130). The shelf processor uses this information to decide whether to update the software on the line card (step 2140). If such an update is required, the shelf processor uses the file transfer facility of EEP to do so (step 2150).

The shelf processor then sends a START command to the line card, which causes the startup code to load the stored application image and transfer control to it (step 2160). The shelf processor then sends the first keep-alive message to the line card (step 2170). Upon receiving a valid keep-alive response from the line card (step 2180), the shelf processor sends it a configuration message that contains all configurable operational parameters (step 2190). The application code acknowledges the messages, performs any required hardware configuration, enables processor interrupts, which starts the real-time thread, and enters its main execution loop (step 2195).

The line card receives and responds to periodic keep-alive messages from the shelf processor. Such messages allow failures caused by software bugs and/or hardware defects to be detected by the shelf processor and reported to the level-1 resource manager.

Element-to-Element Protocol (EEP)

The Element-to-Element Protocol (EEP) allows elements within a node to communicate with one another.

Protocol Overview

EEP can employ any one of a variety of transport layers. When running over an internetworking transport layer protocol, EEP uses a port to implement a rendezvous service. EEP messages preferably start with a header containing some or all of the information described in Table 72. These fields are normally one byte in size, but can easily be of another size, should that be expedient. The header is followed by zero or more bytes of command-specific data.

TABLE 72

An Exemplary EEP Header.

| Field Name | Description |
|---|---|
| cmnd | The command being sent. |
| seq | Sequence number. Used to correlate sent requests with received responses. |
| size | Number of bytes contained in the body of the message. |
| flags | Contains the following miscellaneous flags: RRI: Request/Response Indicator. 0 = request; 1 = response ERI: Exception Response Indicator. 0 = positive response, 1 = negative DRI: Definite Response Indicator. 0 = exception response only; 1 = always respond. |

The EEP relies on the transport layer's error detection mechanism. Error recovery is preferably handled within EEP itself. The transport layer is also expected to preserve frame boundaries. These responsibilities can, of course, be shifted to the EEP, if necessary.

Negative responses carry codes that can be used by the receiver to determine the exacts reason for the failure. One of the codes identifies the failure, while another provides additional information about its cause. A failed WRITE_IMAGE command, for example, might return a CREATE_ERROR code in the first field, and a NO_SPACE code in the second. The codes should provide enough information about the failure so that proper action can be taken to correct the failure.

Table 73 shows the sequence required for receiving a file from an EEP node. The commands are shown in uppercase letters and are self-explanatory. Sequence numbers are shown as an 's' followed by the plus sign and a number. End of file is indicated with an END_WRITE block message that contains an error-checking code. which allows the receiver to verify the integrity of the received image.

TABLE 73

Example of a Sequence for Receiving a File.

| Device A | Device B |
|---|---|
| WRITE_IMAGE, s→ | |
| WRITE_BLOCK, s+1→ | ←+RSP (WRITE_IMAGE), s |
| | ←+RSP (WRITE_BLOCK), s+1 |
| WRITE_BLOCK, s+2← | |
| (packet is lost, device A times out) | |
| WRITE_BLOCK, s+1→ | |
| | ←+RSP (WRITE_BLOCK), s+2 |
| END_WRITE, s+m, CRC→ | ←+RSP (END_WRITE), s+m |

In another sequence, shown in Table 74 device B encounters an error while creating the file on its storage device:

TABLE 74

Example of an Error in Transmission.

| Device A | Device B |
|---|---|
| WRITE_IMAGE s→ | |
| | ←+RSP (END_IMAGE), s, error_code |

Table 75 shows a sequence illustrating the handling of direct commands and responses.

TABLE 75

Example sequence of direct command and response handling.

| Device A | Device B |
|---|---|
| START_TEST, s, port_id→ | |
| | ←+RSP (GET_PM_DATA), s, <pm_data> |
| GET_INVENTORY, s+n→ | |
| | ←+RSP (GET_INVENTORY), s+n |
| <resource_list> | |
| RESET_SELF, s+m→ | |
| | ←+RSP (RESET_SELF), s+m |

Element-to-Element Protocol Commands

The following are examples of Element-to-Element Protocol (EEP) commands in one embodiment of the present invention, along with their syntax, usage, and possible return codes. The commands presented herein are listed, along with a short description of their function, in Table 76.

TABLE 76

Element-to-Element Protocol Command.

| Command | Description |
| --- | --- |
| INIT_SELF | Sent to initialize an EEP device. |
| START | Causes the startup code to load the executable image into memory and transfer control to it. |
| KEEP_ALIVE | Sent to lower-level EEP device to verify availability and proper operation. |
| CONFIG | Used by higher-level processors to transfer device-specific configuration parameters to modules under their control. |
| WRITE_IMAGE | Starts the process of downloading a new executable image to a target device. |
| END_WRITE | Ends or aborts an active WRITE_IMAGE command. |
| WRITE_BLOCK | Writes a single executable image block to a target device. |
| GET_INVENTORY | Requests a list of all available hardware resources. |
| START_TEST | Starts a test on the specified port or device. |

The Initialize Local EEP Module (INIT_SELF) command is sent to an EEP device and provides the following functionality:
1. Passes EEP-related initialization parameters to the device, e.g., shelf ID, which determines the link's hardware address;
2. Solicits a response from the device, which is used by the sender to verify its reachability, availability, and proper operation; and
3. Exchanges authentication information, if required for the flow.

The parameters and usages are listed in Table 77.

TABLE 77

Parameters for the INIT_SELF Command.

| Field Name | Description |
| --- | --- |
| shelf ID | Local shelf ID (0 through number of shelves in the rack −1) |
| mcast_count | Number of multicast addresses contained in the message |
| mcast_table | List of multicast addresses to listen to |

The INIT_SELF command has no return codes, other than the conditional acknowledgment.

The load and start main application (START) command causes the startup code to load the executable image into memory and transfer control to that executable image. This command uses no parameters, but has the return codes listed in Table 78.

TABLE 78

Return Codes for the START Command.

| | |
| --- | --- |
| ALREADY_STARTED | The main application has already been started |
| NO_IMAGE | The executable image in Flash is either bad or missing |

The keep-alive poll command is sent to an EEP device by a higher level processor to verify its availability and proper operation. It has no parameters and no return codes other than the conditional acknowledgment.

The configuration parameters (CONFIG) command is used by higher-level processors to transfer device-specific configuration parameters to modules under their control. The parameters for the CONFIG command depend on the module type. The discussions regarding a specific module should be consulted for more information. The return codes for the CONFIG command are listed in Table 79.

TABLE 79

Return Codes For the CONFIG Command.

| | |
| --- | --- |
| NOT_SUPPORTED | One or more of the specific parameters are not supported by the target device. The extended error code field carries an offset into the configuration block where the error occurred. |
| HARDWARE_ERROR | An error occurred while configuring the hardware device(s). The extended error code is used to further pinpoint the cause of the failure. |

The write executable image (WRITE_IMAGE) command starts the process of downloading a new executable image to a target device, and uses parameters such as those listed in Table 80 and provides return codes listed such as those listed in Table 81.

TABLE 80

Parameters for the WRITE_IMAGE Command.

| Field Name | Description |
| --- | --- |
| Image_Name | Name of the image to be downloaded. This is used when the target device maintains multiple images |

TABLE 81

Return Codes for the WRITE_IMAGE Command.

| | |
| --- | --- |
| CREATE_ERROR | Unable to create the image on the storage device. The extended error code contains the reason for the failure; e.g., NO_SPACE or IO_ERROR |
| INVALID_NAME | The specified name doesn't match any of the ones maintained by the device. |

The end of a previous write-image command (END_WRITE) either ends or aborts an active WRITE_IMAGE command, using the parameters listed in Table 82 and possible return codes listed in Table 83.

TABLE 82

Parameters for the END_WRITE Command.

| Field Name | Description |
| --- | --- |
| Commit | 0-Normal end of life<br>1-Abort transfer, ignore all previously sent data blocks |
| CRC | CRC-16 code computed over the entire image |

TABLE 83

Return codes for the END_WRITE Command.

| | |
| --- | --- |
| WRITE_ERROR | Unable to write the end-of-file marker into the storage device. The extended error code contains the reason for the failure: NO_SPACE IO_ERROR |
| CRC_ERROR | The locally computed CRC-16 code didn't match the one received in the request. |

The write an executable image block (WRITE_BLOCK) command writes a single executable image block (e.g., 250 bytes) to a target device. Its parameters include up to a given amount of data (e.g., 250 bytes of data). The actual number of bytes is specified in the size field of the EEP header. Its return codes are listed in Table 84.

TABLE 84

Return codes for the WRITE_BLOCK Command.

WRITE_ERROR  Unable to write all specified bytes into the storage device. The extended error code contains the reason for the failure: NO_SPACE IO_ERROR The GET_INVENTORY command requests a list of all available hardware resources. This command is normally sent by a higher-level RM to request the resource list from its subordinate RMs, although this need not be the case. The GET_INVENTORY command normally requires no parameters and returns a list of all available resources if successful.

The START_TEST Command starts a test on the specified port or device. The START_TEST command requires the identifier of the port or device being tested. This command returns the results of the tests.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A resource management system for a communications system comprising:
   a resource manager; and
   a resource control block, wherein
      said resource control block corresponds to a resource of said communications system,
      said resource is of one resource type of a plurality of resource types,
      said resource control block maintains information regarding said resource,
      said resource control block comprises a generic section containing information applicable to each of said plurality of said resource types,
      said resource control block comprises a resource-specific section containing information applicable to said one resource type, and
      said resource manager is configured to assign an identifier to said resource control block.

2. The resource management system of claim 1, wherein said resource is a hardware component of said communications system.

3. The resource management system of claim 1, wherein said information includes a status of said resource.

4. The resource management system of claim 1, wherein
   said communications system comprises a processor, communicatively coupled to said resource,
   said processor is configured to execute said resource manager, and
   said resource manager is configured to maintain said resource control block in response to communications between said processor and said resource.

5. The resource management system of claim 1, further comprising:
   a plurality of resource control blocks, wherein
      said resource control block is a one of said plurality of resource control blocks,
      said identifier uniquely identifies said resource within said communications system, and
      said identifier is configured to serve as an index into a table of pointers, each of said pointers pointing to at least one of said plurality of resource control blocks.

6. The resource management system of claim 1, further comprising:
   a plurality of resources, wherein
      said plurality of resources include said resource,
      said plurality of resources are coupled to one another in a hierarchy,
      each of said plurality of resources is one of said plurality of resource types, and
      all of said plurality of resources that are in a single level of said hierarchy are of a single one of said plurality of resource types; and
   a plurality of resource control blocks, wherein
      said plurality of resource control blocks include said resource control block, and
      each of said plurality of resource control blocks correspond to one of said plurality of resources.

7. The resource management system of claim 6, further comprising:
   a plurality of resource managers, wherein
      said plurality of resource managers includes said resource manager,
      each of said plurality of resource managers maintains a hierarchical list of said plurality of resource control blocks, and
      said hierarchical list represents resources controlled by said each of said plurality of resource managers.

8. The resource management system of claim 7, wherein said hierarchical list is a resource list and said resource list stores information regarding said hierarchy and interdependencies of said plurality of resources.

9. The resource management system of claim 8, wherein
   each one of a first plurality of said plurality of resource managers is a shelf resource manager, and
   each one of a first plurality of said plurality of resource control blocks is a shelf resource control block.

10. The resource management system of claim 9, wherein
   each one of a second plurality of said plurality of resource managers is a group resource manager, and
   each one of a second plurality of plurality of said resource control blocks is a group resource control block.

11. The resource management system of claim 10, wherein
   each one of a third plurality of said plurality of resource managers is a line card resource manager, and
   each one of a third plurality of said plurality of resource control blocks is a line card resource control block.

12. The resource management system of claim 11, wherein
   each one of said a second plurality of said plurality of resource control blocks contains information from at least one of said third plurality of said plurality of resource control blocks,
   each one of said a first plurality of said plurality of resource control blocks contains information from at least one of said second plurality of said plurality of resource control blocks, and
   said resource control block contains information from at least one of said first plurality of said plurality of resource control blocks.

13. The resource management system of claim 7, wherein said resource manager is a node resource manager, and said resource control block is a node resource control block.

14. The resource management system of claim 6, wherein said resource manager is a node resource manager, and said resource control block is a node resource control block.

15. A resource management system for a communications system comprising:
a resource control block comprising a generic section and a resource-specific section; and
a resource manager, wherein
said communications system includes a system processor having a resource communicatively coupled thereto,
said system processor is configured to execute said resource manager,
said resource is of one resource type of a plurality of resource types,
said generic section contains information applicable to each of said plurality of resource types, and said resource-specific section contains information applicable to said one resource type, and
said resource manager is configured to assign an identifier to said resource control block.

16. The resource management system of claim 15, wherein said system processor is configured to create said resource control block.

17. The resource management system of claim 16, wherein
said resource manager is further configured to maintain said resource control block in response to communications between said system processor and said resource.

18. The resource management system of claim 17, wherein said resource control block comprises status information.

19. The resource management system of claim 17, wherein said resource manager is configured to cause said system processor to create said resource control block.

20. The resource management system of claim 17, wherein said resource is a hardware component of said communications system.

21. The resource management system of claim 17, further comprising:
a system resource control block, wherein said system resource control block maintains information regarding a status of said system processor.

22. The resource management system of claim 17, further comprising:
a plurality of resource control blocks, wherein
said resource control block is a one of said resource control blocks,
said identifier uniquely identifies said resource within said communications system, and
said identifier is configured to serve as an index into a table of pointers, each of said pointers pointing to at least one of said plurality of resource control blocks.

23. The resource management system of claim 17, wherein
said resource is one of a first plurality of resources, where each one of said first plurality of resources is coupled to said system processor,
said resource control block is one of a first plurality of resource control blocks, and
each one of said first plurality of resource control blocks is stored on a corresponding one of said first plurality of resources.

24. The resource management system of claim 23, further comprising:
a plurality of resource managers, wherein
each one of said plurality of resource managers runs on a corresponding one of said first plurality of resources and maintains a corresponding one of said first plurality of resource control blocks.

25. The resource management system of claim 23, further comprising
a second plurality of resources, wherein
at least one of said second plurality of resources is coupled to said each one of said first plurality of resources, and
said each one of said first plurality of resources comprises a resource processor;
a plurality of resource managers, each resource processor of said first plurality of resources configured to run a corresponding one of said first plurality of resource managers; and
a second plurality of resource control blocks, wherein
each one of said second plurality of resource control blocks maintains information regarding a status of a one of said second plurality of resources,
said each resource processor of said first plurality of resources is configured to maintain a one of said second plurality of resource control blocks corresponding to said at least one of said second plurality of resources in response to communications with said at least one of said second plurality of resources.

26. The resource management system of claim 23, wherein said system processor is configured to maintain information regarding said one of said second plurality of resource control blocks corresponding to said at least one of said second plurality of resources in response to communications with said at least one of said second plurality of resources and a corresponding one of said each resource processor of said first plurality of resources.

27. The resource management system of claim 17, wherein said resource manager is further configured to maintain network resource information, said network resource information corresponding to resources available to said system processor via a network to which said communications system is coupled.

28. A method of managing a communications system, said method comprising:
creating a resource control block comprising a generic section and a resource-specific section and corresponding to a resource of said communications system, and
assigning an identifier to said resource control block using a resource manager, wherein
said communications system comprises a processor and said resource,
said resource is of one resource type of a plurality of resource types,
said generic section contains information applicable to each of said plurality of resource types, and said resource-specific section contains information applicable to said one resource type,
said resource is coupled to said processor, and
said resource control block maintains information regarding a status of said resource.

29. The method of claim 28, wherein said resource is a hardware component of said communications system.

30. The method of claim 28, wherein
said resource control block is a one of a plurality of resource control blocks, said identifier uniquely identifies said resource within said communications system, and said identifier is configured to serve as an index into a table of pointers, each of said pointers pointing to at least one of said plurality of resource control blocks.

31. The method of claim 28, further comprising:

maintaining said resource control block, wherein said processor is configured to maintain said resource control block, said resource control block is maintained by said processor in response to communications between said processor and said resource.

32. The method of claim 31, further comprising:

creating a processor resource control block corresponding to said processor.

33. The method of claim 31, further comprising:

receiving a power-up message from said resource, wherein said resource control block is created by said processor in response to said power-up message from said resource.

34. The method of claim 31, further comprising:

maintaining said resource control block in response to a receipt of a keep-alive message from said resource.

35. The method of claim 31, further comprising:

maintaining said resource control block in response to a receipt of a reply from said resource, wherein said reply is generated in response to a protocol message sent by said processor.

36. The method of claim 31, wherein a protocol is employed in said communications.

37. The method of claim 36, wherein said protocol supports protocol messages configured to cause initialization of said resource, said processor to download a command to said resource, said resource to execute said command, said resource to provide status information to said processor, and said resource to perform a self-test.

38. The method of claim 31, further comprising for each one of a plurality of resources, creating a resource control block for each of said resources coupled to said each one of said resources, wherein said resource is one of said plurality of resources, each one of said plurality of resources is communicatively coupled to at least one other of said plurality of resources, said plurality of resources are arranged in a hierarchy having a plurality of levels, and said each of said plurality of resources coupled to said each one of said plurality of resources is at a one of said levels below a one of said plurality of levels of said each one of said plurality of resources.

39. The method of claim 38, further comprising:

maintaining each one of said plurality of resource control blocks on a corresponding one of said plurality of resources, wherein a one of a plurality of resource managers corresponding to said each one of said plurality of resource control blocks performs said maintaining of said each one of said plurality of resource control blocks; and maintaining a resource list for each one of said plurality of resource managers, wherein each said resource list is a hierarchical list of ones of said plurality of resource control blocks that correspond to ones of said plurality of resources under control of a one of said plurality of resources corresponding to said each one of said plurality of resource managers.

40. The method of claim 39, wherein said resource list represents at least a portion of said hierarchy and interdependencies between ones of said plurality of resources.

41. An apparatus for managing a communications system, said method comprising:

means for creating a resource control block comprising a generic section and a resource-specific section and corresponding to a resource of said communications system, and means for assigning an identifier to said resource control block using a resource manager, wherein said communications system comprises a processor and said resource, said resource is of one resource type of a plurality of resource types, said generic section contains information applicable to each of said plurality of resource types, and said resource-specific section contains information applicable to said one resource type, said resource is coupled to said processor, and said resource control block maintains information regarding a status of said resource.

42. The apparatus of claim 41, wherein said resource is a hardware component of said communications system.

43. The apparatus of claim 41, wherein said resource control block is a one of a plurality of resource control blocks, said identifier uniquely identifies said resource within said communications system, and said identifier is configured to serve as an index into a table of pointers, each of said pointers pointing to at least one of said plurality of resource control blocks.

44. The apparatus of claim 41, further comprising:

means for maintaining said resource control block, wherein said processor is configured to maintain said resource control block, said resource control block is maintained by said processor in response to communications with said resource.

45. The apparatus of claim 44, further comprising:

means for creating a processor resource control block corresponding to said processor.

46. The apparatus of claim 44, further comprising:

means for receiving a power-up message from said resource, wherein said resource control block is created by said processor in response to said power-up message from said resource.

47. The apparatus of claim 44, further comprising:

means for maintaining said resource control block in response to a receipt of a keep-alive message from said resource.

48. The apparatus of claim 44, further comprising:

means for maintaining said resource control block in response to a receipt of a reply from said resource, wherein said reply is generated in response to a protocol message sent by said processor.

49. The apparatus claim 44, wherein a protocol is employed in said communications.

50. The apparatus of claim 49, wherein said protocol supports protocol messages configured to cause initialization of said resource, said processor to download a command to said resource, said resource to execute said command, said resource to provide status information to said processor, and said resource to perform a self-test.

51. The apparatus of claim 44, further comprising
means for creating, for each one of a plurality of resources, a resource control block for each of said plurality of resources coupled to said each one of said plurality of resources, wherein
  said resource is one of said plurality of resources,
  each one of said plurality of resources is communicatively coupled to at least one other of said plurality of resources,
  said plurality of resources are arranged in a hierarchy having a plurality of levels, and
  said each of said plurality of resources coupled to said each one of said plurality of resources is at a one of said levels below a one of said plurality of levels of said each one of said plurality of resources.

52. The apparatus of claim 51, further comprising:
means for maintaining each one of said plurality of resource control blocks on a corresponding one of said plurality of resources, wherein
  a one of a plurality of resource managers corresponding to said each one of said plurality of resource control blocks is configured to perform maintenance of said each one of said plurality of resource control blocks; and
means for maintaining a resource list for each one of said plurality of resource managers, wherein
  each said resource list is a hierarchical list of ones of said plurality of resource control blocks that correspond to ones of said plurality of resources under control of a one of said plurality of resources corresponding to said each one of said plurality of resource managers.

53. The apparatus of claim 52, wherein said resource list represents at least a portion of said hierarchy and interdependencies between ones of said plurality of resources.

* * * * *